United States Patent
Brijwani et al.

(10) Patent No.: US 11,172,695 B2
(45) Date of Patent: Nov. 16, 2021

(54) METHOD, APPARATUS, AND PRODUCT PROVIDING HYDROLYZED STARCH AND FIBER

(71) Applicant: The Quaker Oats Company, Chicago, IL (US)

(72) Inventors: Khushal Brijwani, Elmsford, NY (US); Gary Carder, Barrington Hills, IL (US); Yongsoo Chung, Palatine, IL (US); Ursula Vanesa Lay Ma, Palatine, IL (US); John Schuette, Mount Prospect, IL (US); Wesley Twombly, Fox River Grove, IL (US)

(73) Assignee: The Quaker Oats Company, Chicago, IL (US)

( * ) Notice: Subject to any disclaimer, the term of this patent is extended or adjusted under 35 U.S.C. 154(b) by 465 days.

(21) Appl. No.: 15/077,670

(22) Filed: Mar. 22, 2016

(65) Prior Publication Data

US 2017/0273337 A1    Sep. 28, 2017

(51) Int. Cl.
    A23L 7/104    (2016.01)
    A23L 29/219   (2016.01)
    A23L 33/22    (2016.01)
    A23L 33/24    (2016.01)
    A23P 30/20    (2016.01)
    A23L 11/50    (2021.01)

(52) U.S. Cl.
    CPC ............ *A23L 7/107* (2016.08); *A23L 7/104* (2016.08); *A23L 11/50* (2021.01); *A23L 29/219* (2016.08); *A23L 33/22* (2016.08); *A23L 33/24* (2016.08); *A23P 30/20* (2016.08); *Y02E 50/10* (2013.01)

(58) Field of Classification Search
    CPC .......... A23L 7/107; A23L 7/104; A23L 33/24; A23L 29/219; A23L 33/22; A23P 30/20
    USPC ....................................................... 426/18
    See application file for complete search history.

(56) References Cited

U.S. PATENT DOCUMENTS

| | | |
|---|---|---|
| 1,163,175 A | 12/1915 | Rullman |
| 1,384,894 A | 7/1921 | Torlick |
| 2,999,018 A | 9/1961 | Huffman |
| 3,116,150 A | 12/1963 | Baker |
| 3,317,402 A | 5/1967 | Smith |
| 3,391,003 A | 7/1968 | Armstrong |
| 3,494,769 A | 2/1970 | Tressler |
| 3,579,352 A | 5/1971 | Bookwalter |
| 3,595,671 A | 7/1971 | Cooke |
| 3,732,109 A | 5/1973 | Poat |
| 3,753,728 A | 8/1973 | Bedenk |
| 3,851,085 A | 11/1974 | Rodgers |
| 3,869,558 A | 3/1975 | Hampton |
| 3,925,343 A | 12/1975 | Hampton |
| 3,950,543 A | 4/1976 | Buffa |
| 3,958,016 A | 5/1976 | Galle |
| 4,028,468 A | 6/1977 | Hohner |
| 4,038,427 A | 7/1977 | Martin |
| 4,041,187 A | 8/1977 | Nelson |
| 4,167,584 A | 9/1979 | Nelson |
| 4,171,384 A | 10/1979 | Chwalek |
| 4,247,561 A | 1/1981 | Nelson |
| 4,259,358 A | 3/1981 | Duthie |
| 4,266,027 A | 5/1981 | Muller |
| 4,282,319 A | 8/1981 | Conrad |
| 4,330,625 A | 5/1982 | Miller |
| 4,377,602 A | 3/1983 | Conrad |
| 4,431,674 A | 2/1984 | Fulger |
| 4,435,429 A | 3/1984 | Burrows |
| 4,435,430 A | 3/1984 | Fulger |
| 4,438,150 A | 3/1984 | Gantwerker |
| 4,439,460 A | 3/1984 | Tsau et al. |
| 4,500,558 A | 2/1985 | Fulger |
| 4,551,347 A | 11/1985 | Karwowski |
| 4,613,507 A | 9/1986 | Fulger et al. |
| 4,656,040 A | 4/1987 | Fulger |

(Continued)

FOREIGN PATENT DOCUMENTS

| | | |
|---|---|---|
| AU | 1989045913 | 12/1989 |
| CA | 1045890 | 1/1979 |

(Continued)

OTHER PUBLICATIONS

Likimani, T. A. et al. J. Food Sci. 56: 99-105 (1991) (Year: 1991).*
Skoglund, M., "Avenanthramide Content and Related Enzyme Activities in Oats as Affected by Steeping and Germination", Journal of Cereal Science, Academic Press Ltd, GB, vol. 48, No. 2, Sep. 1, 2008, pp. 294-303, XP023979477, 10 pages.
Camire, Mary Ellen, et al. "Thermal Processing Effects on Dietary Fiber Composition and Hydration Capacity in Corn Meal, Oat Meal, and Potato Peels," Cereal Chemistry 68(6), pp. 645-647, vol. 68, No. 6, 1991 (3 pages).

(Continued)

*Primary Examiner* — Hamid R Badr
(74) *Attorney, Agent, or Firm* — Barnes & Thornburg LLP; G. Peter Nichols

(57) ABSTRACT

A method and composition for providing hydrolyzed starch and fiber. In one aspect, the method comprises providing a first enzyme; a second enzyme; water; and a starting composition comprising at least one material selected from the group consisting of at least a portion of grain and at least a portion of pulse. Additional steps comprise hydrolyzing the fiber and starch in the at least one material through fiber and starch hydrolysis reactions catalyzed by the first and second enzymes, respectively. Further steps comprise deactivating the first and second enzymes. In a second aspect, a composition comprises at least one material selected from the group consisting of at least a portion of grain and at least a portion of pulse. The average molecular weights of the hydrolyzed starch and fiber molecules in the composition are fractions of the molecular weights of unhydrolyzed starch and fiber molecules, respectively.

45 Claims, 9 Drawing Sheets

(56) References Cited

U.S. PATENT DOCUMENTS

| | | | |
|---|---|---|---|
| 4,668,519 A | 5/1987 | Dartey | |
| 4,692,340 A | 9/1987 | Grutte | |
| 4,710,386 A | 12/1987 | Fulger | |
| 4,777,056 A | 10/1988 | Buhler | |
| 4,814,172 A | 3/1989 | Chavkin | |
| 4,834,988 A | 5/1989 | Karwowski | |
| 4,864,989 A | 5/1989 | Bolles | |
| 4,886,665 A | 12/1989 | Kovacs | |
| 4,894,242 A | 1/1990 | Mitchell | |
| 4,957,563 A | 9/1990 | Gallaher | |
| 4,996,063 A | 2/1991 | Inglett | |
| 4,999,208 A | 3/1991 | Wolfe | |
| 4,999,298 A | 3/1991 | Wolfe | |
| 5,021,248 A | 6/1991 | Stark | |
| 5,045,328 A | 9/1991 | Lewis | |
| 5,106,343 A | 4/1992 | Laufer | |
| 5,106,634 A | 4/1992 | Thacker | |
| 5,145,698 A | 9/1992 | Cajigas | |
| 5,234,704 A | 8/1993 | Devine | |
| 5,320,856 A | 6/1994 | Veronesi | |
| 5,334,407 A | 8/1994 | Donnelly | |
| 5,346,890 A * | 9/1994 | Hagiwara | A21D 2/18 514/27 |
| 5,385,746 A | 1/1995 | De Almeida | |
| 5,395,623 A | 3/1995 | Kovach | |
| 5,407,694 A | 4/1995 | Devine | |
| 5,458,893 A | 10/1995 | Smith | |
| 5,464,760 A | 11/1995 | Tsai | |
| 5,476,675 A | 12/1995 | Lou | |
| 5,490,997 A | 2/1996 | Devine | |
| 5,514,387 A * | 5/1996 | Zimmerman | A21D 2/02 426/19 |
| 5,523,109 A | 6/1996 | Hellweg | |
| 5,554,402 A | 9/1996 | Smith | |
| 5,571,334 A | 11/1996 | Dunn et al. | |
| 5,593,503 A | 1/1997 | Shi | |
| 5,656,317 A | 8/1997 | Smits | |
| 5,686,123 A | 11/1997 | Lindahl | |
| 5,738,887 A | 4/1998 | Wu | |
| 5,744,187 A | 4/1998 | Gaynor | |
| 5,846,786 A | 12/1998 | Senkeleski | |
| 5,849,090 A | 12/1998 | Haralampu et al. | |
| 5,863,590 A | 1/1999 | Alan | |
| 5,888,548 A | 3/1999 | Wongsuragrai | |
| 5,912,031 A | 6/1999 | Fitchett | |
| 5,932,264 A | 8/1999 | Hurd | |
| 5,962,047 A | 10/1999 | Gross | |
| 5,981,237 A | 11/1999 | Meagher | |
| 5,985,339 A | 11/1999 | Kamarei | |
| 5,997,917 A | 12/1999 | Uchida et al. | |
| 6,013,289 A | 1/2000 | Blank | |
| 6,054,302 A | 4/2000 | Shi | |
| 6,135,015 A | 10/2000 | Mendez | |
| 6,168,821 B1 | 1/2001 | Castleberry | |
| 6,190,708 B1 | 2/2001 | Triantafyllou | |
| 6,210,722 B1 | 4/2001 | Wullschleger | |
| 6,210,738 B1 | 4/2001 | Chen | |
| 6,210,741 B1 | 4/2001 | Van Lengerich | |
| 6,221,406 B1 | 4/2001 | Meschonat | |
| 6,244,528 B1 | 6/2001 | Wallis | |
| 6,277,186 B1 | 8/2001 | Shi | |
| 6,287,621 B1 | 9/2001 | Lacourse | |
| 6,287,626 B1 | 9/2001 | Fox | |
| 6,387,435 B1 | 5/2002 | Fox | |
| 6,395,314 B1 | 5/2002 | Whalen | |
| 6,451,369 B1 | 9/2002 | Triantafyllou | |
| 6,468,355 B1 | 10/2002 | Thompson | |
| 6,482,459 B1 | 11/2002 | Anderson | |
| 6,485,575 B2 | 11/2002 | Yuan | |
| 6,551,366 B1 | 4/2003 | D'Souza | |
| 6,592,914 B1 | 7/2003 | Triantafyllou | |
| 6,610,349 B1 | 8/2003 | Delrue et al. | |
| 6,617,446 B1 | 9/2003 | Papadopoulos | |
| 6,685,974 B2 | 2/2004 | Whalen | |
| 6,720,022 B1 | 4/2004 | Arnaut | |
| 6,723,358 B1 | 4/2004 | Van Lengerich | |
| 6,737,099 B2 | 5/2004 | Guraya | |
| 6,759,077 B1 | 7/2004 | Lewis | |
| 6,797,307 B2 | 9/2004 | Malkki et al. | |
| 7,030,092 B1 | 4/2006 | Levine | |
| 7,037,704 B2 | 5/2006 | Dunn-Coleman | |
| 7,101,585 B2 | 9/2006 | Shen | |
| 7,160,564 B2 | 1/2007 | Oste | |
| 7,244,457 B2 | 7/2007 | Racicot | |
| 7,318,519 B2 | 1/2008 | Sorensen | |
| 7,419,694 B2 | 9/2008 | Korolchuk | |
| 7,754,270 B2 | 7/2010 | Wuersch | |
| 7,794,774 B2 | 9/2010 | Foster | |
| 7,914,972 B2 | 3/2011 | Fujiwara | |
| 8,241,696 B2 | 8/2012 | Chung | |
| 8,518,469 B2 | 8/2013 | MacDonald | |
| 8,574,644 B2 | 11/2013 | Chatel | |
| 8,591,970 B2 | 11/2013 | Chatel | |
| 8,742,095 B2 * | 6/2014 | Lehtomaki | C08L 5/00 536/127 |
| 9,149,060 B2 | 10/2015 | Chatel | |
| 9,150,895 B2 | 10/2015 | Kurihara | |
| 2001/0002269 A1 | 5/2001 | Zhao | |
| 2001/0022986 A1 | 9/2001 | Girsh | |
| 2002/0127319 A1 | 9/2002 | Gare | |
| 2002/0187224 A1 | 12/2002 | Haefliger | |
| 2003/0091716 A1 | 5/2003 | Kuramoto | |
| 2003/0124195 A1 | 7/2003 | Delprato | |
| 2003/0170362 A1 | 9/2003 | Manning | |
| 2004/0028797 A1 | 2/2004 | Squire | |
| 2004/0101935 A1 | 5/2004 | Vasanthan | |
| 2004/0140584 A1 | 7/2004 | Wang | |
| 2004/0151805 A1 | 8/2004 | Gao et al. | |
| 2004/0219261 A1 | 11/2004 | Triantafyllou Oste | |
| 2004/0258829 A1 | 12/2004 | Zheng | |
| 2005/0064080 A1 | 3/2005 | Creighton | |
| 2005/0089602 A1 | 4/2005 | Kvist et al. | |
| 2005/0106216 A1 | 5/2005 | Maurer et al. | |
| 2005/0181114 A1 | 8/2005 | Bruemmer | |
| 2005/0191400 A1 | 9/2005 | Satyavolu et al. | |
| 2005/0214347 A1 | 9/2005 | Astrup et al. | |
| 2005/0233051 A1 | 10/2005 | Shen | |
| 2005/0238777 A1 | 10/2005 | Klingeberg et al. | |
| 2005/0244563 A1 | 11/2005 | Cavalieri et al. | |
| 2005/0260305 A1 | 11/2005 | Adele et al. | |
| 2006/0008574 A1 | 1/2006 | Begli et al. | |
| 2006/0013940 A1 | 1/2006 | Mueller | |
| 2006/0093720 A1 | 5/2006 | Tatz | |
| 2006/0115573 A1 | 6/2006 | Singer et al. | |
| 2006/0121174 A1 | 6/2006 | Franke | |
| 2006/0134299 A1 | 6/2006 | Lahteenmaki | |
| 2006/0141097 A1 | 6/2006 | Guo | |
| 2006/0240148 A1 | 10/2006 | Nguyen et al. | |
| 2006/0251791 A1 | 11/2006 | Rubio | |
| 2006/0257548 A1 | 11/2006 | Crofskey | |
| 2006/0280838 A1 | 12/2006 | Kvist | |
| 2006/0286269 A1 | 12/2006 | Shah | |
| 2007/0014892 A1 | 1/2007 | Mitchell | |
| 2007/0026105 A1 | 2/2007 | Seo | |
| 2007/0059340 A1 | 3/2007 | Bello | |
| 2007/0071857 A1 | 3/2007 | Vemuganti | |
| 2007/0141218 A1 | 6/2007 | Chatel | |
| 2007/0154609 A1 | 7/2007 | Li | |
| 2007/0172568 A1 | 7/2007 | Spelman | |
| 2007/0178199 A1 | 8/2007 | Minor | |
| 2007/0184175 A1 | 8/2007 | Rubio | |
| 2007/0212472 A1 | 9/2007 | Hoelstein | |
| 2007/0243301 A1 | 10/2007 | Barnett | |
| 2007/0264400 A1 | 11/2007 | Milne | |
| 2007/0292583 A1 | 12/2007 | Haynes | |
| 2008/0003340 A1 | 1/2008 | Karwowski | |
| 2008/0008801 A1 | 1/2008 | Barnekow | |
| 2008/0098900 A1 | 5/2008 | Aremu | |
| 2008/0131582 A1 | 6/2008 | Karwowski | |
| 2008/0171114 A1 | 7/2008 | Castillo Rodriguez | |
| 2008/0260909 A1 | 10/2008 | Chung | |
| 2008/0305212 A1 | 12/2008 | Wong | |
| 2009/0053771 A1 | 2/2009 | Dale | |
| 2009/0148562 A1 | 6/2009 | Lin | |

(56) References Cited

U.S. PATENT DOCUMENTS

| | | |
|---|---|---|
| 2009/0181128 A1 | 7/2009 | Blumenthal |
| 2009/0221041 A1 | 9/2009 | Aux |
| 2009/0253191 A1 | 10/2009 | Ward |
| 2009/0311376 A1 | 12/2009 | Rao |
| 2010/0015306 A1 | 1/2010 | Peryra |
| 2010/0104718 A1 | 4/2010 | Durand |
| 2010/0112127 A1 | 5/2010 | Chatel |
| 2010/0112167 A1 | 5/2010 | Chatel |
| 2010/0178400 A1 | 7/2010 | Pereyra |
| 2010/0189870 A1 | 7/2010 | Frohberg |
| 2010/0316765 A1 | 12/2010 | French |
| 2011/0020523 A1 | 1/2011 | Pereyra |
| 2012/0082740 A1 | 4/2012 | Collins |
| 2012/0245111 A1 | 9/2012 | Hoebler |
| 2013/0017300 A1 | 1/2013 | Avila |
| 2013/0183405 A1 | 7/2013 | Chatel |
| 2013/0209610 A1 | 8/2013 | Carder |
| 2013/0170362 A1 | 9/2013 | Manning |
| 2013/0323799 A1 | 12/2013 | Takaha |
| 2014/0017356 A1 | 1/2014 | Te Biesebeke |
| 2014/0050819 A1 | 2/2014 | Chatel et al. |
| 2014/0087430 A1 | 3/2014 | Lee |
| 2014/0170723 A1 | 6/2014 | Dobson |
| 2014/0193563 A1 | 7/2014 | Carder |
| 2014/0193564 A1 | 7/2014 | Carder |
| 2015/0183821 A1 | 7/2015 | Konstantinov |
| 2015/0191758 A1 | 7/2015 | Larsen |
| 2015/0351432 A1 | 12/2015 | Triantafyllou |
| 2016/0185641 A1 | 6/2016 | Zuback |

FOREIGN PATENT DOCUMENTS

| | | |
|---|---|---|
| CA | 2015149 | 10/1990 |
| CN | 1386446 | 12/2002 |
| CN | 102224907 | 9/2012 |
| DE | 970141 | 8/1958 |
| EP | 0078782 B1 | 5/1983 |
| EP | 0231729 | 8/1987 |
| EP | 0312220 A1 | 4/1989 |
| EP | 0512249 A1 | 11/1992 |
| EP | 0634106 | 1/1995 |
| EP | 474230 | 3/1995 |
| EP | 0474230 B1 | 3/1995 |
| EP | 1723953 A2 | 11/2006 |
| EP | 1782697 A2 | 5/2007 |
| EP | 1872666 A1 | 1/2008 |
| EP | 2222831 | 5/2015 |
| FR | 2620906 | 3/1989 |
| GB | 1168692 | 10/1969 |
| JP | S63116657 | 5/1988 |
| JP | 2000004852 | 1/2000 |
| JP | 2002171920 | 6/2002 |
| JP | 2009207359 A | 9/2009 |
| JP | 2010051285 A | 3/2010 |
| RU | 2044503 C1 | 9/1995 |
| RU | 2161419 | 1/2001 |
| RU | 2199246 | 2/2003 |
| RU | 2233599 | 8/2004 |
| RU | 2237419 | 10/2004 |
| RU | 2244444 | 1/2005 |
| RU | 2287295 | 11/2006 |
| WO | 9210106 | 6/1992 |
| WO | 1993000826 A1 | 1/1993 |
| WO | 94/13826 | 6/1994 |
| WO | 9604799 | 2/1996 |
| WO | 2000030457 | 6/2000 |
| WO | 2003011052 | 2/2003 |
| WO | 2003090557 | 11/2003 |
| WO | 2004019701 | 3/2004 |
| WO | 2006009169 | 1/2006 |
| WO | 2007020059 | 2/2007 |
| WO | 2008028994 | 3/2008 |
| WO | 2008056360 | 5/2008 |
| WO | 2008096044 | 8/2008 |
| WO | 2008097619 A2 | 8/2008 |
| WO | 2008097620 A1 | 8/2008 |
| WO | 2009077659 | 6/2009 |
| WO | 2009109703 | 9/2009 |
| WO | 2009127687 | 10/2009 |
| WO | 2009158588 A1 | 12/2009 |
| WO | 2014160351 A1 | 10/2014 |
| WO | 2014177304 | 11/2014 |

OTHER PUBLICATIONS

Singh, Narpinder, et al., "A Comparison of Wheat Starch, Whole Wheat Meal and Oat Flour in the Extrusion Cooking Process," J. Food Engineering 34 (1997) 15-32 (18 pages).

Tapola, N., et al. "Glycemic responses of oat brain products in type 2 diabetic patients," Nutrition, Metabolism & Cardiovascular Diseases (2005) 15, 255-261 (7 pages).

Vasanthan, et al. "Dietary fiber profile of barley flour as affected by extrusion cooking," Food Chemistry 77 (2002) pp. 35-40 (6 pages).

Hao, L. Food Additives, 1st edition, p. 246-247, China Agricultural University Press, China, Aug. 2002.

Li, Z. et al. "Fermented Food Technology," China Metrology Publishing House, p. 141, 2012.

Zheng, B. "Food Enzymology," Southeast University Press, p. 132, 2006.

Jay, James, "Modern Food Microbiology", 7th Edition, pae 123 f., Springer Science+Business Media, Inc., 2005.

Polaina, Julio and MacCabe, Andrew, "Industrial Enzymes—Structure, Function, and Applications", Springer 2007, p. 1-34.

Berger, R. G., "Flavours and Fragrances—Chemistry, Bioprocessing and Sustainablitiy", Springer-Verlag Berlin Heidelberg, 2007, p. 464, p. 483.

Howling, D., "Mechanisms of Starch Enzymolysis", International Biodeterioration 25, 1989, p. 15-19.

Xiaoyan, Fu, "Optimization and comparison of the Solvent Extraction and Enzyme Assistant Extraction of Oat Phenols", Science and Technology of Food Industry, Dec. 31, 2012, vol. 33, No. 24, p. 277-281.

Encyclopedia of Food Sciences and Nutrition, 2003, 2nd ed., searched for "beta-glucan"—https://www.sciencedirect.com/topics/biochemistry-genetics-and-molecular-biology/beta-glucan (visited homepage on Aug. 16, 2018) (2 pages).

Hareland, G.A., "Evaluation of Flour Particle Size Distributionn by Laser Diffraction, Sieve Analysis and Near-infrared Reflectance Spectroscopy," 1994, vol. 20, Issue 2, Abstract (visited homepage on Aug. 17, 2018), (1 page).

Kent, James A., "Kent and Riegel's Handbook of Industrial Chemistry and Biotechnology," Springer Science+Business Media, LLC, 2007, vol. 1, 11th ed., pp. 1684-1685, (6 pages).

Reddy, Avanija, et al., "The pH of beverages in the United States," 2016, vol. 147, Issue 4, pp. 255-263, (10 pages). (This reference was not cited as prior art).

Srilakshmi, B., "Food Science," New Age International, 2003, 3rd ed., p. 269, (5 pages).

Kunert, Joachim, et al., (1999): "On the Triangle Test with Replication," Technical Report, No. 1999, 10, University of Dortmund, 18 pages.

Watts, et al., "Basic Sensory Methods for Food Evaluation," International Development Research Centre, 1989, 164 pages.

Office Action and Search Report issued in Russian Application No. 2018136069 dated Oct. 12, 2020.

Examination Report issued in Australian Application No. 2017237000 dated Aug. 31, 2020.

Examination Report issued in European Application No. 17771089.4 dated Sep. 28, 2020.

Anderson, et al. "Gelatinazation of corn grits by roll cooking, extrusion cooking and steaming," Staerke 22:130-135.

Anonymous: "Ovsena nahradka mlieka," XP002561727, URL:http://web.archive.org/web/20084200751 51/http://www.aspsk.sk/ovsene_mlieko.htm>, retrieved from the internet on Dec. 18, 2009, pp. 1-1, dated Apr. 20, 2008.

"Anonymous: ""Goldkill Instant Barley Drink"", XP002561728, URL:http:f/web.archive.org/web/20060303003347/goldkill. \ I com/goldkili_instant.php>, retrieved from the Internet on Dec. 28, 2009, pp. 1-2, dated Mar. 3, 2006".

(56) References Cited

OTHER PUBLICATIONS

Brenda, The comprehensive Enzyme Information System, BC 3.2.1.1.—alpha amylase; pp. 1 to 297; Retrieved from the internet: http://www.brenda-enzymes.info/php/result_flat.php4?ecno=3.2.1.1 &organism_list=,date unknown.
Changquing, et al, Study on the Extruding Production Method of Soluble Oats Fiber, vol. 28, No. 2, pp. 45-48, dated Mar. 20, 2002, with English Abstract.
Grenus, Food Product Design, Applications, Agglomerations, Jul. 10, 2014, Weeks Publishing Co., pp. 1-4, www.foodproductdesign.com/articles/2004/07/food-product-design-applications.
Gualberto, D.G. et al., Effect of extrusion processing on the soluble and insoluble fiber, and phytic acid contents of cereal brans, dated Sep. 28, 1997.
Gutkoski, L.C., et al., Effect of Extrusion Process Variables on Physical and Chemical Properties of Extruded Oat Products, Plant Foods for Human Nutrition, © 2000 Kluwer Academic Publishers, pp. 315-325, dated Dec. 31, 1999.
Inglett, G.E. et al., Oat beta-glucan-amylodextrin: Preliminary preparations and biological properties, plant Fd. For Human Nutrition, vol. 45, pp. 53-61, dated Jun. 5, 2012.
Linko Y Y et al: The effect of HTST-extrusion on retention of cereal alpha-amylase activity and on enzymatic hydrolisis of barley starch, Food Processing Systems, Applied Science Publ, UK, Jan. 1, 1980 (Jan. 1, 1980), pages Abstr, 4.2.25, 210-223, XP009127925, ISBN: 978-0-85334-896-2.
PCT Application No. PCT/US2008/060323 International Search Report and Written Opinion dated Aug. 13, 2008.
PCT Application No. PCT/US2009/060016 International Search Report dated Feb. 8, 2010.
PCT Application No. PCT/US2009/060016, International Preliminary Report on Patentability dated May 19, 2011.
PCT Application No. PCT/US2009/059916 International Search Report and Written Opinion dated Feb. 16, 2010.
PCT Application No. PCT/US2014/21913 International Search Report and Written Opinion dated Jun. 23, 2014.
PCT Application No. PCT/US2010/038506 International Search Report and Written Opinion dated Aug. 10, 2010.
PCT Application No. PCT/US2014/17288 International Search Report and Written Opinion dated Jun. 13, 2014.
PCT Application No. PCT/US2014/26367 International Search Report and Written Opinion dated Sep. 9, 2014.
Peter Koelln KGAA: Kochjule, Hafer-Getrank mit Fruchtsaft, XP002499645, Internet Citation, URL:http//www.koelin.de/downloads/37/Kochjule.pdf>, retrieved from the Internet on Oct. 14, 2008, pp. 1-19, dated Oct. 14, 2008, copy unavailable.
Peter Kolin KGAA: Kolln Schmelzflocken Dinkel-Hafer, XP002499438, Internet Citation, URL:http:f/www.koelln.de/produkte/2/103/index.html>, retrieved from the Internet on Oct. 13, 2008, p. 1, dated Oct. 13, 2008.
Peter Kolin KGAA: KollnFlocken Instant, XP002499437, Internet Citation, URL:http:/fwww.koelln.de/produkte/1/15/Index.html>, retrieved from the Internet on Oct. 13, 2008, p. 1, dated Oct. 13, 2008.
Vasanthan et al., Dextrinization of Starch in Barley Flurs with Thermostable alpha-Amylase by Extrusion Cooking, vol. 53, No. 12, pp. 616-622, dated Dec. 1, 2001.
Wang, Ming-chun, et al, Extrusion Technology Applied in the Nutritional Health Foods, College of Food Engineering & Biologic Technology, Tianjin University of Science and Technology, Tianjin 300457, pp. 63-66, dated Aug. 1, 2007, with English Abstract.
The Whole Grains Council, What are the Health Benefits?, http://wholegrainscouncil.org/whole-grains-101/what-are-the-health-benefits, 2 pages.
Zhang Haodong, "Starch Article Technology," Jilin Science and Technology Press, Feb. 29, 2008.
Davis, "The Effect of Cold on Micro-Organisms in Relation to Dairying," Express Dairy Co (London), Proceedigns of the Society for Applied Bacteriology, vol. 14, Issue 2, pp. 216-242, Oct. 1951.
Food Reference, About.com "Why Does Milk Curdle," http://foodreference.about.com/od/Dairy/a/Why-Does-Milk-Curdle.htm, pp. 1-2.
PCT Application No. PCT/US2012/046450 International Search Report and Written Opinion dated Sep. 9, 2012.
Springer New York, "Milk and Milk Products," Essentials of Food Science, Food Science Texts Series, pp. 237-269.
"Hoseney, R. Carl," "Principles of Cereal Science and Technology," "1986, American Association of Cereal Chemists, Inc., St. Paul Minnesota 55121,pp. 148-149 (4 pages)".

* cited by examiner

METHOD, APPARATUS, AND PRODUCT PROVIDING HYDROLYZED STARCH AND FIBER

BACKGROUND

Technical Field

The present invention relates to the hydrolysis of the starch and fiber in grains and/or pulses.

Background

Before the present invention, no one has developed a product comprising certain benefits of hydrolyzed starch and fiber (e.g., reduced viscosity and better mouthfeel), while also maintaining certain benefits of unhydrolyzed starch and fiber (e.g., benefits found in whole grains, whole pulses, or portions thereof).

SUMMARY OF THE INVENTION

In a first aspect, the invention provides a method comprising several steps. A first step comprises providing starting components comprising: a first enzyme; a second enzyme; water; and a starting composition. The starting composition comprises at least one material selected from the group consisting of at least a portion of grain and at least a portion of pulse, and the at least one material comprises starch and fiber. A second step comprises hydrolyzing the fiber in the at least one material through a fiber hydrolysis reaction. The fiber hydrolysis reaction is catalyzed by the first enzyme. A third step comprises hydrolyzing the starch in the at least one material through a starch hydrolysis reaction. The starch hydrolysis reaction is catalyzed by the second enzyme. A fourth step comprises deactivating the first enzyme. A fifth step comprises deactivating the second enzyme. The method provides a product composition.

In a second aspect, the invention provides a composition comprising at least one material selected from the group consisting of at least a portion of grain and at least a portion of pulse. The at least one material comprises hydrolyzed starch and hydrolyzed fiber. The hydrolyzed starch consists of starch molecules, and the average molecular weight of the hydrolyzed starch molecules in the composition is a first fraction of the molecular weight of unhydrolyzed starch molecules. The unyhdrolyzed starch molecules are equivalent in kind and condition to the gelatinized, hydrolyzed starch molecules, except that the gelatinized, unhydrolyzed starch molecules have not been hydrolyzed. The first fraction is no more than about 0.80. The hydrolyzed fiber consists of fiber molecules, and the average molecular weight of the hydrolyzed fiber molecules in the composition is a second fraction of the molecular weight of unhydrolyzed fiber molecules. The unhydrolyzed fiber molecules are equivalent in kind and condition to the hydrolyzed fiber molecules, except that the unhydrolyzed fiber molecules have not been hydrolyzed. The second fraction is no more than about 0.80.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
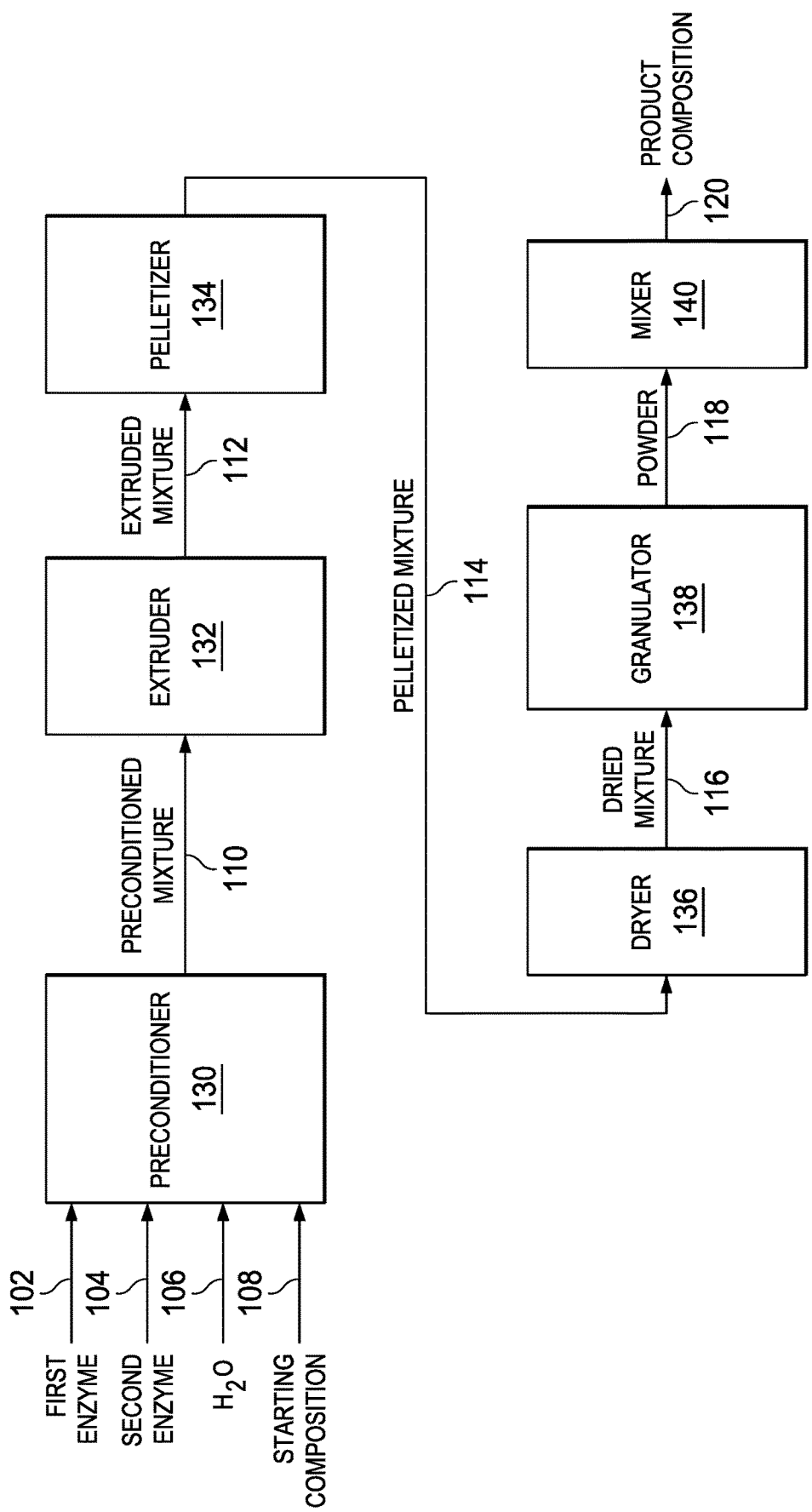
FIG. 1 is a block flow diagram illustrating one embodiment of the invention and depicting a method for providing a product composition.

Whole grain products (e.g., cereal grains such as whole grain oat flour or whole grain barley flour) and/or compositions comprising at least a portion of grain (e.g., bran) can deliver dietary fiber and other nutritive components that make them relatively wholesome and high in dietary fiber and/or nutrient delivery per unit mass (e.g., an ounce). Furthermore, when a product comprises sufficient amounts of certain components (e.g., soluble fiber and/or β-glucan from an approved source such as oat bran, rolled oats, whole oat flour, oatrim, whole grain barley, dry milled barely, barley betafiber, or psyllium), the product can qualify for a health claim as established by certain entities. An example of such a health claim is illustrated by 21 C.F.R. Section 101.81, which is incorporated by reference herein as an example. Like whole grain products, pulse products and/or products comprising at least a portion of pulse can provide consumers with desirable dietary fiber and nutritive components at a fairly high level per unit mass of the pulse product. For example, pulses can help provide a desired level of dietary fiber and/or protein quality to a product.

Furthermore, when combined, grain and pulse products can provide complimentary nutritive components. By way of illustration, oats can have a relatively higher amount of the amino acids methionine and cysteine, but a relatively lower amount of lysine. However, pulses can have a relatively higher amount of the amino acid lysine, but a relatively lower amount of methionine and cysteine. Accordingly, in some embodiments, by combining a grain and a pulse in a product, the overall quality of protein delivered by the product can be increased. In addition, both grains and pulses can provide a product with desirable increases in fiber.

Nonetheless, products with high fiber concentration can have a texture and mouthfeel that is undesirable for some consumers. For example, higher concentrations of insoluble and soluble fiber can increase the viscosity of a product or give the product an undesirable degree of sliminess. Additionally, high molecular weight insoluble fiber (e.g., greater than 1,000,000 Dalton) can make a product coarser or grittier in texture and can result in an undesirable mouthfeel. Moreover, particle size (e.g., increasing particle size) can also increase grittiness. Also, a high fiber concentration can impede absorption of water by a composition comprising the high fiber concentration.

The inventors, however, have discovered a process that, in some embodiments, provides at least a portion of grain and/or pulse product (e.g., whole grain and/or pulse product) with reduced viscosity, less sliminess, less coarseness, and/or better mouthfeel. Also, in some embodiments, the inventive process can reduce a potentially undesirable, thick, mouth-coating texture associated with some grain and/or pulse products while avoiding a reduction in desired characteristics (e.g., a relative mass concentration of fiber and/or a given nutritive component in the grain and/or pulse products).

Furthermore, the inventors have developed a process (e.g., an extrusion process) that, in some embodiments, provides for the controlled hydrolysis of starch and/or fiber, and, in some embodiments, results in more open starch and/or fiber molecular structure. For example, the more open molecular structure can provide better wettability, which can be useful for liquid and semi-solid products, (e.g., beverages, soup, ice cream, and yogurt). Wettability is a characterization of a tendency to get hydrated, for example, the rate at which macromolecular entities like starch and fiber are solvated. A more open molecular structure leads to fast penetration of water into matrices in the molecular structure, which leads to faster solvation of soluble fiber and starch. Accordingly, in some embodiments, the process developed by the inventors enables more (or the same) whole grain and/or pulse to be added to a product while providing the same (or better) viscosity, texture, and/or mouthfeel characteristics compared to adding unhydrolyzed whole grain.

Additionally, in some embodiments, hydrolysis of a grain and/or pulse in the extrusion process results in the grain and/or pulse absorbing less water relative to other hydrolysis processes, for example, wet processes. Since some embodiments, for example, powders, can comprise a drying step after the hydrolysis, it can be desirable to avoid water absorption. Furthermore, since higher moisture content can result in a faster hydrolysis reaction that is more difficult to control, some embodiments involving extrusion provide better control over the extent of hydrolysis of starch and/or fiber. This can, for example, help avoid the conversion of starch and/or fiber to monosaccharides and disaccharides, which can, in turn, help maintain a whole grain status or other desired characteristics.

As another potential benefit, in one embodiment, the invention provides for the simultaneous addition of an enzyme with optimal activity at lower temperatures (e.g., endo-cellulase) and an enzyme with optimal activity at higher temperatures (e.g., α-amylase, which is an endo-enzyme) to hydrolyze a composition (e.g., whole grain and/or pulse) that comprises starch and fiber. As an added advantage, in some embodiments, the invention enables the hydrolysis of both the starch and the fiber to occur in a span of no more than about 5 minutes.

In one embodiment, the invention provides a reduced temperature for preconditioning a composition for α-amylase-catalyzed hydrolysis. For example, the temperature can be reduced relative to the temperature at which most α-amylase enzymes are active. This can, in turn, make it easier to combine α-amylase-catalyzed starch hydrolysis with cellulase-catalyzed fiber hydrolysis.

As another potential advantage, in some embodiments, the invention provides for a continuous process (e.g., a continuous extrusion process) for hydrolyzing starch and fiber. For example, in some embodiments, the continuous process provides a greater production rate in comparison to a batch process. In some embodiments, the continuous process is easier to control than a batch process.

Additionally, in some embodiments, the invention provides better control over the fiber and/or starch hydrolysis reaction when compared to the degree of control provided by alternative processes. For example, if the percent conversion or completion of the hydrolysis reaction is not high enough, the reaction can result in insufficient reduction of viscosity or certain undesirable properties such as grittiness. On the other hand, if the percent conversion is too high, all the starch and/or fiber can be converted to monosaccharides and/or disaccharides and certain nutritional or fiber-related benefits can be lost.

Accordingly, in some embodiments, the invention provides for hydrolysis to occur in a preconditioner and/or extruder rather than a large vessel or a vessel filled with water. For example, in some embodiments, it is easier to control the temperature throughout a preconditioner and extruder than it is to control the temperature throughout a large vessel. Furthermore, temperature can be important because, in some embodiments, as temperature increases, the speed of a starch and/or fiber hydrolysis reaction increases, and as temperature decreases the speed of the starch and/or fiber hydrolysis reaction decreases. As another example, in some embodiments, it is easier to control the rate of fiber and/or starch hydrolysis in a preconditioner and/or an extruder because, in comparison to hydrolysis in a vessel filled with water, the preconditioner and/or extruder provide for the hydrolysis to occur at a relatively lower water concentration, which results in a relatively slower rate of hydrolysis.

Further, in some embodiments, the extruder and/or preconditioner comprises a modified screw design with forward and reverse blocks that provide for a greater residence time in the extruder and can provide a greater degree of hydrolysis for a fixed extruder length and screw speed. Additionally, in some embodiments, the extruder and/or preconditioner consists of paddles on a shaft. The paddles can have different angles, which can be used to adjust residence time in the extruder and/or preconditioner. In some embodiments, paddles in the extruder and/or preconditioner are mostly or completely equipped with a forward-conveying orientation to reduce residence time in the extruder and/or preconditioner. Although, in some embodiments, paddles (e.g., for kneading) can be oriented in a neutral- or reverse-conveying pattern to increase residence time in the extruder and/or preconditioner.

Also, in some embodiments, the inventors use endo-enzymes rather than exo-enzymes to avoid converting the starch and/or fiber to monosaccharides and/or disaccharides. For example, some enzyme compositions that can be used to catalyze fiber and/or starch hydrolysis include exo-enzymes and endo-enzymes. However, if the exo-enzymes are present at too high a concentration, it can be more difficult to control the extent of hydrolysis of starch and fiber. For example, enzyme compositions comprising both exo- and endo-enzymes can hydrolyze starches and fibers to monosaccharides and disaccharides rather than smaller starch or fiber molecules. For some embodiments, this is undesirable and results in an unacceptable change in the mass ratio of starches to other components. For example, this could result in a loss of mass of certain desired fiber and/or nutritive components.

Accordingly, in some embodiments, a reduction in viscosity of a product composition (relative to a composition with unhydrolyzed fiber and/or gelatinized, unhydrolyzed starch) is achieved by the controlled molecular weight reduction of starch and fiber so that the resulting product is still whole grain and/or pulse. Examples of fiber include beta-glucan (soluble and insoluble fiber), cellulosic fiber (insoluble fiber), or any combination thereof. Examples of a whole grain and/or pulse with hydrolyzed starch and/or hydrolyzed fiber include whole grain and/or pulse after hydrolysis with the same relative mass ratios of certain components (e.g., starch, fiber, protein, fat, and sugar) as the native whole grain and/or pulse before hydrolysis.

As another example, in some embodiments, a whole grain comprises fiber and/or the starch, and the whole grain maintains whole grain status after hydrolyzing the fiber and/or the starch. For example, in some embodiments, a whole grain maintains its standard of identity as whole grain throughout processing (e.g., hydrolysis, pelletizing, drying, and/or granulating). As an illustration of a whole grain, according to the American Association of Cereal Chemists International (AACCI) "[w]hole grains shall consist of the intact, ground, cracked or flaked caryopsis, whose principal anatomical components—the starchy endosperm, germ and bran—are present in the same relative proportions as they exist in the intact caryopsis."

Accordingly, in some embodiments, a composition comprising the fiber and/or the starch is a whole grain composition comprising caryopses. For example, in some embodiments, the whole grain can comprise the fiber and/or the starch. Additionally, in some embodiments, the principal anatomical components of the caryopses (i.e., the starchy endosperm, germ, and bran) are present in the same relative mass ratios both before and after hydrolyzing the fiber and/or hydrolyzing the starch. Also, in some embodiments, the principal anatomical components of the caryopses are present in the same relative mass ratios in the caryopses both after harvesting when the caryopses are intact and after hydrolyzing the fiber and/or hydrolyzing the starch in the caryopses.

Further, in some embodiments, if the principal nutrients (i.e., starch, fat, protein, dietary fiber, beta-glucan, and sugar) are present in approximately the same relative proportions for a composition comprising grain before and after hydrolyzing the grain, it can be assumed that the processed grain (e.g., the hydrolyzed grain or the grain in which the fiber and/or the starch has been hydrolyzed) maintains its whole grain status. Also, since the average molecular weight of starch (e.g., amylopectin) in whole grains varies widely across the various types of whole grains (1-400 million Dalton) and even among whole grain oat products, a shift in starch moieties from higher molecular weight to lower molecular weight does not alter whole grain status if the total starch content remains the same or substantially the same (e.g., depending on the circumstances and naturally occurring variations, within +/−5, 3, 2, or 1 wt. % on a dry-total-weight basis). Likewise, since the average molecular weight of fiber in whole grains varies widely across the various types of whole grains and even among whole grain oat products, a shift in fiber moieties from higher molecular weight to lower molecular weight does not alter whole grain status if the total fiber content remains the same or substantially the same (e.g., depending on the circumstances and naturally occurring variations, within +/−5, 3, 2, or 1 wt. % on a dry-total-weight basis). As an example, in one experiment, the molecular weight of one type of dietary fiber, arabinoxylan, was detected in whole grain rye flour with molecular weights ranging from $4 \times 10^4$ to $9 \times 10^6$ Dalton and averaging $2 \times 10^6$ Dalton. See J. Agric. Food Chem., 2009, 57 (5), pp. 2004-2008, Content and Molecular-Weight Distribution of Dietary Fiber Components in Whole-Grain Rye Flour and Bread.

Additionally, even in a selected variety of grain, variations occur in relative mass ratios of the principal nutrients in the grain (i.e., starch, fat, protein, dietary fiber, beta-glucan, and sugar). Accordingly, in some embodiments, the change in relative mass ratios of the principal nutrients due to hydrolyzing the fiber, hydrolyzing the starch, and/or other processing is small enough that the relative mass ratios are still within the natural ranges for the variety of grain, thereby maintaining whole grain status.

Furthermore, in some embodiments, while hydrolyzing the fiber and/or hydrolyzing the starch, the changes in the total-dry-weight basis (e.g., excluding water) weight percentages of the starch, fat, protein, dietary fiber, beta-glucan, sugar, and/or some combination thereof in a composition comprising the fiber and/or the starch are no more than about 10, 9, 8, 7, 6, 5, 4, 3, 2, or 1 wt. % on a total-dry-weight-basis. Although specific ranges are listed, as with the other ranges given herein, a skilled person with the benefit of this disclosure would also understand that additional ranges can be formed from values that are contained within the listed ranges and are considered to provide additional embodiments.

Figure 2:
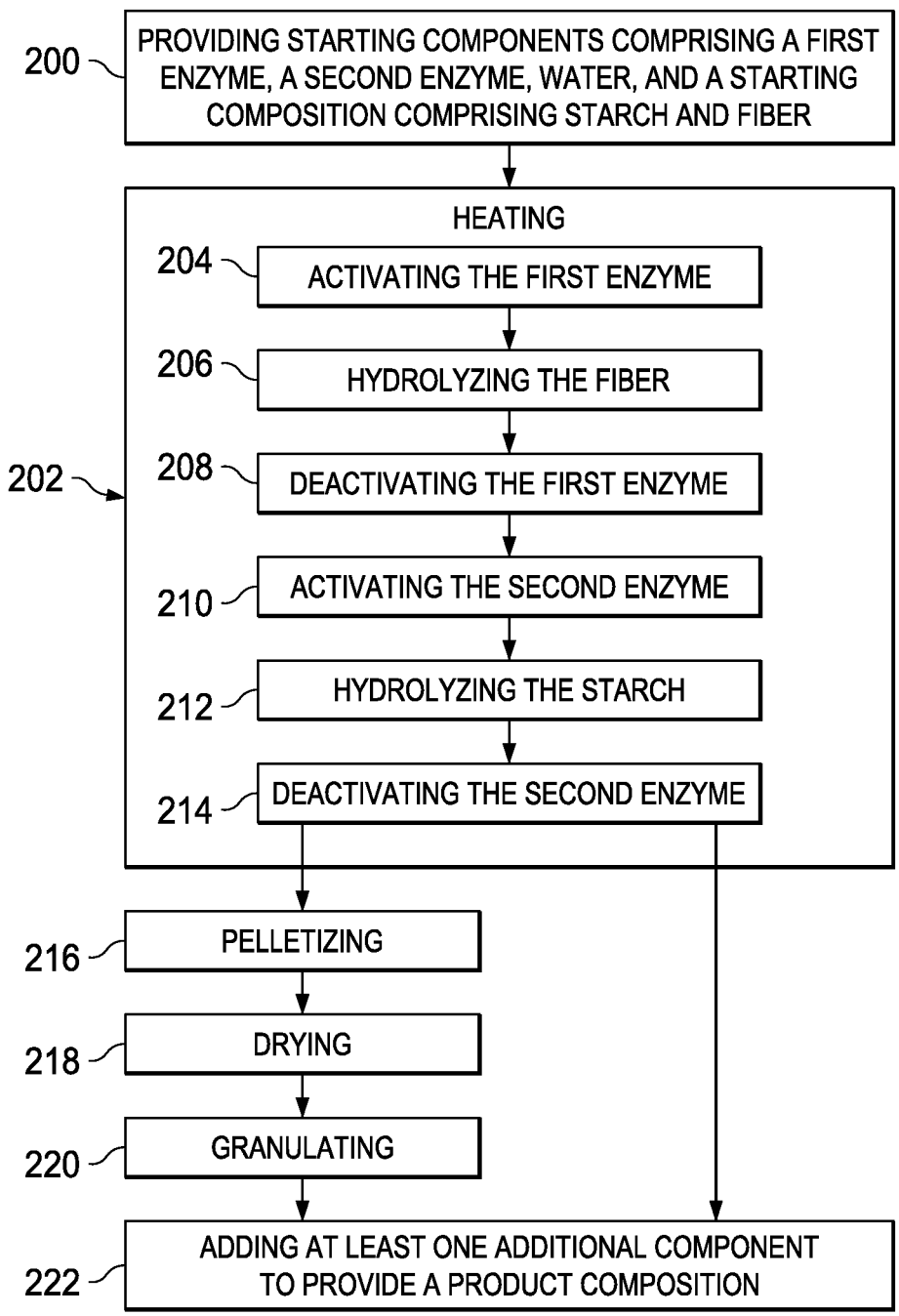
FIG. 2 is a schematic flow chart illustrating one embodiment of the invention and depicting a method for providing a product composition by hydrolyzing fiber and starch.

An embodiment of the invention will now be described with reference to the flow chart of FIG. 2, which illustrates a method. As an initial matter, it should be understood that the order of steps appearing in FIG. 2 can be modified, and rearranged to form additional embodiments. For example, the order of steps appearing in FIG. 2 provide one embodiment of the invention. However, before discussing that illustrative embodiment, FIG. 2 will be referenced generally to discuss a method with selected steps arranged in a different order than that explicitly appearing in FIG. 2. First, in a providing step 200, starting components comprising first enzyme 102 (e.g., fiber-hydrolysis-catalyzing enzyme 516 or starch-hydrolysis-catalyzing enzyme 416), second enzyme 104 (e.g., fiber-hydrolysis-catalyzing enzyme 516 or starch-hydrolysis-catalyzing enzyme 416), water 106 (e.g., liquid water and steam), and a starting composition 108 are provided. In one embodiment, the starting composition 108 comprises at least one material selected from the group consisting of at least a portion of grain and at least a portion of pulse. In one embodiment, the at least one material comprises starch 402 and fiber 502.

Second, in a fiber-hydrolyzing step 206, the fiber 502 in the at least one material is hydrolyzed through a fiber hydrolysis reaction 500 catalyzed by the first enzyme 102.

Third, in a starch-hydrolyzing step 212, the starch 402 in the at least one material is hydrolyzed through a starch hydrolysis reaction 400 catalyzed by the second enzyme 104.

Fourth, in a first-enzyme-deactivating step 208, the first enzyme 102 is deactivated.

Fifth, in a second-enzyme-deactivating step 214, the second enzyme 104 is deactivated.

In some embodiments, the fiber-hydrolyzing step comprises adding endo-cellulase in an amount that provides about 30-200, about 100-130, or about 115 International Units (IU) of enzyme activity per gram of fiber. As used in this context, one IU is the amount of enzyme that will release 1 μmol per minute of reducing sugar from a composition comprising 1 wt. % carboxy-methyl cellulose (CMC) and a 99 wt. % solution of water and acid with a pH of 5, a temperature of 40° C. (104° F.) and a pressure of 1 atm. For example, citric acid can be added to provide the desired pH and to act as a buffer.

In some embodiments, the starch-hydrolyzing step comprises adding α-amylase to provide about 600-3100, about 1700-2000, or about 1,850 Modified Wohlgemuth Units (MWU) of enzyme activity per gram of starch. As used in this context, one MWU is the amount of enzyme activity that will dextrinize 1 milligram (mg) of soluble starch to specified dextrins in 30 minutes under specified conditions. The specified dextrins and specified conditions are according to Valley Research Assay No. 511.003, available from Valley Research, Inc. of South Bend, Ind., US, which was acquired by Royal DSM N. V. of Herleen, the Netherlands.

Furthermore, some embodiments of the invention comprise additional or alternative steps. Several of these additional or alternative steps will now be described with reference to an exemplary embodiment illustrated in FIG. 2. First, in a providing step 200, starting components comprising first enzyme 102, second enzyme 104, water 106, and a starting composition 108 are provided. In one embodiment, the starting composition 108 comprises at least one material selected from the group consisting of at least a portion of grain and at least a portion of pulse. In one embodiment, the at least one material comprises starch 402 and fiber 502.

Figure 4:
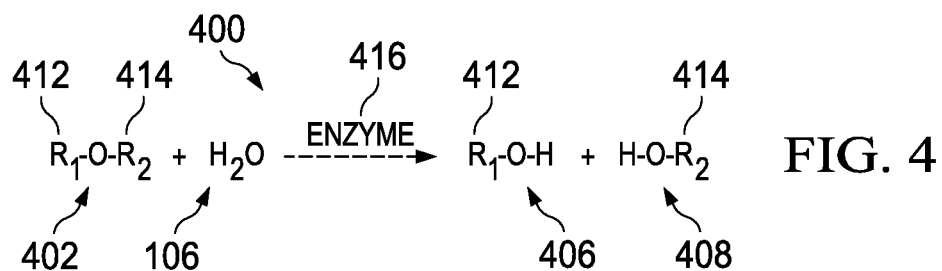
FIG. 4 is a chemical equation illustrating one embodiment of the invention comprising a starch hydrolysis reaction.
Figure 5:
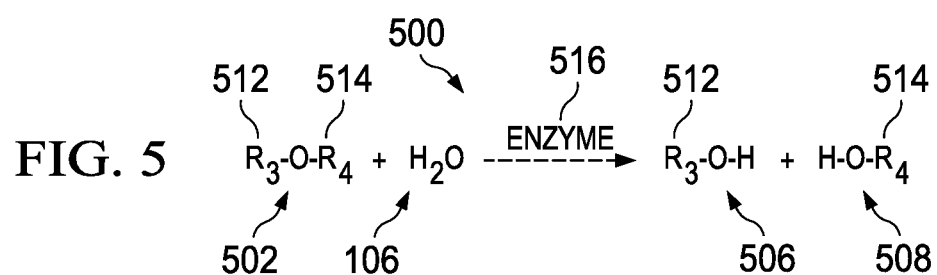
FIG. 5 is a chemical equation illustrating one embodiment of the invention comprising a fiber hydrolysis reaction.

Second, in a heating step 202, the starting components are hydrolyzed to provide a hydrolyzed mixture (e.g., comprising hydrolyzed starch and/or hydrolyzed fiber), which can also be an extruded mixture 112. For example, the heating can be used to activate and then deactivate the fiber hydrolysis reaction 500 and/or starch hydrolysis reaction 400, which are illustrated in FIG. 4 and FIG. 5.

Third, in an optional pelletizing step 216, the hydrolyzed mixture is pelletized (e.g., in a pelletizer 134) to provide a pelletized mixture 114.

Fourth, in an optional drying step 218, the pelletized mixture 114 is dried (e.g., in a dryer 136) to provide a dried mixture 116.

Fifth, in an optional granulating step 220 (e.g., grinding, crushing, or milling step), the dried mixture 116 is ground (e.g., milled) to provide a powder 118 (e.g., flour), which is a hydrolyzed powder 118 in the sense that it comprises hydrolyzed starch and/or hydrolyzed fiber. For example, the dried mixture 116 can be granulated in a granulator 138 (e.g., ground in a grinder or milled in a mill).

Sixth, in an optional adding step 222, at least one additional component (e.g., ingredient) can be added (e.g., in a mixer 140) to the hydrolyzed powder 118 or the hydrolyzed mixture (for example, to provide a food or beverage).

In some embodiments, the invention provides for hydrolyzing starch and fiber in a whole grain while maintaining whole grain status. For example, this can be useful to provide health or nutritional benefits associated with whole grain status.

In some embodiments, the first enzyme 102 is a fiber-hydrolysis-catalyzing enzyme 516. In some embodiments, the enzyme is an endo-enzyme, for example, hydrolyzing inner chemical bonds rather than outer chemical bonds of a fiber molecule. In some embodiments, the fiber-hydrolysis-catalyzing enzyme 516 can be a fibrolytic enzyme, endo-glucanase, endo-cellulase, endo-beta-glucanase, or some combination thereof. Further, in some embodiments, the first enzyme 102 is provided in the starting components by providing an endo-cellulase composition. For example, the endo-cellulase composition can be sufficiently pure endo-cellulase so that the endo-cellulase composition is free from detectable levels of exo-activity (e.g., exo-cellulase activity). In some embodiments, the endo-cellulase composition does not comprise (e.g., within detectable limits) β-amylase (which is an exo-enzyme), exo-cellulase, or a combination of both. As an example, in some embodiments, endo-cellulase from Novozymes of Franklinton, N., U.S. is sufficiently free of β-amylase contamination to avoid production of monosaccharides and disaccharides. As another example, in some embodiments, β-amylase from DSM of Parsippany, N.J., U.S. is sufficiently free of β-amylase contamination to avoid production of monosaccharides and disaccharides.

In some embodiments, the first enzyme 102 is an endo-glucanase, and the endo-glucanase is an endo-cellulase or an endo-beta-glucanase. In some embodiments, the first enzyme 102 is provided in an amount sufficient to provide a mass ratio of the endo-cellulase to total dietary fiber equal to at least about 0.05 or 0.055, or equal to about 0.04-0.08, 0.05-0.07, 0.055 to 0.065 or any range contained within the listed ranges. The endo-cellulase and/or endo-beta-glucanase can be a relatively low temperature enzyme (e.g., having an optimum activity at about 122° F. (50° C.) to about 140° F. (60° C.).

In some embodiments, the second enzyme 104 is a starch-hydrolysis-catalyzing enzyme 416 (e.g., α-amylase molecule). In some embodiments, the second enzyme 104 is an endo-enzyme, for example, hydrolyzing inner chemical bonds rather than outer chemical bonds of a starch molecule. In some embodiments, the second enzyme 104 is a relatively high temperature enzyme. In some embodiments, the second enzyme 104 is provided in an amount sufficient to provide a mass ratio of the second enzyme 104 to the starch 402 equal to at least about 0.0025 or 0.0027, or equal to about 0.0025-0.0033, 0.0026-0.032, 0.00027 to 0.0031 or any range contained within the listed ranges.

In some embodiments, both the first enzyme 102 (e.g., endo-cellulase) and the second enzyme 104 (α-amylase) have some, though not necessarily optimal, activity at around 175° F. (79.44° C.).

In some embodiments, the starting composition 108 (e.g., the fiber 502 in the starting composition 108) comprises beta-glucan. Furthermore, in some embodiments, the first enzyme 102 reduces the molecular weight of the beta-glucan in the starting composition 108 to provide beta-glucan in the product composition 120 with an average molecular weight from about $0.50 \times 10^6$-$1.35 \times 10^6$, $0.60 \times 10^6$-$1.30 \times 10^6$, $0.60 \times 10^6$-$1.20 \times 10^6$, $0.60 \times 10^6$-$1.10 \times 10^6$, or $0.60 \times 10^6$-$1.00 \times 10^6$, or any range contained within the listed ranges. For example, molecular weight can be reduced by hydrolyzing the fiber 502 in a fiber hydrolysis reaction 500.

In some embodiments, the method provides a product composition that comprises, consists essentially of, or consists of whole grain. Furthermore, some embodiments provide hydrolyzed products (e.g., hydrolyzed starch molecules and/or hydrolyzed fiber molecules) that have reduced molecular weight relative to the fiber and/or the starch while remaining the same type of molecule (e.g., remaining fiber and/or starch, as applicable).

In some embodiments, the starting composition 108 (e.g., the fiber 502 in the starting composition 108) comprises cellulose. Furthermore, in some embodiments, the first enzyme 102 reduces the molecular weight of the cellulose in the starting composition 108 (or in the fiber 502) to provide cellulose in the product composition 120 with a reduced average molecular weight.

In some embodiments, the heating step 202 comprises six subsidiary steps: first, a first-enzyme-activating step 204, second, a fiber-hydrolyzing step 206, third, a first-enzyme-deactivating step 208, fourth, a second-enzyme-activating step 210, fifth a starch-hydrolyzing step 212, and sixth, a second-enzyme-deactivating step 214. In some embodiments the first-enzyme-activating step 204 comprises activating the first enzyme 102 to hydrolyze the fiber 502 in the at least one material. In some embodiments, the first enzyme 102 (e.g., the enzyme catalyzing fiber hydrolysis) is activated when the starting components have a temperature of at least about 77° F. (25° C.) and a moisture content of at least about 20 wt. % water. Furthermore, although in some embodiments the starting components comprise the second enzyme 104, the starting components need not comprise the second enzyme 104 to activate the first enzyme 102. Instead, for example, in some embodiments, the first enzyme 102 is activated as long as the specified temperature and moisture content are achieved. Additionally, in some embodiments, the heating step 202 provides an extruded mixture 112, which can, for example, be a product composition 120.

In some embodiments, the fiber-hydrolyzing step 206 comprises hydrolyzing the fiber 502 in the at least one material (e.g., in a hydrolysis reaction catalyzed by the first enzyme 102). In some embodiments, the fiber-hydrolyzing step 206 begins (e.g., substantially or completely) upon activating the first enzyme 102 (e.g., heating the first enzyme). As an illustration, although a negligible amount of fiber hydrolysis can occur when fiber 502 is in the presence of water 106, or when fiber 502 is in the presence of a fiber-hydrolysis-catalyzing enzyme 516 and water 106, the rate of the fiber hydrolysis reaction 500 can be slower than commercially desirable, and can require large (and expensive) quantities of enzyme or long residence times. However, in one embodiment, once the fiber-hydrolysis-catalyzing enzyme 516 is activated, it provides a fiber hydrolysis reaction 500 rate that is commercially acceptable.

In some embodiments, the first-enzyme-deactivating step 208 comprises deactivating the first enzyme 102. For example, the first enzyme 102 can be deactivated by heating the first enzyme 102 at a first enzyme deactivating temperature equal to at least about 180° F. (82.22° C.). For example, in some embodiments, the first enzyme 102 can be heated to denature the first enzyme 102, thereby deactivating the first enzyme 102. Additionally, in some embodiments, the fiber-hydrolyzing step 206 substantially ends upon deactivating the first enzyme 102. Although the amount of time spent at a given temperature also contributes to enzyme deactivation, for at least some low-temperature endo-cellulase, heating to about 180° F. (82.22° C.) almost instantly deactivates the enzyme.

In some embodiments the second-enzyme-activating step 210 comprises activating the second enzyme 104 (e.g., heating the second enzyme) to hydrolyze the starch 402 in the at least one material. In some embodiments, the second enzyme 104 (e.g., the enzyme catalyzing starch hydrolysis) is activated when the starting components have a temperature from about 194° F. (90° C.) to about 230° F. (110° C.) and a moisture content of at least about 20 wt. % water. In some embodiments, the second enzyme (e.g., the enzyme catalyzing hydrolysis) has optimum activity at about 212° F. (100° C.). Furthermore, although in some embodiments the starting components comprise the first enzyme 102, the starting components need not comprise the first enzyme 102 to activate the second enzyme 104. Instead, for example, in some embodiments, the second enzyme 104 is activated as long as the specified temperature and moisture content are achieved.

In some embodiments, fiber hydrolysis catalyzed by endo-glucanase is followed by an almost simultaneous deactivation of the endo-glucanase and activation of α-amylase to hydrolyze starch 402. Then, the α-amylase is deactivated as well (e.g., at a temperature equal to at least about 282° F. (138.89° C.) for about 10 to 15 seconds, or at a temperature above about 194° F. (90° C.) for about 1 minute), to provide a product composition 120.

In some embodiments, the starch-hydrolyzing step 212 comprises hydrolyzing the starch 402 in the at least one material (e.g., in a hydrolysis reaction catalyzed by the second enzyme 104). In some embodiments, the starch-hydrolyzing step 212 begins (e.g., substantially or completely) upon activating the second enzyme 104. As an illustration, although a negligible amount of starch hydrolysis can occur when starch 402 is in the presence of water 106, or when starch 402 is in the presence of a second enzyme 104 and water 106, the rate of the starch hydrolysis reaction 400 can be slower than commercially desirable, and can require large (and expensive) quantities of enzyme or long residence times. However, in one embodiment, once the second enzyme 104 is activated, it provides a starch hydrolysis reaction rate that is commercially acceptable.

In some embodiments, the second-enzyme-deactivating step 214 comprises deactivating the second enzyme 104. For example, the second enzyme 104 can be deactivated by heating the second enzyme 104 to a second enzyme deactivating temperature. For example, in some embodiments, the second enzyme 104 can be heated to denature the second enzyme 104, thereby deactivating the second enzyme 104. As an illustration, for α-amylase, the second enzyme deactivating temperature is equal to at least about 280° F. Additionally, in some embodiments, the starch-hydrolyzing step 212 substantially ends upon deactivating the second enzyme 104.

Figure 3:
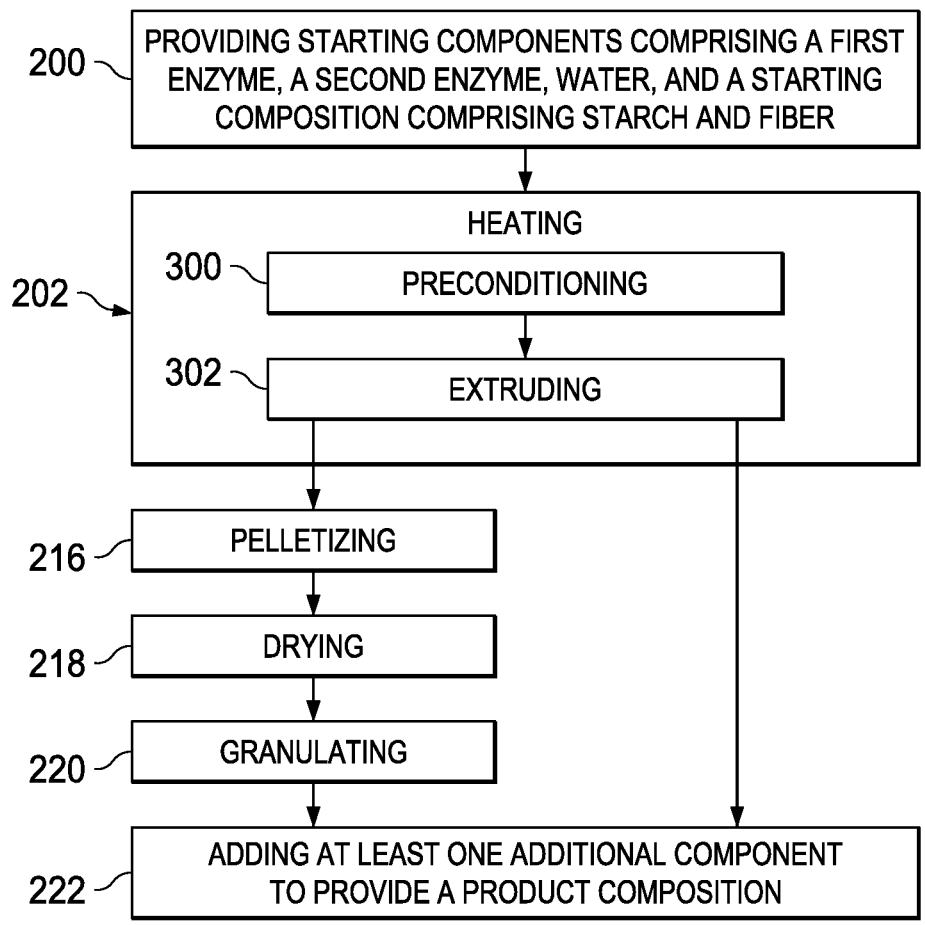
FIG. 3 is a schematic flow chart illustrating one embodiment of the invention and depicting a method for providing a product composition using preconditioning and extruding.

Another embodiment of the invention will now be described with reference to FIG. 3, which shows a flow chart comprising steps for a method. First, in a providing step 200, starting components comprising the first enzyme 102, second enzyme 104, water 106, and a starting composition 108 are provided. This providing step 200 can be the same as the providing step 200 described with reference to FIG. 2.

Second, in a heating step 202, the starting components are hydrolyzed to provide a hydrolyzed mixture (e.g., comprising hydrolyzed starch and/or hydrolyzed fiber), which can also be an extruded mixture 112. This heating step 202 can be the same as the heating step 202 described with reference to FIG. 2.

Third, in an optional pelletizing step 216, the hydrolyzed mixture is pelletized to provide a pelletized mixture 114.

Fourth, in an optional drying step 218, the pelletized mixture 114 is dried to provide a dried mixture 116.

Fifth, in an optional granulating step 220 (e.g., grinding, crushing, or milling step), the dried mixture 116 is ground (e.g., milled) into a powder 118 (e.g., flour), which is a hydrolyzed powder 118 in the sense that it comprises hydrolyzed starch and/or hydrolyzed fiber.

Sixth, in an optional adding step 222, at least one additional component can be added to the hydrolyzed powder 118 or the hydrolyzed mixture (e.g., the extruded mixture 112), for example, to provide a product composition 120. In some embodiments, the product composition 120 is a food or beverage.

The pelletizing step 216, drying step 218, granulating step 220 (e.g., grinding, crushing, or milling step), and adding step 222 can be the same as the pelletizing step 216, drying step 218, granulating step 220 (e.g., grinding, crushing, or milling step), and adding step 222 described with reference to FIG. 2.

In some embodiments, the heating step 202 comprises several subsidiary heating steps. For example, first, in a preconditioning step 300, the starting components are preconditioned by combining the first enzyme 102, the second enzyme 104, the water 106, and the starting composition 108 in a preconditioner 130, thereby providing a preconditioned mixture 110. Second, in an extruding step 302, the preconditioned mixture 110 is extruded (e.g., continuously extruded through an extruder 132), thereby providing an extruded mixture 112. For example, the extruding step 302 can comprise extruding the starting composition 108, the second enzyme 104 and the first enzyme 102, thereby providing an extruded mixture 112. In some embodiments, the extruded mixture 112 is a product composition 120.

As another example, in some embodiments, the extruding step 302 occurs in an extruder 132 comprising forward blocks of conveyors (e.g., augers or shafts with paddles) and reverse blocks of the conveyors (e.g., augers or shafts with paddles). For example, in some embodiments, the extruder 132 has modified screw design comprising reverse blocks of screws to push material backwards in addition to forward blocks of screws to push material forward. For example, this can increase residence time of enzymes (e.g., the first enzyme 102 and/or the second enzyme 104) in the barrel. The size and speed of the conveyors can be varied based on type to deliver a desired degree of mixing and conveying speed.

In some embodiments, the preconditioned mixture 110 is heated to activate the first enzyme 102, deactivate the first enzyme 102, activate the second enzyme 104, and deactivate the second enzyme 104.

In some embodiments, it can be desirable to activate the first enzyme 102 (e.g., endo-glucanase or endo-cellulase) at a first activation temperature and then activate the second enzyme 104 (e.g., α-amylase) at a second activation temperature that is higher than the first activation temperature. Accordingly, in some embodiments, a composition comprising the fiber 502, the starch 402, the first enzyme 102, and the second enzyme 104 is heated from a pre-activation temperature to the first activation temperature (e.g., wet mix temperature), and from the first activation temperature to the second activation temperature.

Furthermore, in some embodiments, a first deactivation temperature of the first enzyme 102 is higher than the first activation temperature and the second deactivation temperature of the second enzyme 104 is higher than the second activation temperature. Additionally, in some embodiments, when the first enzyme 102 is added to a composition comprising the fiber 502 and/or the starch 402, the composition is already at the first activation temperature, which can be the wet mix temperature. Similarly, in some embodiments, when the second enzyme 104 is added to a composition comprising the first and/or the second reagent, the composition is already at the second activation temperature, which can be the wet mix temperature.

In some embodiments, the first enzyme 102 is endo-glucanase.

In some embodiments, the first enzyme 102 is endo-cellulase. Further, in some embodiments, the deactivation temperature is at least about 180° F. (82.22° C.). In some embodiments, a composition is maintained at the deactivation temperature for a time sufficient to achieve deactivation. For example, a temperature of at least about 180° F. (82.22° C.) deactivates endo-cellulase in no more than about 1 minute.

In some embodiments, the second enzyme 104 is α-amylase. Further, in some embodiments, the deactivation temperature is at least about 194° F. (90° C.). In some embodiments, a composition is maintained at the deactivation temperature for a time sufficient to achieve deactivation. For example, a temperature of at least about 194° F. (90° C.) deactivates thermostable (or high temperature) α-amylase in no more than about 1 minute.

In some embodiments, if high temperature inactivation is undesirable, deactivating an enzyme (e.g., α-amylase) can comprise adding an acid (e.g., hydrochloric acid, sulfuric acid), to lower the pH of the composition comprising an enzyme. For example, at a pH of 5.0 and 90° C. (194° F.) or at a pH of 3.5-4.0 and 80-85° C. (176-185° F.), α-amylase can be deactivated in about 15 minutes. In some embodiments, after deactivating the enzyme, the composition comprising the enzyme is provided with a pH closer to neutral by adding a base or buffering component (e.g., sodium carbonate, calcium carbonate).

In some embodiments, the heating step 202 occurs while extruding the preconditioned mixture 110 (e.g., with a jacket on an extruder barrel of an extruder 132 and/or frictional heat generated by an extruder 132) to provide an extruded mixture 112. Further, in some embodiments, upon termination of the extruding (e.g., at the exit of an extruder barrel of an extruder 132), the extruded mixture 112 is provided at a post-extrusion temperature from about 134° C. (274° F.) to about 146° C. (294° F.), about 137° C. (279° F.) to about 143° C. (289° F.), or about 140° C. (60.0° F.).

In some embodiments, the preconditioned mixture 110 is provided with a wet mix temperature from about 54.4° C. (130° F.) to about 76.7° C. (170° F.), or about 60.0° C. (140° F.) to about 71.1° C. (160° F.), or about 62.8° C. (145° F.). Also, in some embodiments, the preconditioned mixture 110 is provided with a selected weight percentage of water 106, for example, about 28 wt. % to about 37 wt. %, or about 30 wt. % to about 34 wt. %, or about 32 wt. %. Further, in some embodiments, the preconditioning comprises conveying and agitating the starting components with screws in the preconditioner 130 to provide the preconditioned mixture 110. In some embodiments, the preconditioner 130 is a mixer. In some embodiments, the water 106 in the preconditioned mixture 110 comes from both liquid water and steam. For example, steam and/or liquid water can be added during the preconditioning step 300 to provide a desired wet mix temperature and a selected weight percentage of water 106.

In some embodiments, the wet mix temperature is the temperature of a mixture (e.g., an enzyme, water, and at least one material comprising hydrolyzed starch and/or hydrolyzed fiber) fed to a hydrolysis reactor. For example, this can be a temperature provided by the preconditioner.

Additionally, in some embodiments, the preconditioning step 300 comprises the first-enzyme-activating step 204 and at least a portion of the fiber-hydrolyzing step 206 described with reference to FIG. 2. Furthermore, in some embodiments, the extruding step 302 comprises the first-enzyme-deactivating step 208, the second-enzyme-activating step 210, the starch-hydrolyzing step 212, and the second-enzyme-deactivating step 214 described with reference to FIG. 2.

In some embodiments, the starch hydrolysis reaction 400 and the fiber hydrolysis reaction 500 occur (e.g., partially, substantially, or completely) during the extruding step 302.

In some embodiments, the fiber hydrolysis reaction 500 occurs during the preconditioning. For example, in some embodiments, the fiber hydrolysis reaction 500 (e.g., the first enzyme-catalyzed fiber hydrolysis reaction 500) begins (e.g., begins substantially or proceeds at a non-negligible rate) during preconditioning and ends (e.g., substantially or completely) during the extruding. In some embodiments, a reaction rate of the fiber hydrolysis reaction 500 is fastest (e.g., has a maximum reaction rate) during the preconditioning. In some embodiments, the fiber hydrolysis reaction 500 is stopped before converting more than about 10, 9, 8, 7, 6, 5, 4, 3, 2, or 1 wt. % of the fiber 502 to monosaccharides and disaccharides.

In some embodiments, the starch hydrolysis reaction 400 begins and ends (e.g., effectively, substantially, or completely begins and ends) during the extruding step 302. In some embodiments, a reaction rate of the starch hydrolysis reaction 400 is fastest (e.g., has a maximum reaction rate) during the extruding step 302. In some embodiments, the starch hydrolysis reaction 400 is stopped before converting more than about 10, 9, 8, 7, 6, 5, 4, 3, 2, or 1 wt. % of the starch 402 to monosaccharides and disaccharides. For example, from a practical standpoint, it can be useful to convert no more than about 1 wt. % of the starch 402 to monosaccharides and disaccharides, although higher values could also be acceptable in some applications.

In some embodiments, the preconditioning step 300 and the extruding step 302 together have a duration equal to a maximum of (e.g., no more than) about 5 minutes, about 4 minutes, about 3 minutes, or about 2 minutes or equal to 30 seconds to 5 minutes, or any range contained in the listed ranges. For example, drying and milling can be post-extrusion steps that take additional time.

One embodiment of the invention will now be described with reference to FIG. 1, which provides a block flow diagram with illustrative equipment that can be used to provide a product composition 120 according to the invention. As illustrated in FIG. 1, first, a first enzyme 102, second enzyme 104, water 106, and a starting composition 108 are fed to a preconditioner 130 to provide a preconditioned mixture 110. Second, the preconditioned mixture 110 is fed to an extruder 132 to provide an extruded mixture 112. Third, the extruded mixture 112 is fed to a pelletizer 134 to provide a pelletized mixture 114. Fourth, the pelletized mixture 114 is fed to a dryer 136 to provide a dried mixture 116. Fifth, the dried mixture 116 is fed to a granulator 138 (e.g., grinder) to provide a powder 118. Sixth, the powder 118 is fed to a mixer 140 to provide a product composition 120. For example, the mixer 140 can be used during the optional adding step 222 so that at least one additional component can be added (e.g., in a mixer 140) to a hydrolyzed powder 118 or a hydrolyzed extruded mixture 112 from the extruder 132 (for example, to provide a food or beverage). As an illustration, when a product composition 120 is provided in the form of a liquid-based product composition 120 (e.g., beverage or soup), it can be desirable to mix the extruded mixture 112 with a liquid to provide the liquid-based product, thereby avoiding the pelletizing step 216, drying step 218, and granulating step 220 (e.g., grinding, crushing, or milling step). In some embodiments, the liquid-based product is homogenized during or after an adding and/or mixing step.

In some embodiments, α-amylase, endo-cellulase, and whole grain are added simultaneously to a preconditioner 130 under conditions (e.g., at a relatively low temperature) in which cellulase is active. Next, the mixture is passed through an extruder 132 at gradually increasing temperatures until α-amylase is activated and cellulase is deactivated. Then, the temperature is increased even more and α-amylase is deactivated to provide an extruded mixture 112 with hydrolyzed starch and hydrolyzed fiber, while still maintaining whole grain status.

In some embodiments, the cellulase enzyme is most active in the preconditioner 130. Additionally, in some embodiments, α-amylase enzyme is most active in the extruder 132.

In some embodiments, a composition (e.g., a slurry, mix or dough) comprises the starch and a liquid, and the starch is gelatinized and hydrated. For example, heating in the presence of a liquid (e.g., water) can result in the gelatinization of starch.

As an illustration of gelatinization, starch naturally has a fairly granular structure, but after gelatinization the structure becomes more open and expands. For example, when the granular starch is heated in the presence of water, the starch absorbs the water (e.g., water gets into the interstitial space of the starch). The water opens up the starch and causes it to expand.

In one embodiment, once the starch has been gelatinized, even if it is later dried, the starch retains a structure that is more open and more expanded than the original granular structure of the starch. Accordingly, in one embodiment, once starch has been gelatinized, it is easier to hydrate in the future. As an illustration, in one embodiment, to hydrate a dry starch that has not yet been gelatinized and hydrated, the starch is mixed with (or dispersed in) water and heated. However, in one embodiment, if a dry starch has been gelatinized and hydrated, it can be re-hydrated more easily (e.g., more quickly and without heat).

In one embodiment, even after a gelatinized starch is dried into powder, it retains a more open and expanded structure. For example, in one embodiment, gelatinized starch can be hydrated more easily (e.g., quicker and without as much or any heat) relative to ungelatinized starch.

Turning to hydration, in one embodiment, something is hydrated when it has absorbed liquid (e.g., a water-based liquid). In one embodiment, a starch and/or fiber is fully hydrated. For example, a composition comprising the starch and/or fiber has absorbed enough water to reach its equilibrium water activity at given conditions (e.g., temperature and pressure). In some embodiments, a starch and/or fiber is only partially hydrated. In some embodiments, starch and fiber or a composition comprising starch and fiber (e.g., grain flour) must be gelatinized in order to be hydrated. For example, in some embodiments, if the starch is not gelatinized, it can be dispersed into a liquid (e.g., water-based liquid) but it will settle (e.g., out or to the bottom of a container of the liquid) and will not remain dispersed in the liquid unless gelatinized. As another example, in some embodiments, if the starch and/or fiber is hydrated by a liquid, it has absorbed the liquid and can remain suspended in the liquid (e.g., indefinitely or for a longer period of time).

In some embodiments, a material is considered fully hydrated when it has absorbed enough liquid to achieve an equilibrium mass concentration of the liquid relative to the total weight of the material. In some embodiments, a composition comprising the starch and/or fiber is essentially fully hydrated (e.g., having absorbed enough liquid to achieve, within about 3 weight percent, the equilibrium mass concentration of liquid). In some embodiments, the composition is substantially hydrated (e.g., having absorbed enough liquid to achieve, within about 50 weight percent, the equilibrium mass concentration of liquid). In some embodiments, the composition is noticeably hydrated (e.g., having absorbed enough liquid that increased hydration is detectable (e.g., using appearance, increased mass, increased volume, expanded shape, decreased hardness, increased elasticity, a measurement, a sensor, etc.).

In some embodiments, the composition comprising the starch and/or fiber and a liquid has absorbed and/or been dispersed in enough liquid to be fluid-like (e.g., free-flowing under gravity and/or pumpable through a conduit). For example, in some embodiments, the composition has absorbed and/or been dispersed in enough liquid that the viscosity of the composition (while it can be relatively high compared to water at 1 cP) is still sufficiently low to enable pumping the composition through a conduit (e.g., pipe).

In some embodiments, in order to hydrolyze a starch, the starch must be gelatinized and hydrated. In one embodiment, this is because, for example, an enzyme (e.g., α-amylase) used to catalyze the starch hydrolysis reaction is more active when the starch is gelatinized.

One embodiment of the invention will now be described with reference to FIG. 4, which illustrates a starch hydrolysis reaction 400 in which starch 402 is converted to hydrolyzed starch (e.g., the product of a starch hydrolysis reaction 400). As illustrated, a starch 402 molecule comprises a first starch moiety 412 and a second starch moiety 414, and after an enzyme-catalyzed starch hydrolysis reaction 400, the first starch moiety 412 forms part of a first hydrolyzed starch molecule 406 and the second starch moiety 414 forms part of a second hydrolyzed starch molecule 408. Stoichiometrically, the reactants of the starch hydrolysis reaction 400 comprise a starch molecule 402 and water 106; the products comprise a first hydrolyzed starch molecule 406 and a second hydrolyzed starch molecule 408; and the catalyst is a starch-hydrolysis-catalyzing enzyme 416 (e.g., α-amylase molecule). For example, in some embodiments, the starch molecule 402 is hydrolyzed into a first portion of hydrolyzed starch (e.g., a first hydrolyzed starch molecule 406) and a second portion of hydrolyzed starch (e.g., second hydrolyzed starch molecule 408).

In some embodiments, a fibrolytic enzyme (e.g., endo-glucanase) is used to catalyze fiber hydrolysis. Examples of endo-glucanase include endo-cellulase, which hydrolyzes insoluble fiber (e.g., cellulose) and soluble fiber (e.g., beta-glucan), and endo-beta-glucanase, which hydrolyzes soluble fiber. In some embodiments, it is desirable to use substantially pure endo-glucanase (e.g., substantially no α-amylase activity and exo-enzyme activity). For example, the substantially pure endo-cellulase can provide better results in terms of controlled molecular weight reduction because the endo-cellulase can hydrolyze both soluble and insoluble fiber.

As an illustration, in some embodiments, a continuous extrusion process provides for the controlled hydrolysis of starch and fiber. For example, in some embodiments, a first enzyme (e.g., endo-cellulase) is activated in the pre-conditioner and then deactivated during extrusion as the temperature rises. Accordingly, the activation of the first enzyme enables hydrolysis of the fiber while the deactivation of the first enzyme stops the hydrolysis of the fiber and helps prevent the conversion of fiber to monosaccharides and disaccharides. Additionally, in some embodiments, the second enzyme (e.g., α-amylase) is activated during extrusion and then deactivated during extrusion as the temperature rises. Accordingly, the activation of the second enzyme enables the hydrolysis of starch while the deactivation of the first enzyme stops the hydrolysis of the starch and helps prevent the dextrinization of starch and the conversion of starch to monosaccharides and disaccharides.

One embodiment of the invention will now be described with reference to FIG. 5, which illustrates a fiber hydrolysis reaction 500 in which fiber 502 is converted to hydrolyzed fiber (e.g., the product of a fiber hydrolysis reaction 500). As illustrated, a fiber 502 molecule comprises a first fiber moiety 512 and a second fiber moiety 514, and after an enzyme-catalyzed fiber hydrolysis reaction 500, the first fiber moiety 512 forms part of a first hydrolyzed fiber molecule 506 and the second fiber moiety 514 forms part of a second hydrolyzed fiber molecule 508. Stoichiometrically, the reactants of the fiber hydrolysis reaction 500 comprise a fiber molecule 502 and water 106; the products comprise a first hydrolyzed fiber molecule 506 and a second hydrolyzed fiber molecule 508; and the catalyst is a fiber-hydrolysis-catalyzing enzyme 516 (e.g., endo-glucanase molecule). For example, in some embodiments, the fiber molecule 502 is hydrolyzed into a first portion of hydrolyzed fiber (e.g., a first hydrolyzed fiber molecule 506) and a second portion of hydrolyzed fiber (e.g., second hydrolyzed fiber molecule 508).

In some embodiments, α-amylase is used to catalyze starch hydrolysis. In embodiments where the α-amylase has higher activity at higher temperatures and the endo-cellulase has higher activity at lower temperatures, the different temperature ranges can complicate using both enzymes in a process. Accordingly, in some embodiments, the temperature profile of a process using both enzymes is specified to satisfy at least two criteria. First, the temperature profile sufficiently activates and then deactivates the enzyme catalyzing fiber hydrolysis to provide a target percent conversion of higher molecular weight fiber to lower molecular weight fiber so that a desired molecular weight average and/or distribution is achieved for the lower molecular weight fiber. Second, the temperature profile sufficiently activates and then deactivates the enzyme catalyzing starch hydrolysis to provide a target percent conversion of higher molecular weight starch to lower molecular weight starch so that a desired molecular weight average and/or distribution is achieved for the lower molecular weight starch.

Figure 14:
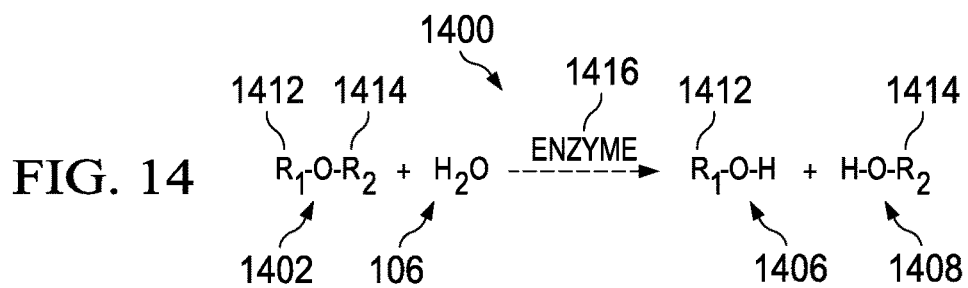
FIG. 14 is a chemical equation illustrating one embodiment of the invention comprising protein hydrolysis.

As another example, in some embodiments, the composition comprising the starch and/or fiber also or alternatively comprises protein. For example, in some embodiments, the composition comprises starch, fiber, protein or some combination thereof. Additionally, some embodiments comprise protein-hydrolysis of protein (e.g., a protein molecule 1402 or plurality of protein molecules as illustrated in FIG. 14). Furthermore, in some embodiments the first enzyme 102 or the second enzyme 104 is a protein-hydrolysis-catalyzing enzyme. Moreover, in some embodiments a third enzyme is a protein-hydrolysis-catalyzing enzyme. In some embodiments, the protein-hydrolysis-catalyzing enzyme is an endoenzyme. In some embodiments, deactivation temperature for protein-hydrolysis-catalyzing enzymes are the same as the deactivation temperatures for another enzyme, are higher than the deactivation temperature for the first enzyme, are lower than the deactivation temperature for the second enzyme, are higher than the second enzyme, are lower than the deactivation temperature for the third enzyme, or some combination thereof. In some embodiments, deactivation temperatures for protein-hydrolysis-catalyzing enzymes include, for example, about 70° C. (158° F.) to about 100° C. (212° F.) and/or pasteurization conditions.

Additionally, the embodiments discussed herein can be modified to form additional embodiments in which protein is hydrolyzed in place of or in addition to another reagent (e.g., starch and/or fiber). As can be seen in FIG. 14, protein hydrolysis proceeds analogously to starch or fiber hydrolysis, which were illustrated in FIG. 4 and FIG. 5. FIG. 14 illustrates a protein hydrolysis reaction 1400 in which protein (e.g., a protein molecule 1402) is converted to a hydrolyzed product, for example, hydrolyzed protein (e.g., a first hydrolyzed protein molecule 1406 and a second hydrolyzed protein molecule 1408). As illustrated, a protein molecule 1402 comprises a first protein moiety 1412 and a second protein moiety 1414, and after an enzyme-catalyzed protein hydrolysis reaction 1400, the first protein moiety 1412 forms part of a first hydrolyzed protein molecule 1406, and the second protein moiety 1414 forms part of a second hydrolyzed protein molecule 1408. Stoichiometrically, the reactants of the protein hydrolysis reaction 1400 comprise a protein molecule 1402 and water 106; the hydrolyzed products comprise a first hydrolyzed protein molecule 1406 and a second hydrolyzed protein molecule 408; and the catalyst is a protein-hydrolysis-catalyzing enzyme molecule 1416 (e.g., alkalase, bromelain, and papain). For example, in some embodiments, the protein molecule 1402 is hydrolyzed into a first portion of hydrolyzed protein (e.g., a first hydrolyzed protein molecule 1406) and a second portion of hydrolyzed protein (e.g., second hydrolyzed protein molecule 1408).

Moreover, in some embodiments, the average molecular weight of the protein molecules can be reduced (e.g., using enzymes with only endo activity) to a fraction of the original average molecular weight (e.g., no more than about 60%, 50%, 40%, 30%, 20%, 10%, 9%, 8%, 7%, 6%, 5%, 4%, 3%, 2%, or 1% of the original molecular weight). This is so, because, for example, the protein molecules can be selectively reduced in molecular weight to the smallest molecules that still constitute protein, but without being converted into molecules that are not protein, such as individual amino acids.

Figure 6:
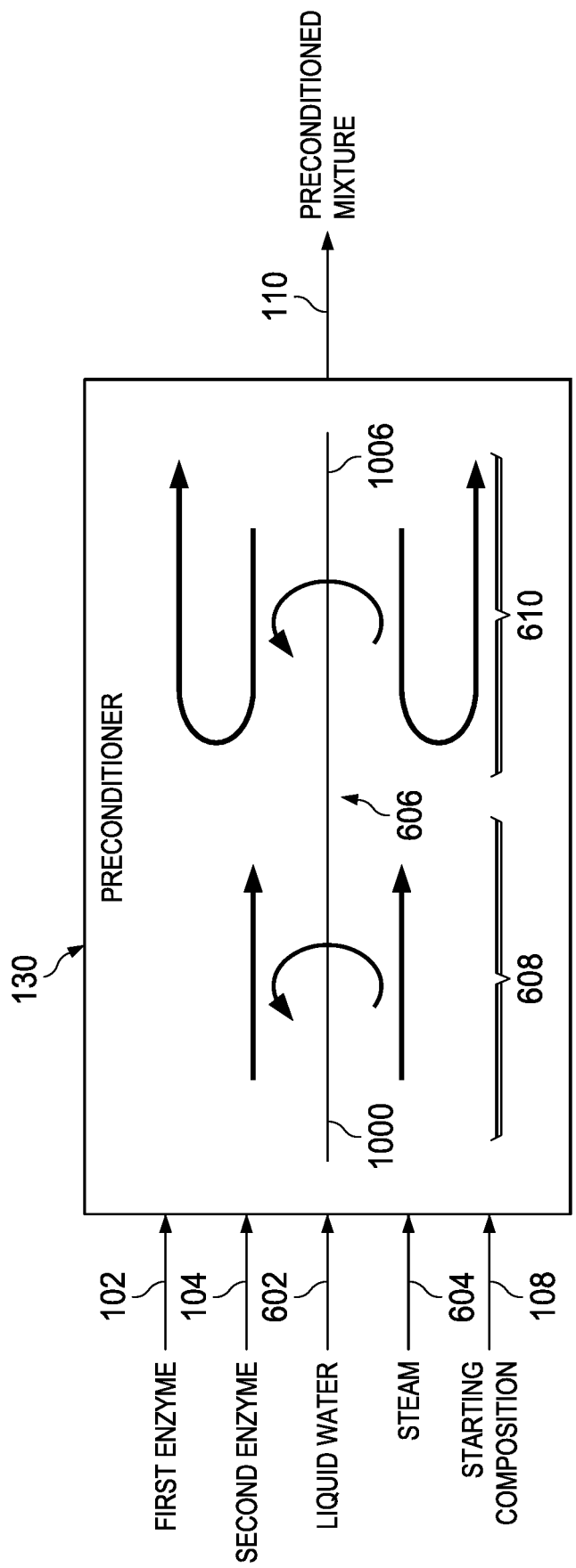
FIG. 6 is a schematic illustration of a preconditioner with a right-handed (or forward) block of at least one screw and a left-handed (or reverse) block of at least one arrangement of kneading paddles.

One embodiments of the invention will now be described with reference to FIG. 6, which illustrates one embodiment of the invention comprising a preconditioner 130. The preconditioner, for example, can be the preconditioner illustrated in FIG. 1. As illustrated, the feed (e.g., starting components) to the preconditioner is a first enzyme 102, second enzyme 104, and water (e.g., liquid water 602 and steam 604), and a starting composition 108. The product from the preconditioner is a preconditioned mixture 110.

Figure 10:
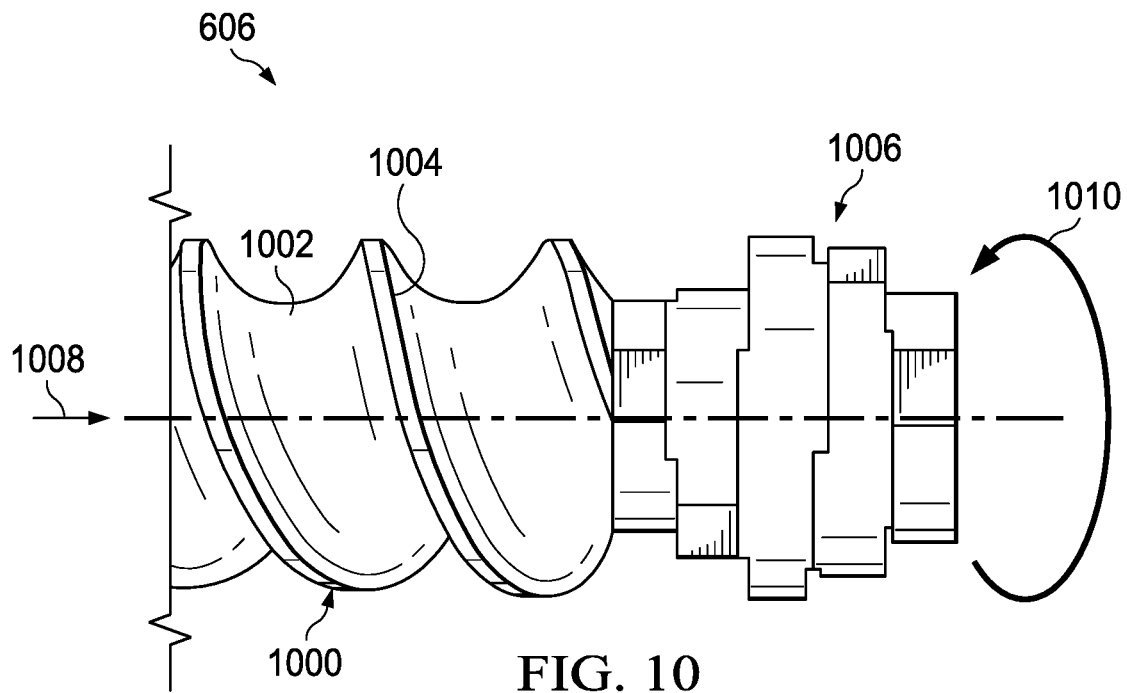
FIG. 10 is a schematic illustration of one embodiment of a rotor comprising a right-handed screw and right-handed arrangement of paddles in sequence.

The preconditioner 130 can comprise at least one block of screws and/or at least one arrangement of paddles. For example, the preconditioner as illustrated comprises a plurality of blocks, including a first block 608 and a second block 610. Although, the preconditioner can also comprise a single block. The feed to the preconditioner passes the plurality of blocks (e.g., first block, then the second block) before exiting the preconditioner as the preconditioned mixture. The first block 608 comprises a rotor 606 and the second block 610 comprises a rotor 606. For example, as illustrated in FIG. 10, a rotor can comprises a screw 1000 (e.g., a shaft 1002 with at least one flight 1004) and/or an arrangement of a plurality of paddles 1006. The screw can be used, for example, to convey material, mix material, pressurize material, heat material, granulate material, and some combination thereof. The arrangement of paddles can be used, for example, to knead material, to convey material, mix material, pressurize material, heat material, granulate material, and some combination thereof. In some embodiments, the arrangement of the paddles are arranged so that each paddle is rotated by about +/−0 to 90 degrees (e.g., 60 degrees or any value or range from −90 degrees to +90 degrees, such as 1 to 90 degrees) relative to the immediately previous paddle.

As shown in FIG. 10, a right-handed screw and a right-handed arrangement of paddles are used. Nonetheless, a left-handed screw and/or a left-handed arrangement of paddles can also be used. For example, for the right-handed screw, rotating the screw in a rotational direction 1010 that is counter-clockwise (as seen from the inlet or feed-end) results in the screw (in conjunction with gravity) pushing material (e.g., the feed 1008) within the flight of the screw away from the inlet (e.g., of the preconditioner or extruder) and toward the exit. For a left-handed screw, rotating the screw counter-clockwise (as seen from the inlet or feed-end) results in the screw (in conjunction with gravity) pushing material (e.g., the feed) within the flight of the screw away from the exit and toward the inlet.

Similarly, for the right-handed arrangement of paddles, rotating the arrangement counter-clockwise (as seen from the inlet or feed-end) results in the arrangement (in conjunction with gravity) pushing material (e.g., the feed) adjacent to the arrangement away from the inlet and toward the exit. For a left-handed arrangement of paddles, rotating the arrangement of paddles counter-clockwise (as seen from the inlet or feed-end) results in the arrangement (in conjunction with gravity) pushing material (e.g., the feed) adjacent to the arrangement away from the exit and toward the inlet. Additionally, in some embodiments, an arrangement of paddles can be neutral, rather than right-handed or left-handed. For example, if adjacent paddles are rotated at 90 degrees respectively, then the arrangement of paddles will have no overall tendency to move the material (e.g., the feed) either toward the inlet or exit.

Figure 11:
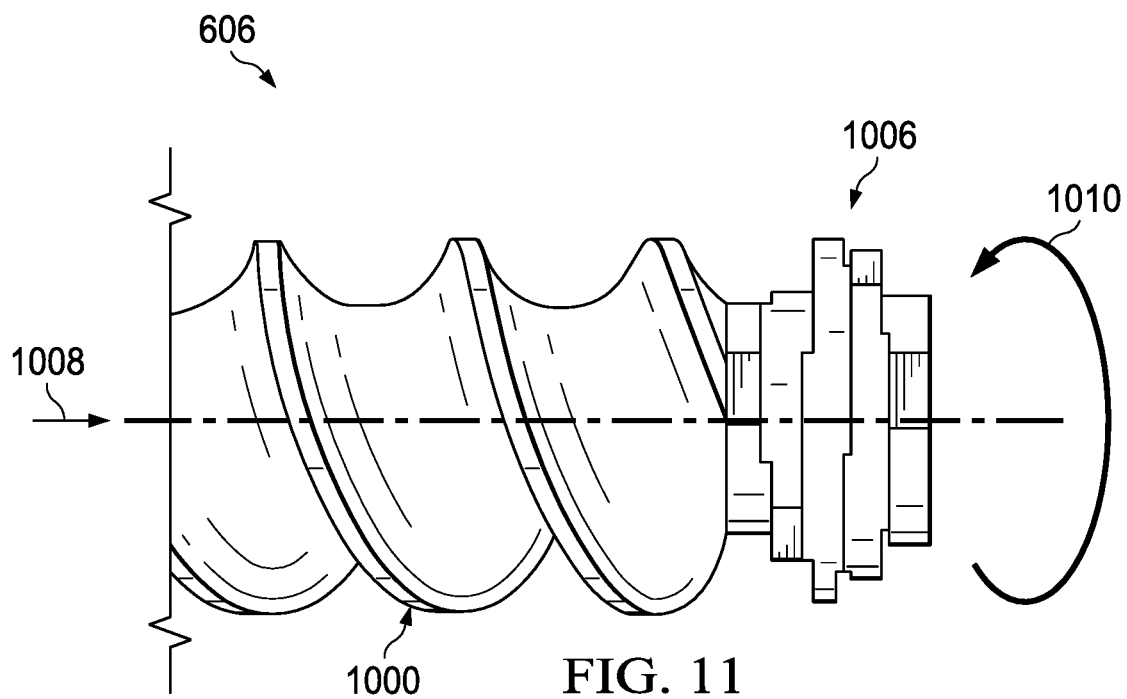
FIG. 11 is a schematic illustration of one embodiment of a rotor comprising a right-handed screw and right-handed arrangement of thinner paddles.

FIG. 11 illustrates a right-handed screw 1000 with a right-handed arrangement of paddles 1006 comprising relatively thinner paddles than the paddles illustrated in FIG. 10.

Figure 12:
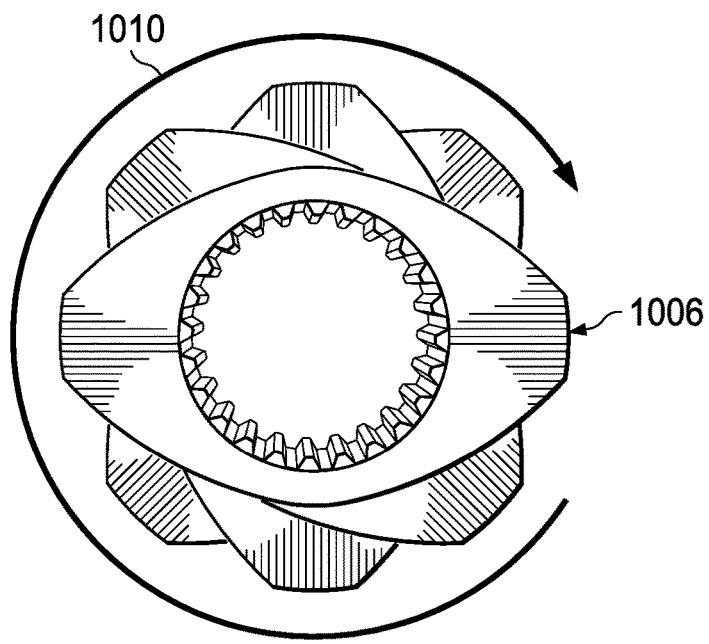
FIG. 12 is a schematic illustration of one embodiment of a right-handed arrangement of thinner paddles as viewed from an outlet end of the paddles.

FIG. 12 illustrates a right-handed arrangement of the relatively thinner paddles of FIG. 11 as viewed from the exit-end and looking toward the inlet or feed-end of the paddles 1006.

Figure 13:
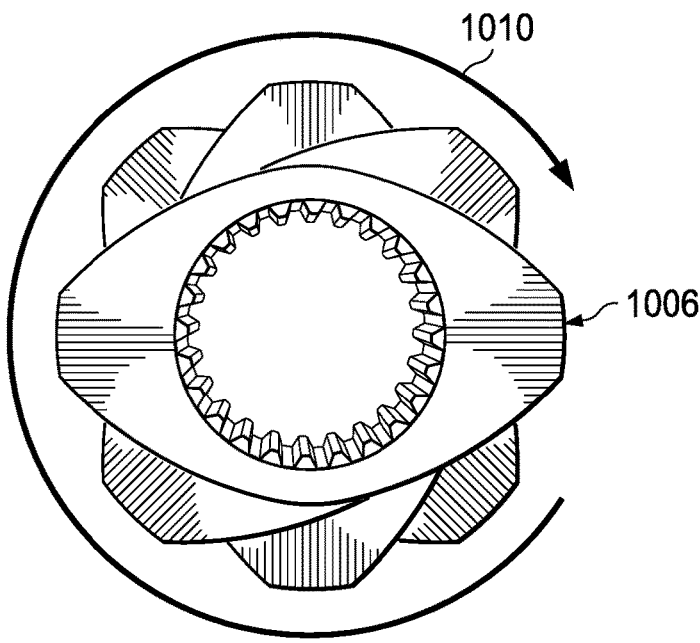
FIG. 13 is a schematic illustration of one embodiment of a left-handed arrangement of thinner paddles as viewed from an outlet end of the paddles.

FIG. 13 illustrates a left-handed arrangement of the relatively thinner paddles as viewed from the exit-end and looking toward the inlet or feed-end of the paddles 1006. Apart from being left-handed rather than right-handed, the arrangement of paddles in FIG. 13 is otherwise similar to the arrangement of paddles in FIG. 12 and FIG. 11.

With reference again to FIG. 6, the first block 608, the second block 610, the plurality of blocks, or any combination thereof can comprise a right-handed screw, a left-handed screw, a right-handed arrangement of paddles, a left-handed arrangement of paddles, or any combination thereof. Furthermore, all of the block can comprise the same handedness, at least one block can comprise a different handedness than another block, or the blocks can comprise alternating handedness. For example, as illustrated in FIG. 6, the first block can be the right-handed screw and the second block can be a left-handed arrangement of paddles. As another example, as illustrated in FIG. 10, the first block can comprise a right-handed screw and the second block can comprise a right-handed arrangement of paddles. As a skilled person would recognize after reading this disclosure, any other combination and order of blocks listed herein (e.g., right-handed, left-handed, neutral) can be employed and are deemed to be additional embodiments.

Figure 7:
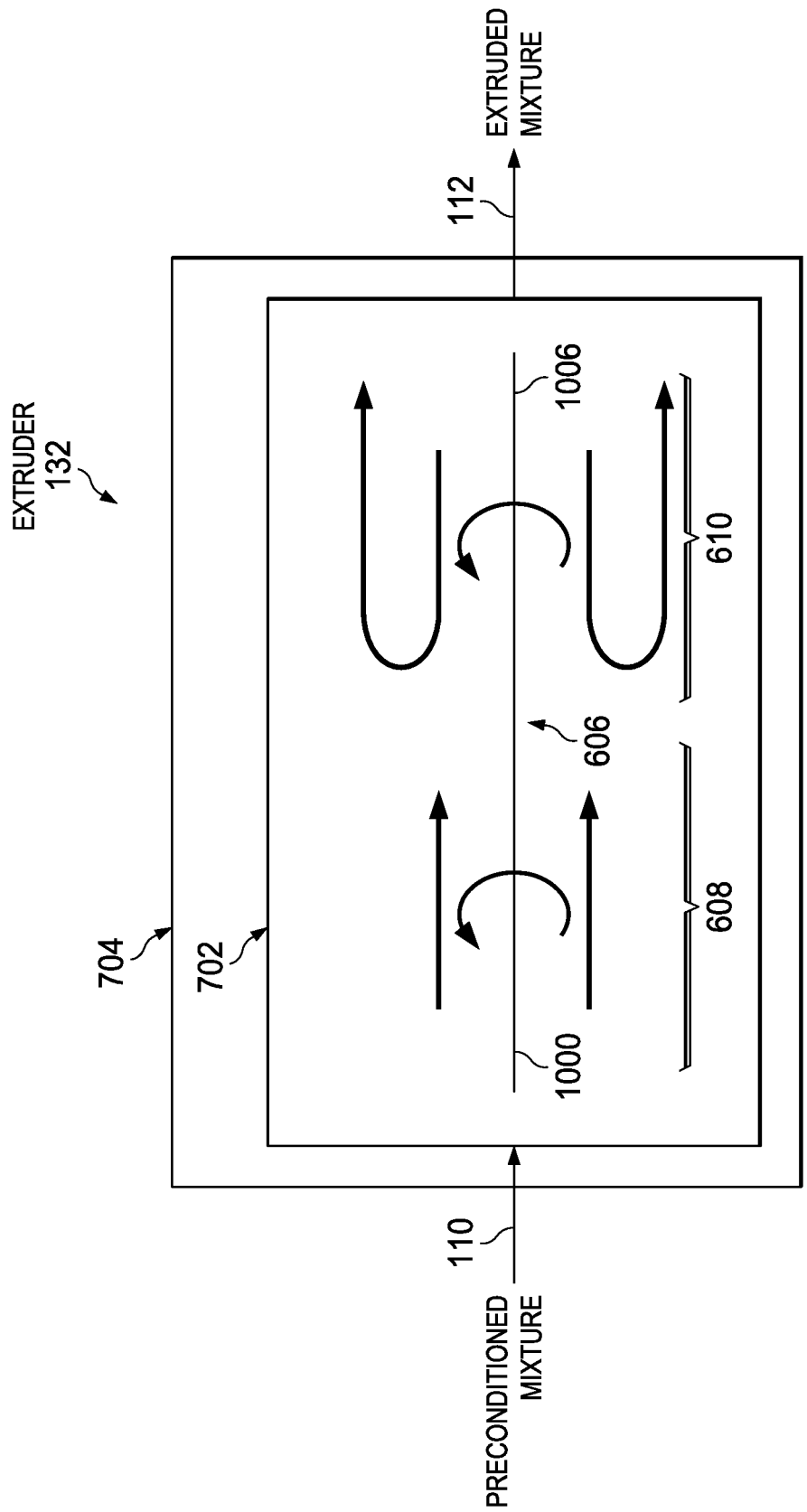
FIG. 7 is a schematic illustration of an extruder with a right-handed (or forward) block of screws and a left-handed (or reverse) block of kneading paddles.

One embodiment of the invention will now be described with reference to FIG. 7, which illustrates one embodiment of the invention comprising an extruder 132. The extruder, for example, can be the extruder illustrated in FIG. 1. The extruder can comprise at least one block of screws and/or at least one arrangement of paddles. For example, the extruder as illustrated comprises a plurality of blocks, including a first block 608 and a second block 610. As illustrated, the feed to the extruder is a preconditioned mixture 110. The product from the extruder is an extruded mixture 112. The extruder comprises an extruder barrel 702 and a jacket 704. For example, the jacket can be a heating jacket for heating the extruder barrel using, for example, a hot fluid (e.g., steam or water). As illustrated, the extruder 132 also comprises a plurality of blocks, for example, a first block 608 and a second block 610. Although, the extruder can also comprise a single block. The feed to the extruder passes the plurality of blocks (e.g., first block, then the second block) before exiting the extruder as the extruded mixture. Generally, the blocks in the extruder are similar to the blocks described with reference to the preconditioner. For example, the block or blocks used in the extruder can have the same or similar composition, characteristics, elements, arrangement, order, handedness, or lack of handedness as the preconditioner. The block or blocks can also be characterized by any combination thereof. Accordingly, as a skilled person would understand upon reading this disclosure, any description for the preconditioner regarding blocks can be applied to the extruder to form an additional embodiment.

Figure 8:
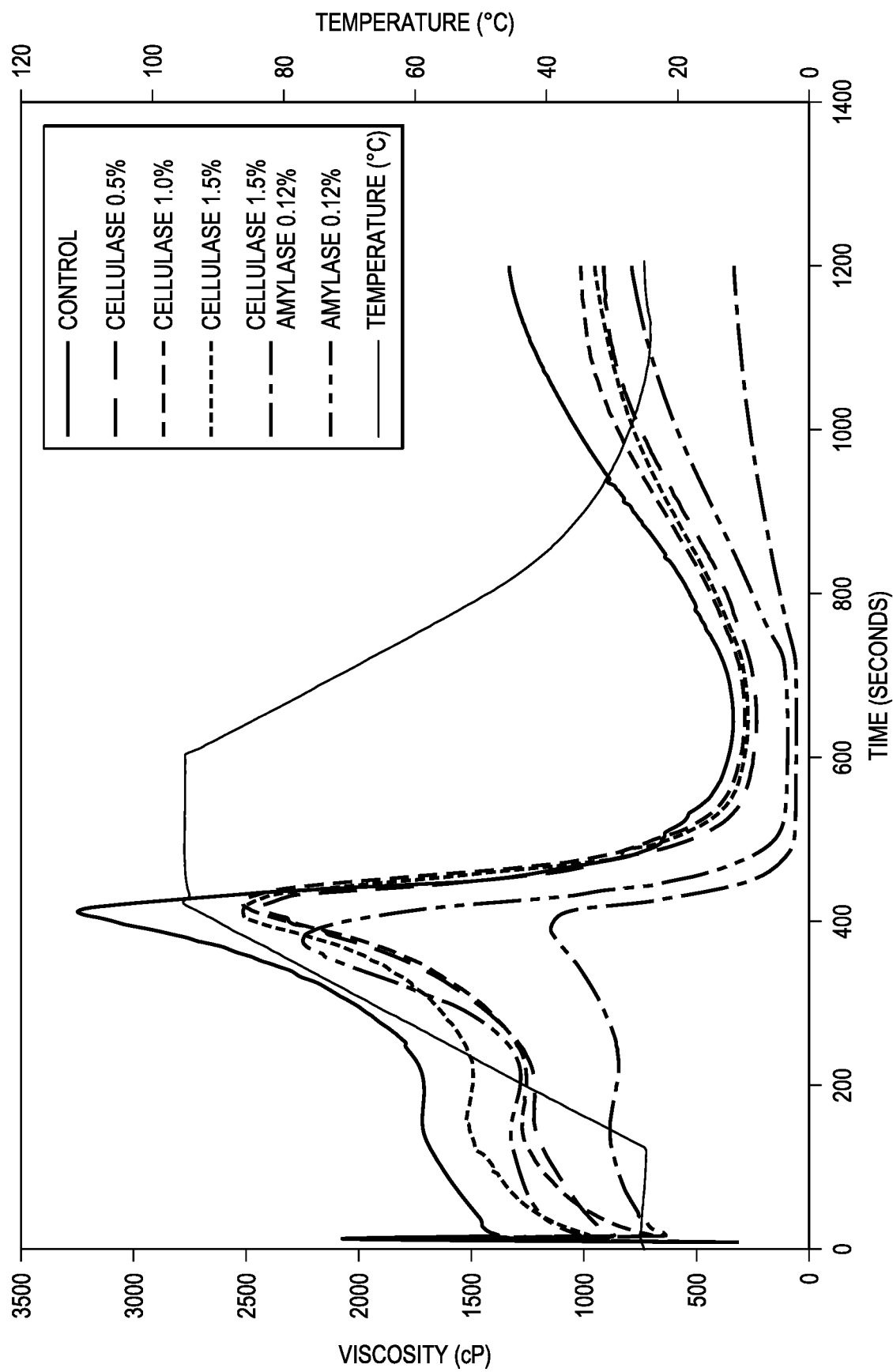
FIG. 8 is a Rapid Visco Analyzer (RVA) curve illustrating a change in viscosity as temperature varies over time for a composition hydrolyzed using differing enzyme compositions.

One embodiment of the invention will now be described with reference to FIG. 8, which illustrates Rapid Visco Analyzer (RVA) curves for experimental compositions comprising starch 402 and fiber 502. The experimental composition used to measure the RVA curve for each sample composition is mostly water. For example, the experimental composition is about 85.7 wt. % water and about 14.3 wt. % of a sample composition comprising starch and fiber. It should be noted that, as illustrated, the 85.7 wt. % water includes added water and the water in the sample composition comprising starch and fiber. Each curve in FIG. 8 illustrates an RVA curve for an experimental composition comprising a sample composition that has undergone differing degrees of hydrolysis in a preconditioner 130 and an extruder 132. For example, in the experimental composition illustrated by the control curve, the sample composition has not undergone hydrolysis (e.g., enzyme-catalyzed hydrolysis), but has been through the preconditioner 130 and the extruder 132. The sample composition corresponding to the cellulase 0.5 wt. % curve, has undergone enzyme-catalyzed hydrolysis and the enzyme was endo-cellulase present at 0.5 wt. % of the total weight of the sample composition (including, for example, water 106), excluding the weight of the enzyme itself. The sample composition corresponding to the cellulase 1.0 wt. % curve has undergone enzyme-catalyzed hydrolysis and the enzyme was endo-cellulase present at 1.0 wt. % of the total weight of the sample composition, excluding the weight of the enzyme itself. The sample composition corresponding to the cellulase 1.5 wt. % curve has undergone enzyme-catalyzed hydrolysis and the enzyme was endo-cellulase present at 1.5 wt. % of the total weight of the sample composition, excluding the weight of the enzyme itself. The sample composition corresponding to the cellulase 1.5 wt. % amylase 0.12 wt. % curve has undergone enzyme-catalyzed hydrolysis and the enzymes were endo-cellulase present at 1.5 wt. % of the total weight of the sample composition, excluding the weight of endo-cellulase and α-amylase, and α-amylase present at 0.12 wt. % of the total weight of the sample composition, excluding the weight of endo-cellulase and α-amylase. The sample composition corresponding to the amylase 0.12 wt. % curve has undergone enzyme-catalyzed hydrolysis and the enzyme was α-amylase present at 0.12 wt. % of the total weight of the composition, excluding the weight of the enzyme itself. Each curve in FIG. 8 illustrates the viscosity of the composition corresponding to a temperature that changed over time. All the compositions were subject to the same temperature profile over time. In other words, at any given time, the compositions were all at the same temperature or substantially the same temperature.

As can be seen in the curves of FIG. 8, each composition started out at an initial viscosity at an initial temperature. Then the temperature of each composition changed with time according to an established temperature profile and the viscosity of each composition changed with the temperature and with time as the temperature was held constant. Finally, each composition reached a final viscosity corresponding to a final temperature and time.

Figure 9:
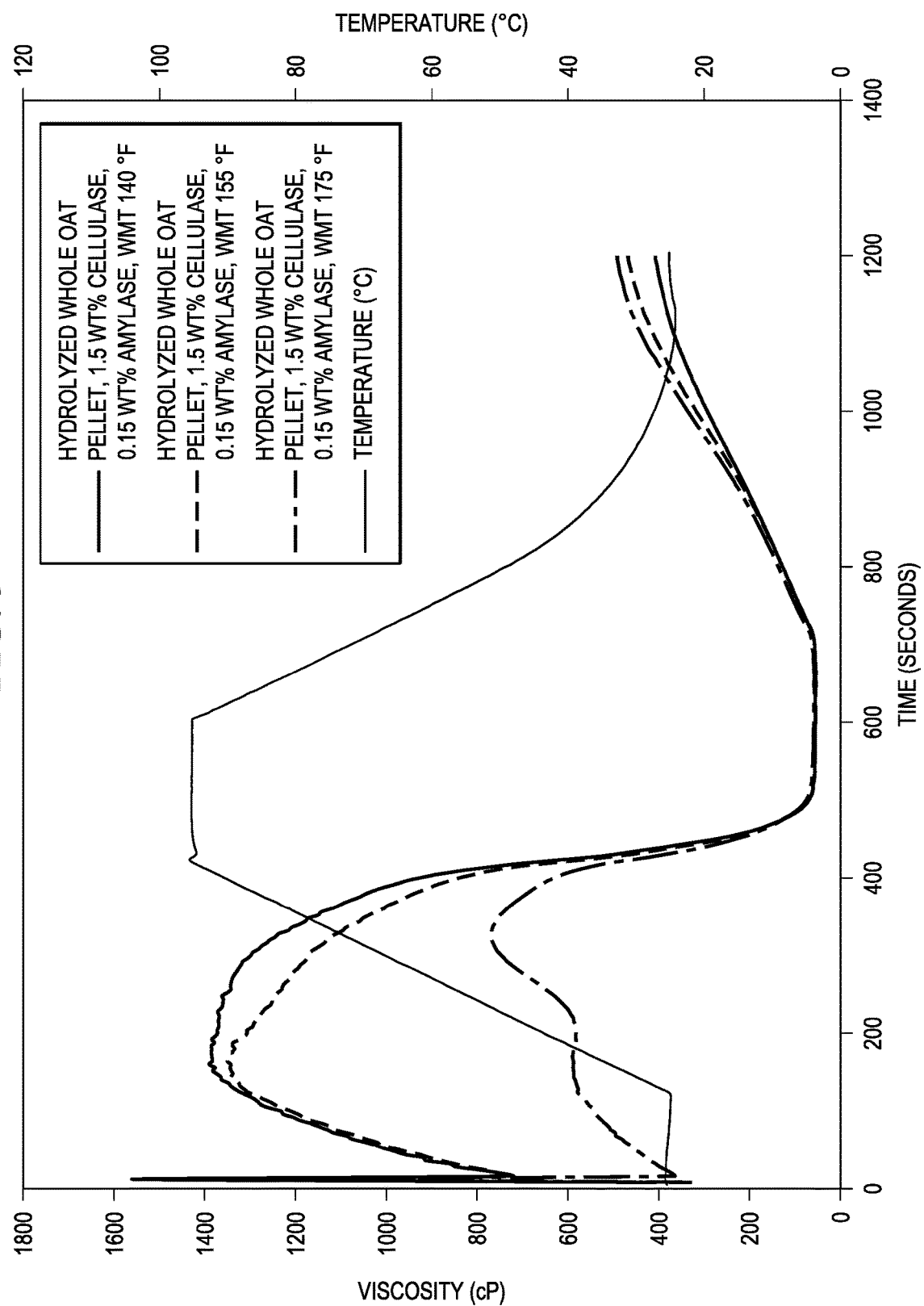
FIG. 9 is a Rapid Visco Analyzer (RVA) curve illustrating a change in viscosity as temperature varies over time for a composition hydrolyzed using the same enzyme composition, but using different wet mix temperatures before hydrolysis.

With reference to both FIG. 8 and FIG. 9, the following temperature profile was used to measure the Rapid Visco Analyzer ("RVA") peak viscosity of the compositions. First, a mixture was formed consisting of a composition comprising at least a portion of pulse and/or grain, 0.1 wt. % tocopherol, a specified weight percentage of deactivated α-amylase (e.g., none for the control), a specified wt. % of deactivated cellulase (e.g., none for the control), and a remainder of water. Water was added in an amount to provide the mixture with 14.3 wt. % solids. In other words, if the mixture were completely dehydrated by evaporating away the moisture, 14.3 wt. % solids would remain.

Second, the mixture was mixed by turning a shaft with a paddle at 500 rpm (for 5 seconds) until the composition, the deactivated α-amylase, and the deactivated cellulase have absorbed an approximately equilibrium amount of the water and are fully dispersed in the water to form the dispersion (e.g., generally homogeneous mixture, and to avoid clumps that can cause viscosity measurement errors).

Third, the dispersion was continuously mixed by turning a shaft with a paddle at 160 rpm and the viscosity of the dispersion was continuously measured while subjecting the dispersion to the following temperature profile: (i) holding the dispersion at about 25° C. for about 2 min; (ii) heating the dispersion to about 95° C. over about 5 minutes; (iii) holding the dispersion at about 95° C. for about 3 minutes; (iv) cooling the dispersion from about 95° C. to about 25° C. over about 5 minutes; (v) holding the dispersion at about 25° C. for about 3 min. The RVA peak viscosity was the maximum viscosity measured during steps (ii) and (iii).

Using a method such as the RVA peak viscosity measurement protocol can be useful, for example, to provide a way to compare the viscosity of compositions that are consumed after their starch has been gelatinized. This is so because the RVA peak viscosity measurement protocol involves heating and hydrating the composition, which gelatinizes starch in the composition if the starch has not already been gelatinized.

As each composition was subject to the temperature profile, each composition had initial measured conditions, local maxima, local minima, and final measured conditions as illustrated in FIG. 8 and Table 0A below. As a skilled person would understand after reading this disclosure, any disclosed viscosity value, and any range formed with endpoints selected from the viscosity values can be achieved in additional embodiments, for example, by varying the type of enzyme, amount of enzyme, wet mix temperature, and extrusion conditions. As an example, some embodiments (e.g., compositions comprising oat with hydrolyzed starch) comprise an RVA peak viscosity measurement (according to the described RVA peak viscosity measurement protocol) equal to less than about 3248 cP (+/−20, 10, 5, 4, 3, 2, or 1%), equal to about 1146 cP (+/−20, 10, 5, 4, 3, 2, or 1%) to about 3248 cP (+/−20 10, 5, 4, 3, 2, or 1%), or equal to any value or range contained therein.

Additionally, each composition comprised an added weight percentage of an enzyme composition as indicated.

As can be seen, the composition illustrated by the control curve, which had not undergone enzyme-catalyzed-hydrolysis, had the highest maximum viscosity (approximately 3,400 cP) and the highest final viscosity, which began to level off at around 1500 cP at 1200 seconds. Although the composition was not hydrolyzed, it was preconditioned and extruded.

Other compositions, illustrated by the cellulase 0.5 wt. % curve, cellulase 1.0 wt. % curve, and cellulase 1.5 wt. % curve had similar maximum viscosities equal to approximately 2500 cP and had final viscosities equal to approximately 1000 cP at 1200 seconds, illustrating that cellulase-catalyzed-fiber hydrolysis reduced the viscosity of a composition relative to a composition with no hydrolysis, where other variables were unchanged. Furthermore, these compositions illustrate that the final viscosity (e.g., at 1200 seconds) for the composition illustrated by the 0.5 wt. % cellulase was less than the final viscosity of the composition illustrated by the 1.5 wt. % cellulase, which was less than the final viscosity of the composition illustrated by the 1.0 wt. % cellulase.

Another composition, illustrated by the amylase 0.12 wt. % curve, had a maximum viscosity equal to approximately 2,250 cP and a final viscosity (e.g., at 1200 seconds) equal to approximately 750 cP, illustrating that amylase-catalyzed-fiber hydrolysis reduced the viscosity of a composition relative to a composition with no hydrolysis, where other variables were unchanged, for example, relative to a composition run through the preconditioner and the extruder, but without enzyme. The maximum and final viscosities of the

TABLE 0A

Selected Times and Viscosities Corresponding to FIG. 8

| | | Control | Cellulase 0.5% | Cellulase 1.0% | Cellulase 1.5% | Cellulase 1.5% Amylase 0.12% | Amylase 0.12% |
|---|---|---|---|---|---|---|---|
| Initial | Time (s) | 8 | 8 | 8 | 8 | 8 | 8 |
| | Viscosity (cP) | 476 | 370 | 312 | 383 | 376 | 415 |
| Local Maximum | Time (s) | 412 | 416 | 420 | 412 | 388-392 | 376 |
| | Viscosity (cP) | 3248 | 2447 | 2513 | 2514 | 1146 | 2248 |
| Minimum | Time (s) | 636-652 | 644-652 | 648-652 | 648 | 600-680 | 620-636 |
| | Viscosity (cP) | 337 | 233 | 285 | 270 | 57 | 94 |
| Final | Time (s) | 1200 | 1200 | 1200 | 1200 | 1200 | 1200 |
| | Viscosity (cP) | 1332 | 912 | 1014 | 951 | 333 | 787 |

As illustrated in FIG. 8, the cellulase was endo-cellulase and the amylase was α-amylase. Both enzymes had a high purity. For example, for the cellulase, there was no activity for starch (no amylase activity) and only endo-activity, not exo-activity within detection limits (e.g., no simple sugars, mono-saccharides or di-saccharides were generated or the amounts generated were Below Quantifiable Limits ("BQL") of 0.20 wt. %. For the α-amylase, there was no activity for fiber (e.g., cellulose) and only endo-activity, not exo-activity within detection limits (e.g., no simple sugars, mono-saccharides or di-saccharides were generated or the amounts generated were Below Quantifiable Limits ("BQL") of 0.20%. Each composition originally comprised a slurry of 14.4 wt. % oat flour and 85.6 wt. % water 106.

composition illustrated by the amylase 0.12 wt. % curve were lower than the maximum and final viscosities, respectively, of the compositions illustrated by the 0.5 wt. % cellulase curve, the 1.0 wt. % cellulase curve, and the 1.5 wt. % cellulase curve.

Furthermore, a composition illustrated by the cellulase 1.5 wt. % amylase 0.12 wt. % curve had a maximum viscosity equal to approximately 1,200 cP and a final viscosity (e.g., at 1200 seconds) equal to approximately 300 cP, which were lower than the maximum and final viscosities, respectively, of the composition illustrated by the amylase 0.12 wt. % curve. Accordingly, it is evident that a composition subject to enzyme-catalyzed fiber hydrolysis and enzyme-catalyzed starch hydrolysis is less viscous than a composition subject to enzyme-catalyzed fiber hydrolysis alone, enzyme-catalyzed starch hydrolysis alone, or no enzyme-catalyzed hydrolysis.

One embodiment of the invention will now be described with reference to FIG. 9, which illustrates the viscosity of a composition (e.g., 100% oat flour pellets) in which starch and fiber was hydrolyzed in a preconditioner 130 and an extruder 132 using different wet mix temperatures ("WMT") at the exit of the preconditioner 130 and/or entrance of the extruder 132. The wet mix temperatures used were 140° F. (60° C.), 155° F. (68.33° C.), and 175° F. (79.44° C.) as indicated in FIG. 9. Also, as illustrated in FIG. 9, the cellulase was endo-cellulase and the amylase was α-amylase. Each composition originally comprised a slurry of 14.4 wt. % oat flour and 85.6 wt. % water 106. Additionally, each composition comprised the indicated weight percentage of an enzyme composition.

All of the compositions illustrated by the curves in FIG. 9 were hydrolyzed using 1.5 wt. % cellulase and 0.15 wt. % amylase. Additionally, all of the compositions were subject to the same temperature profile (e.g., temperature over time) as illustrated in FIG. 9. As each composition was subject to the temperature profile, each composition had initial measured conditions, local maxima, local minima, and final measured conditions as illustrated in FIG. 9 and Table 0B below. As a skilled person would understand after reading this disclosure, any disclosed viscosity value, and any range formed with endpoints selected from the viscosity values can be achieved in additional embodiments, for example, by varying the type of enzyme, amount of enzyme, wet mix temperature, and extrusion conditions. As an example, some embodiments (e.g., compositions comprising oat with hydrolyzed starch) comprise an RVA peak viscosity measurement (according to the described RVA peak viscosity measurement protocol) equal to less than about 1386.5 cP (+/−20, 10, 5, 4, 3, 2, or 1%), equal to about 767 cP (+/−20, 10, 5, 4, 3, 2, or 1%) to about 1386.5 cP (+/−20, 10, 5, 4, 3, 2, or 1%), or equal to any value or range contained therein.

TABLE 0B

Selected Times and Viscosities Corresponding to FIG. 9

| | | Wet Mix Temperature | | |
|---|---|---|---|---|
| | | 140° F. | 155° F. | 175° F. |
| Initial | Time (s) | 8 | 8 | 8 |
| | Viscosity (cP) | 420 | 404.5 | 325.5 |
| Local Maximum | Time (s) | 160 | 164 | 324 |
| | Viscosity (cP) | 1386.5 | 1346.5 | 767 |
| Minimum | Time (s) | 648-664 | 648-652 | 636-660 |
| | Viscosity (cP) | 53.5 | 54 | 58 |
| Final | Time (s) | 1200 | 1200 | 1200 |
| | Viscosity (cP) | 407 | 467 | 490.5 |

Among other things, FIG. 9 illustrates a maximum viscosity (e.g., RVA peak viscosity) equal to approximately 767 cP (e.g., at about 324 seconds and about 72.4° C.) for the composition with a 175° F. (79.44° C.) wet mix temperature, a maximum viscosity (e.g., peak RVA viscosity) equal to approximately 1346.5 cP (e.g., at about 164 seconds and about 34.85° C.) for the composition with a 155° F. (68.33° C.) wet mix temperature, and a maximum viscosity (e.g., peak RVA viscosity) equal to approximately 1386.5 cP (e.g., at about 160 seconds and about 33.8° C.) for the composition with a 140° F. (60° C.) wet mix temperature. All the compositions had similar minimum viscosities equal to about 57-75.5 cP from approximately 500 to approximately 700 seconds after being held at approximately 95° C. (203° F.) for about 200 seconds. At the final temperatures (at 1200 seconds and approximately 25° C. (77° F.)) the composition with a 175° F. (79.44° C.) wet mix temperature had the highest viscosity equal to approximately 490.5 cP, the composition with a 155° F. (68.33° C.) wet mix temperature had a somewhat lower viscosity equal to approximately 467 cP, and the composition with a 140° F. (60° C.) wet mix temperature had the lowest viscosity equal to approximately 407 cP. Accordingly, depending on the temperature profile a composition will experience before processing or consumption, it can be desirable to use different wet mix temperatures to result in lower or higher viscosities. Also, because peak RVA is more correlated to some functional characteristics (e.g., mouthfeel) of a composition than other types of viscosity measurements, compositions with lower peak RVA viscosities (e.g., the composition in FIG. 9 with a 175° F. wet mix temperature) can be desirable, even if the composition has higher viscosities in other regards.

COMPARATIVE EXAMPLES

In some embodiments, the first enzyme 102 is a fiber-hydrolysis-catalyzing enzyme 516, and the fiber-hydrolysis-catalyzing enzyme 516 is an endo-glucanase, and the endo-glucanase is endo-cellulose.

In some embodiments the invention provides a composition (e.g., a product composition 120) comprising at least one material selected from the group consisting of at least a portion of grain and at least a portion of pulse. For example, the grain can be a cereal grain.

In some embodiments, the at least one material comprises hydrolyzed starch and hydrolyzed fiber. For example, the hydrolyzed starch can consist of starch molecules (e.g., the first hydrolyzed starch molecule 406 and the second hydrolyzed starch molecule 408 illustrated in FIG. 4). Moreover, in some embodiments, the average molecular weight of the starch molecules can be reduced to a fraction of the original average molecular weight (e.g., no more than about 60%, 50%, 40%, 30%, 20%, 10%, 9%, 8%, 7%, 6%, 5%, 4%, 3%, 2%, or 1% of the original molecular weight). This is so, because, for example, the starch molecules can be selectively reduced (e.g., using enzymes with only endo activity) in molecular weight to the smallest molecules that still constitute starch, but without being converted into molecules that are not starch, such as sugar (e.g., monosaccharides or disaccharides).

In some embodiments, the starch molecules have an average molecular weight equal to no more than about $3.42 \times 10^6$ (optionally, $3.0 \times 10^6$, $2.5 \times 10^6$, $2.0 \times 10^6$, $1.8 \times 10^6$, $1.7 \times 10^6$, $1.6 \times 10^6$, $1.5 \times 10^6$, $1.4 \times 10^6$, $1.37 \times 10^6$) Dalton, or equal to about $3.6 \times 10^6$-$1.0 \times 10^6$, or equal to any range contained in the previously described ranges. For example, molecular weight can be reduced by hydrolyzing the starch 402 in a starch hydrolysis reaction 400. In some embodiments, a largest-sized portion of the starch (e.g., largest 36 wt. % by molecular weight or HMW Amylopectin) has a molecular weight equal to not more than about $5.8 \times 10^6$, $5.0 \times 10^6$, $4.0 \times 10^6$, $3.0 \times 10^6$, or $2.8 \times 10^6$ Dalton, or equal to about $5.8 \times 10^6$-$2.8 \times 10^6$ Dalton; a moderately-sized portion of the starch (e.g., middle 39 wt. % by molecular weight or LMW-Amylopectin) has a molecular weight equal to not more than about $1.85 \times 10^6$, $1.80 \times 10^6$, $1.75 \times 10^6$, or $1.70 \times 10^6$ Dalton, or equal to about $1.85 \times 10^6$-$1.70 \times 10^6$ Dalton; a smallest-sized portion of the starch (e.g., smallest 25 wt. % by molecular weight or Amylose) has a molecular weight equal to not more than about $3.3 \times 10^5$, $2.7 \times 10^5$, $2.5 \times 10^5$, $2.3 \times 10^5$, $2.0 \times 10^5$, $1.8 \times 10^5$ Dalton, or $1.7 \times 10^5$ Dalton, or equal to about $3.3 \times 10^5$-$1.7 \times 10^5$ Dalton; or any combination thereof. Additionally, as with all the ranges described herein, any range contained within the listed ranges provides an additional embodiment. Additionally, as with the other values for any characteristic described herein, any range with endpoints selected from values listed herein is also considered to be an additional embodiment. For example, in Table 16 it is evident that the average molecular weight of the starch can be reduced to any value in the range from the starting value (e.g., $3.873 \times 10^6$ Dalton) to the listed hydrolyzed value (e.g., $1.729 \times 10^6$ Dalton). As another example, individual components (e.g., HMW-amylopectin, LMW-amylopectin, and amylose) within the starch can be similarly reduced in molecular weight to any value in a range whose endpoints are selected from the listed values. Additionally, even lower molecular weights can be achieved, as long as the starch molecules are not converted to non-starch molecules.

In some embodiments, the hydrolyzed fiber consists of fiber molecules (e.g., the first hydrolyzed fiber molecule 506 and the second hydrolyzed fiber molecule 508 illustrated in FIG. 5). Additionally, in some embodiments, the fiber molecules have an average molecular weight of no more than about 700,000 Dalton (e.g., about 500,000-700,000). For example, molecular weight can be reduced by hydrolyzing the fiber 502 in a fiber hydrolysis reaction 500. Moreover, in some embodiments, the average molecular weight of the fiber molecules can be reduced (e.g., using enzymes with only endo activity) to a fraction of the original average molecular weight (e.g., no more than about 60%, 50%, 40%, 30%, 20%, 10%, 9%, 8%, 7%, 6%, 5%, 4%, 3%, 2%, or 1% of the original molecular weight). This is so, because, for example, the fiber molecules can be selectively reduced in molecular weight to the smallest molecules that still constitute fiber, but without being converted into molecules that are not fiber, such as sugar (e.g., monosaccharides or disaccharides).

In some embodiments, the hydrolyzed starch is gelatinized (e.g., before hydrolysis). For example, this can provide better texture, provide a more open structure, and make it easier for starch 402 to disperse in a liquid. This can be useful, for example, for powder beverage products or soups. In some embodiments, using an extruder 132 to hydrolyze a composition, enables hydrolysis of starch 402 and/or fiber 502 in a composition at a lower moisture content.

In some embodiments, the hydrolyzed fiber comprises insoluble fiber molecules. In some embodiments, the insoluble fiber molecules have an average molecular weight equal to no more than about 1,000,000 Dalton. For example, in some embodiments, insoluble fiber 502 (e.g., insoluble beta-glucan and insoluble cellulose) with high molecular weight is responsible for a coarse mouthfeel, and avoiding a relatively high molecular weight for the insoluble fiber 502 can help to avoid a coarse mouthfeel.

Additionally, in some embodiments, molecular weight, chemical features, and/or structural features of molecules affect solubility in a liquid (e.g., water 106). For example, beta-glucan is generally soluble in water 106 under a given set of conditions, but higher molecular weight beta-glucan is only partially soluble in water 106 under the same conditions and its solubility increases as the molecular weight goes down. Additionally, in some embodiments, a high degree of structural association in beta-glucan from some cereal grains can make the beta-glucan insoluble in water 106. In some embodiments, enzyme-catalyzed hydrolysis can render beta-glucan more soluble by reducing its molecular weight and/or disrupting the structural association of the beta-glucan. As another example, cellulose is generally insoluble regardless of molecular weight due to chemical features and/or structural features.

In some embodiments, the at least one material is hydrolyzed-starch-and-fiber whole grain comprising hydrolyzed starch and hydrolyzed fiber, and the hydrolyzed-starch-and-fiber whole grain has, within a tolerance, the same mass ratio of starch 402 to protein as unhydrolyzed whole grain equivalent in kind to the hydrolyzed-starch-and-fiber whole grain. For example, in some embodiments, the tolerance is about +/−20%, 10%, 5%, 2%, 1%, 20%-0% or any value contained in the listed ranges. In some embodiments, equivalent in kind means equivalent in species or recognized subspecies (e.g., high fiber oats) or plurality of species or plurality of recognized subspecies. Furthermore, in some embodiments, the unhydrolyzed whole grain is equivalent in condition to the hydrolyzed-starch-and-fiber whole grain. Examples of condition include ripeness, lack of rottenness, and level of processing (e.g., harvesting, threshing, grinding, milling, cracking, flaking, separation to remove non-grain components, steaming, rolling, and cutting).

In some embodiments, the at least one material is hydrolyzed-starch-and-fiber whole grain comprising hydrolyzed starch and hydrolyzed fiber. Additionally, in some embodiments, the hydrolyzed-starch-and-fiber whole grain has a mass ratio selected from the group of mass ratios consisting of: (i) a mass ratio of fiber 502 to protein equal to a mass ratio of fiber 502 to protein of unhydrolyzed whole grain equivalent (e.g., in kind and condition) to the hydrolyzed-starch-and-fiber whole grain (e.g., optionally within a tolerance of +/−20%, 10%, 5%, 2% or 1%), (ii) a mass ratio of fat (e.g., triglycerides) to protein equal to a mass ratio of fat to protein of unhydrolyzed whole grain equivalent (e.g., in kind and condition) to the hydrolyzed-starch-and-fiber whole grain (e.g., optionally within a tolerance of +/−20%, 10%, 5%, 2% or 1%), (iii) a mass ratio of starch 402 to protein equal to a mass ratio of starch 402 to protein of unhydrolyzed whole grain equivalent (e.g., in kind and condition) to the hydrolyzed-starch-and-fiber whole grain (e.g., optionally within a tolerance of +/−20%, 10%, 5%, 2% or 1%), and (iv) any combination of (i), (ii) and (iii).

In some embodiments, the at least one material is hydrolyzed-starch-and-fiber pulse (e.g., whole pulse) comprising hydrolyzed starch and hydrolyzed fiber, and the hydrolyzed-starch-and-fiber pulse has (e.g., optionally within a tolerance of +/−30%, 25%, 20%, 15%, 10%, 5%, 4%, 3%, 2%, 1%, 30%-0% or any value contained in the listed ranges) the same mass ratio of starch 402 to protein as unhydrolyzed pulse equivalent in kind (for example, species or recognized subspecies or plurality of species or plurality of recognized subspecies) to the hydrolyzed-starch-and-fiber pulse. Optionally, in some embodiments, the unhydrolyzed pulse is also equivalent in condition to the hydrolyzed-starch-and-fiber pulse. Examples of condition include, ripeness, lack of rottenness, and level of processing (e.g., harvesting, threshing, grinding, dehulling, milling, cracking, flaking, separation to remove non-pulse components, steaming, rolling, and cutting).

In some embodiments, the at least one material is hydrolyzed-starch-and-fiber bran composition (e.g., oat bran, rice bran, wheat bran, sorghum bran, a bran concentrate thereof, etc.) comprising hydrolyzed starch and hydrolyzed fiber.

Additionally, in some embodiments, the hydrolyzed-starch-and-fiber bran composition has (e.g., within a tolerance of +/−20%, 10%, 5%, 2%, 1%, 20%-0% or any value contained in the listed ranges) the same mass ratio of starch 402 to protein as an unhydrolyzed bran composition equivalent in kind (for example, species or recognized subspecies or plurality of species or plurality of recognized subspecies) to the hydrolyzed-starch-and-fiber bran composition. Optionally, in some embodiments, the unhydrolyzed whole bran composition is also equivalent in condition to the hydrolyzed-starch-and-fiber bran composition. Examples of condition include, ripeness, lack of rottenness, and level of processing (e.g., harvesting, threshing, grinding, milling, cracking, flaking, separation to remove non-bran components, steaming, rolling, cutting, air classification, screening, and sifting).

In some embodiments, the at least one material is hydrolyzed-starch-and-fiber bran comprising hydrolyzed starch and hydrolyzed fiber, and the hydrolyzed-starch-and-fiber bran has a mass ratio selected from the group of mass ratios consisting of: (i) a mass ratio of fiber 502 to protein equal to a mass ratio of fiber 502 to protein of unhydrolyzed bran equivalent (e.g., in kind and condition) to the hydrolyzed-starch-and-fiber bran (e.g., within a tolerance of +/−20%, 10%, 5%, 2% or 1%), (ii) a mass ratio of fat to protein equal to a mass ratio of fat to protein of unhydrolyzed bran equivalent (e.g., in kind and condition) to the hydrolyzed-starch-and-fiber bran (e.g., within a tolerance of +/−20%, 10%, 5%, 2% or 1%), (iii) a mass ratio of starch 402 to protein equal to a mass ratio of starch 402 to protein of unhydrolyzed bran equivalent (e.g., in kind and condition) to the hydrolyzed-starch-and-fiber bran (e.g., within a tolerance of +/−20%, 10%, 5%, 2% or 1%), and (iv) any combination of (i), (ii), and (iii).

For example, in some embodiments, if alpha-amylase is used to catalyze the hydrolysis of starch, then the starch will by hydrolyzed, but not protein, fat or fiber. Accordingly, the mass ratio of any one component (protein, fat, dietary fiber, sugar) to another component in at least a portion of pulse and/or grain can remain unchanged or substantially or essentially unchanged unless the mass ratio involves starch. Furthermore, assuming that the mass of starch is unchanged (e.g., because the hydrolysis is controlled and stopped before starch is converted to monosaccharides, disaccharides, simple sugars, and/or non-starch molecules), then the mass ratio of starch to other components will also remain unchanged or substantially or essentially unchanged. Accordingly, a small tolerance can be achieved for the change in the mass ratios of any one component relative to another component (e.g., protein) in at least a portion of pulse and/or grain. Nonetheless, larger tolerances can also be obtained, where desired, or where smaller tolerances are not necessary or as relatively important for a particular application.

As an example of the various ratios of some components in whole grain to other components in whole grain, Table 1 below shows the proximate constituents of whole grain as compiled from USDA data. As used herein, the mass ratio of component X (e.g., starch) to Y (e.g., protein) in a composition (e.g., whole grain) is the mass of X in the composition divided by the mass of Y in the composition. As an illustration, this data was used to calculate the mass ratios of the various components, with the results being shown in Table 2. Table 2A provides a key for various terms used in Table 1 and Table 2. As used in the following Tables, Below Quantifiable Limits ("BQL") is below 0.20 wt. % for mono- and di-saccharides.

TABLE 1

Proximate constituents of whole grains (g Component/100 g Whole Grain) from USDA database, with estimates for ash and starch

| | Whole grain | | | | | | | | | |
|---|---|---|---|---|---|---|---|---|---|---|
| Component | Oat 1 | Oat 2 | Wheat 1 | Wheat 2 | Brown Rice 1 | Brown Rice 2 | Rye | Barley | Sorghum 1 | Sorghum 2 |
| Water | 8.8 | 8.92 | 10.74 | 12.42 | 11.97 | 11.8 | 10.6 | 9.44 | 10.26 | 12.4 |
| Protein | 16 | 11.92 | 13.21 | 9.61 | 7.23 | 7.54 | 10.34 | 12.48 | 8.43 | 10.62 |
| Total lipid (fat) | 6.3 | 6.9 | 2.5 | 1.95 | 2.78 | 3.2 | 1.63 | 2.3 | 3.34 | 3.46 |
| Carbohydrate, by difference | 67 | 69.52 | 71.97 | 74.48 | 76.48 | 76.25 | 75.86 | 73.48 | 76.64 | 72.09 |
| Ash, calculated | 1.9 | 2.74 | 1.58 | 1.54 | 1.54 | 1.21 | 1.57 | 2.3 | 1.33 | 1.43 |
| Total | 100 | 100 | 100 | 100 | 100 | 100 | 100 | 100 | 100 | 100 |
| Fiber, total dietary | 9.8 | 10 | 10.7 | 13.1 | 4.6 | 3.6 | 15.1 | 17.3 | 6.6 | 6.7 |
| Sugars, total | 1 | 1.5 | 0.41 | 1.02 | 0.66 | 0.66 | 0.98 | 0.8 | 1.94 | 2.53 |
| Starch, estimated | 56.2 | 58.02 | 60.86 | 60.36 | 71.22 | 71.99 | 59.78 | 55.38 | 68.1 | 62.86 |

TABLE 2

Mass ratio of various whole grain components to protein from USDA database, with estimates for ash and starch

| | Whole grain | | | | | | | | | |
|---|---|---|---|---|---|---|---|---|---|---|
| Component | Oat 1 | Oat 2 | Wheat 1 | Wheat 2 | Brown Rice 1 | Brown Rice 2 | Rye | Barley | Sorghum 1 | Sorghum 2 |
| Water | 0.55 | 0.75 | 0.81 | 1.29 | 1.66 | 1.56 | 1.03 | 0.76 | 1.22 | 1.17 |
| Protein | 1.00 | 1.00 | 1.00 | 1.00 | 1.00 | 1.00 | 1.00 | 1.00 | 1.00 | 1.00 |
| Total lipid (fat) | 0.39 | 0.58 | 0.19 | 0.20 | 0.38 | 0.42 | 0.16 | 0.18 | 0.40 | 0.33 |

TABLE 2-continued

Mass ratio of various whole grain components to protein
from USDA database, with estimates for ash and starch

| Component | Whole grain | | | | | | | | | |
|---|---|---|---|---|---|---|---|---|---|---|
| | Oat 1 | Oat 2 | Wheat 1 | Wheat 2 | Brown Rice 1 | Brown Rice 2 | Rye | Barley | Sorghum 1 | Sorghum 2 |
| Carbohydrate, by difference | 4.19 | 5.83 | 5.45 | 7.75 | 10.58 | 10.11 | 7.34 | 5.89 | 9.09 | 6.79 |
| Ash, calculated | 0.12 | 0.23 | 0.12 | 0.16 | 0.21 | 0.16 | 0.15 | 0.18 | 0.16 | 0.13 |
| Fiber, total dietary | 0.61 | 0.84 | 0.81 | 1.36 | 0.64 | 0.48 | 1.46 | 1.39 | 0.78 | 0.63 |
| Sugars, total | 0.06 | 0.13 | 0.03 | 0.11 | 0.09 | 0.09 | 0.09 | 0.06 | 0.23 | 0.24 |
| Starch, estimated | 3.51 | 4.87 | 4.61 | 6.28 | 9.85 | 9.55 | 5.78 | 4.44 | 8.08 | 5.92 |

TABLE 2A

Key for Table 1 and Table 2

| | |
|---|---|
| Oat 1 | Cereals, QUAKER, Instant Oatmeal Organic, Regular |
| Oat 2 | Cereals, oats, instant, fortified, plain, dry |
| Wheat 1 | Wheat flour, whole-grain |
| Wheat 2 | Wheat flour, whole-grain, soft wheat |
| Brown Rice 1 | Rice flour, brown |
| Brown Rice 2 | Rice, brown, long-grain, raw |
| Rye | Rye grain |
| Barley | Barley, hulled |
| Sorghum 1 | Sorghum flour, whole-grain |
| Sorghum 2 | Sorghum grain |
| Carbohydrate, by difference | Calculated by assuming whole grains consist of water, protein, total lipid (fat), ash, and ethanol and anything that is not water, protein, total lipid (fat), ash, and ethanol is carbohydrate |
| Ash, calculated | Calculated by assuming 100 grams of whole grains consist of water, protein, total lipid (fat), ash, ethanol and carbohydrates, and no ethanol is present |
| Starch, estimated | Estimated by assuming carbohydrates by difference consist of total dietary fiber, total sugars, and starch |

Although these ratios of components (e.g., macronutrients) are shown for a whole grain composition with unhydrolyzed starch, the ratios can remain unchanged or substantially or essentially unchanged as starch is subject to controlled hydrolysis as described herein. Furthermore, several Tables herein show examples of various compositions subject to controlled hydrolysis under listed extrusion conditions.

In some embodiments, the at least a portion of grain comprises whole grain. For example, the composition can comprise about 90 to 99.94 wt. % whole grain on a dry basis, at least about 90, 95, 96, 97, 98, 99, or 99.94 wt. % whole grain on a dry basis, or any range formed by values contained within the listed ranges. Furthermore, in some embodiments, the whole grain can comprise each component in an original set of components (e.g., comprising starch, fat, dietary fiber, and protein) at an original mass ratio relative to protein within a tolerance of +/−20%, 15%, 10%, 5%, 2% or 1%. For example, the original mass ratio can be the mass ratio of each component relative to protein at a time of harvesting, although it can also be at another reference time, for example, before processes including separation of the anatomical components of the whole grain, grinding, cooking, gelatinization of the starch in the whole grain, hydrolysis of the starch in the whole grain, and/or some combination thereof.

In some embodiments, the at least a portion of grain is hydrolyzed-starch whole grain (e.g., whole grain flour ground from a whole grain); the at least a portion of grain comprises caryopses (e.g., intact, ground, cracked, or flaked); and the caryopses comprise principal anatomical components consisting of starchy endosperm, germ, and bran. For example, the composition can comprise about 90 to 99.94 wt. % hydrolyzed-starch whole grain on a dry basis, at least about 90, 95, 96, 97, 98, 99, or 99.94 wt. % hydrolyzed-starch whole grain on a dry basis, or any range formed by values contained within the listed ranges. Furthermore, in some embodiments, the hydrolyzed-starch whole grain has within a tolerance of +/−20% (optionally, 15%, 10%, 5%, 2% or 1%) at least one mass ratio selected from the group consisting of: (i) a mass ratio of germ to endosperm equivalent to a mass ratio of germ to endosperm of unhydrolyzed intact caryopses of the same kind and condition as the caryopses of the hydrolyzed-starch whole grain; (ii) a mass ratio of bran to endosperm equivalent to a mass ratio of bran to endosperm of unhydrolyzed intact caryopses of the same kind and condition as the caryopses of the hydrolyzed-starch whole grain; and (iii) any combination thereof.

In some embodiments, the hydrolyzed-starch-and-fiber bran composition is oat bran, and the oat bran comprises at least about 5.5 wt. % beta-glucan on a total dry weight basis (e.g., excluding water 106) and at least about 16.0 wt. % dietary fiber 502 on a total dry weight basis. Additionally, in some embodiments, at least one-third of the total dietary fiber 502 is soluble fiber 502.

As an example, the American Association of Cereal Chemists International (AACCI) has stated: "Oat Bran is the food which is produced by grinding clean oat groats or rolled oats and separating the resulting oat flour by sieving bolting, and/or other suitable means into fractions such that the oat bran fraction is not more than 50% of the original starting material and has a total betaglucan content of at least 5.5% (dry-weight basis) and a total dietary fiber content of at least 16.0% (dry-weight basis), and such that at least one-third of the total dietary fiber is soluble fiber."

In some embodiments, the hydrolyzed-starch-and-fiber bran composition is oat bran concentrate and the oat bran concentrate comprises: at least about 10 wt. % beta-glucan on a total dry weight basis and at least about 29.1 wt. % dietary fiber 502 on a total dry weight basis. Additionally, in some embodiments, at least one-third of the total dietary fiber 502 is soluble fiber 502.

In some embodiments, the composition comprising at least one material selected from the group consisting of at least a portion of grain and at least a portion of pulse is a powder 118 (e.g., a flour). In some embodiments, the composition comprises a liquid. Additionally, in some embodiments, the at least one material is fully hydrated by (e.g., has absorbed an equilibrium concentration of) the liquid and suspended in the liquid (e.g., dispersed in an excess amount of the liquid) to form a suspension. Furthermore, in some embodiments, the composition comprises at least 6 wt. % of the at least one material.

In some embodiments, the composition comprises a liquid, and the liquid is a water-based liquid selected from the group consisting of water 106, milk (e.g., cow's milk, sheep's milk, goat's milk etc.), soy milk, grain milk (e.g., rice milk), nut milk (e.g., almond milk, hazelnut milk), coconut milk, fruit juice, and vegetable juice. As another example, in some embodiments, the liquid comprises water 106.

In some embodiments, the composition comprises a powder 118 hydrated by a water-based liquid. For example, the powder 118 can consist of powder particles. Furthermore, the powder particles can have an average particle size (e.g., average equivalent spherical diameter on a volume-weighted basis) equal to about 50-200 (e.g., 94.5-193.4, 50-150, or any range contained within the listed ranges) microns, for example, as measured using laser-diffraction-based, particle-size measurement equipment (e.g., a Malvern Mastersizer 3000 equipped with a multi-angle log-spaced diode array type of detector, available from Malvern Instruments Ltd of Malvern, Worcestershire, United Kingdom). As used herein, the equivalent spherical diameter of a particle is determined by calculating the diameter of a sphere that would cause a measured result (e.g., in this case, a measured light diffraction) for the particle.

In some embodiments, 10% by volume of the powder 118 particles have a particle size smaller than about 56.4 (optionally, 55, 50, 45, 40, 35, 30, or 25) microns; 50% by volume of the powder particles have a particle size smaller than about 190 (optionally, 185.1, 180, 170, 160, 150, 140, or 130) microns; 90% by volume of the powder particles have a particle size smaller than about 340 (optionally, 336.7, 320, 300, 280, 260, 240, 220, 200, 180) microns; or any combination thereof, where the particle size is the diameter of a sphere that would provide the same laser diffraction measurements as the particle.

In some embodiments, relatively smaller particle sizes decrease dispersibility in a liquid and increase absorption of the liquid, while larger particles sizes increase dispersibility in a liquid and decrease absorption of the liquid.

In some embodiments, the at least one material comprises the at least a portion of grain. Additionally, in some embodiments, the grain is selected from the group consisting of wheat, oat, barley, corn, white rice, brown rice, barley, millet, sorghum, rye, triticale, teff, spelt, buckwheat, *quinoa*, amaranth, kaniwa, cockscomb, green groat (e.g., uncooked groat of any type of grain or cereal grain) and combinations thereof.

In some embodiments, the at least one material comprises the at least a portion of pulse. Additionally, in some embodiments, the pulse is selected from the group consisting of peas, lentils, chickpeas, navy beans, black turtle beans, cranberry beans, kidney beans, pinto beans, small red beans, Dutch brown beans, pink beans and combinations thereof.

As used herein, grain is generally used to refer to cereal grains and pulse is generally used to refer to legumes, beans, peas, etc.).

In some embodiments, the composition comprises at least two enzymes (e.g., multiple deactivated enzymes). Furthermore, in some embodiments, the at least two enzymes comprise: an α-amylase and an endo-glucanase, for example, beta-glucanase or cellulase (e.g., endo-fibrolytic enzyme, or endo-hemicellulase). As another example, in some embodiments, the at least two enzymes comprise: thermostable α-amylase (e.g., thermostable, bacterial food grade α-amylase). As a further illustration, in some embodiments, the at least two enzymes comprise endo-beta-1,4-glucanase.

In some embodiments, the composition is food grade. As an example, in some embodiments, the composition is a beverage or a food.

Tables 3-14 provide examples of compositions with various characteristics (e.g., reduced viscosity) as a result of certain listed extrusion conditions. For example, Table 3 shows a portion of grain, namely oat bran concentrate, before and after extrusion under various extrusion conditions. As can be seen, extruding oat bran concentrate without enzyme catalyzed hydrolysis resulted in some reduction in the RVA peak viscosity of the oat bran concentrate from 7,879 cP to 6,692 cP. However, extrusion with cellulase-catalyzed hydrolysis resulted in greater reduction in the RVA peak viscosity, to about 5,235 cP. Similarly, extrusion with α-amylase-catalyzed hydrolysis resulted in reduction in the RVA peak viscosity, namely, to 3,028 cP and 2,806 cP, depending on the enzyme concentration. Furthermore, extrusion with both cellulase-catalyzed hydrolysis and α-amylase-catalyzed hydrolysis resulted in a greater reduction in the RVA peak viscosity. It is worthwhile to point out that the viscosity of the dough can affect the pressure and temperature of the dough within the extruder. For example, greater viscosity can result in greater friction-related temperature increases. Similarly, if pressure is measured at one point, a more viscous composition will result in greater pressure at the same point, as a result of frictional pressure loss as the composition is conveyed. In Table 5, Table 9, and Table 13, pressure was measured at the exit end of the extruder screw. Furthermore, in some embodiments, the screw profiles employed build pressure throughout the screw and/or screws so that the exit end of the screw has the highest pressure. Although, some embodiments can have different screw profiles that result, for example, in pressure increasing and then decreasing along an extruder screw and/or screws.

With reference to the following Tables, it is also worthwhile to note that the listed values pertain to a composition comprising flour, water moisture, optionally tocopherol, and optionally enzyme, as indicated. Accordingly, the mass concentrations in the Tables (e.g., wt. %) are given as a fraction of the mass of the composition. Additionally, the moisture (i.e. water moisture including inherent and added water) in the following tables (e.g., Table 3) was generally determined by measuring the composition before and after dehydration and assuming that the difference in weight was caused by evaporation of water.

TABLE 3

Oat Bran Concentrate, wt. % of component, with moisture

| Component | Stream Description | | | | | |
|---|---|---|---|---|---|---|
| | 0 | 1 | 2 | 3 | 4 | 5 |
| Moisture (water) | 7.9 | 7.24 | 8.62 | 7.72 | 9.34 | 10.81 |
| Starch | 31.95 | 32.95 | 31.31 | 30.02 | 29.81 | 29.17 |
| Fat | 10.94 | 9.65 | 9.49 | 9.69 | 9.44 | 9.39 |
| Protein | 19.21 | 18.87 | 18.69 | 19.08 | 18.86 | 18.41 |
| Total Dietary Fiber ("TDF") | 25.2 | 24.9 | 23.9 | 26.2 | 24.6 | 25 |
| Insoluble Dietary Fiber ("IDF") | 21.6 | 15.2 | 14.6 | 19 | 15.6 | 15.1 |
| β-glucan | 11.52 | 11.61 | 11.63 | 12.3 | 12.03 | 12.01 |
| Total sugar | 2.43 | 2.4 | 2.61 | 2.07 | 2.57 | 2.67 |
| Maltose | BQL | BQL | BQL | BQL | 0.28 | BQL |

TABLE 4

Oat Bran Concentrate, wt. % of component, dry basis

| Component | Stream Description | | | | | |
|---|---|---|---|---|---|---|
| | 0 | 1 | 2 | 3 | 4 | 5 |
| Moisture | 0 | 0 | 0 | 0 | 0 | 0 |
| Starch | 34.7 | 35.5 | 34.3 | 32.5 | 32.9 | 32.7 |
| Fat | 11.9 | 10.4 | 10.4 | 10.5 | 10.4 | 10.5 |
| Protein | 20.9 | 20.3 | 20.5 | 20.7 | 20.8 | 20.6 |
| Total Dietary Fiber ("TDF") | 27.4 | 26.8 | 26.2 | 28.4 | 27.1 | 28.0 |
| Insoluble Dietary Fiber ("IDF") | 23.5 | 16.4 | 16.0 | 20.6 | 17.2 | 16.9 |
| β-glucan | 12.5 | 12.5 | 12.7 | 13.3 | 13.3 | 13.5 |
| Total sugar | 2.6 | 2.6 | 2.9 | 2.2 | 2.8 | 3.0 |
| Maltose | BQL | BQL | BQL | BQL | 0.3 | BQL |
| B-glucan MW, Million Dalton | 1.35 | 1.39 | 0.85 | 1.31 | 1.25 | 0.67 |
| RVA peak viscosity, cP | 7879 | 6692 | 5235 | 3028 | 2806 | 1703 |

TABLE 5

Oat Bran Concentrate Extrusion Parameters

| Parameter | Stream Description | | | | | |
|---|---|---|---|---|---|---|
| | 0 | 1 | 2 | 3 | 4 | 5 |
| Type of extruder | N/A | —Werner & Pfleiderer Extruder ZSK-58— | | | | |
| Feed rate of flour, lb/hr (kg/hr)** | N/A | 320 (145.15) | 320 (145.15) | 320 (145.15) | 320 (145.15) | 320 (145.15) |
| Tocopherol, wt. % | N/A | 0.1 | 0.1 | 0.1 | 0.1 | 0.1 |
| Enzyme type | N/A | N/A | c | α | α | c\|α |
| Enzyme amount, wt. % | N/A | N/A | 1.5 | 0.09 | 0.12 | 1.5\|0.12 |
| Moisture at preconditioner exit/extruder inlet, wt. % | N/A | 33 | 33 | 34 | 34 | 34 |
| Dough temperature at preconditioner exit/extruder inlet (e.g., wet mix temperature), ° F. (° C.) | N/A | 173 (78.33) | 152 (66.67) | 175 (79.44) | 169 (76.11) | 169 (76.11) |
| Extruder screw speed, RPM | N/A | 307 | 297 | 307 | 307 | 307 |
| Residence time, min | N/A | 1 | 1 | 1 | 1 | 1 |
| Pressure at exit end of extruder screw, PSI | N/A | 860 | 980 | 1072 | 1101 | 1160 |
| Barrel temperature, ° F. (° C.) | N/A | T | T | T | T | T |
| Extruder die wall exit temperature, ° F. (° C.) | N/A | 325 (162.78) | 318 (158.89) | 314 (156.67) | 312 (155.56) | 309 (153.89) |

TABLE 6

Key for Tables 3-5

| | |
|---|---|
| * | not measured |
| BQL | below quantifiable level (present, if at all, at a level that is below detectable limits) |
| ** | The given feed rate in pounds per hour comprises flour, moisture, enzyme and tocopherol, as applicable. Although the mass concentration of flour (i.e., wt. % of flour) as a fraction of the feed rate is not explicitly given as It is for tocopherol, enzyme, and moisture (i.e., water) content, the mass concentration of the flour can be calculated by assuming the composition for which the feed rate is given consists of flour, moisture, and optionally tocopherol and/or enzyme, as indicated in the Tables. Accordingly, anything that is not moisture, tocopherol, and enzyme is deemed to be flour. |
| 0 | flour feed, unextruded, without tocopherol and without enzyme |
| 1 | flour extruded with tocopherol, but without enzyme |
| 2 | flour extruded with tocopherol and with 1.5 wt. % cellulase as percentage of total composition including cellulase |
| 3 | flour extruded with tocopherol and with 0.09 wt. % α-amylase as percentage of total composition including α-amylase |
| 4 | flour extruded with tocopherol and with 0.12 wt. % α-amylase as percentage of total composition including α-amylase |
| 5 | flour extruded with 0.12 wt. % α-amylase & 1.5 wt. % cellulase as percentage of total composition including α-amylase & cellulase |
| N/A | not applicable |
| c | cellulase |
| α | α-amylase |
| T | Temperature (+/−5° F. or 2.8° C.) in adjacent and sequentially ordered extruder barrel zones 1, 2, 3, 4, 5: 170° F. (76.67° C.), 200° F. (93.33° C.), 225° F. (107.22° C.), 275° F. (135° C.), 300° F. (148.89° C.), respectively |

TABLE 7

Chickpea Flour and Oat/Chickpea blend, wt. % of component, with moisture

| Component | Chickpea flour, 100 wt. % Stream Description | | | Oat/chickpea blend flour, 50/50 wt. % Stream Description | | |
|---|---|---|---|---|---|---|
| | 0 | 1 | 4 | 0 | 1 | 4 |
| Moisture (water) | 8.41 | 12.5 | * | 8.54 | 12.23 | 12.26 |
| Starch | 40.95 | 39.93 | * | 48.6 | 46.88 | 44.75 |
| Fat | 6.63 | 6.35 | * | 6.85 | 6.9 | 6.58 |
| Protein | 22.55 | 20.92 | * | 17.54 | 16.13 | 16.52 |
| Total Dietary Fiber ("TDF") | 8.5 | 11 | * | 10.2 | 8.5 | 9.3 |
| Insoluble Dietary Fiber ("IDF") | 8 | 7.4 | * | 8.1 | 6.3 | 7.2 |
| β-glucan | BQL | BQL | * | 1.77 | 2.02 | 1.95 |
| Total sugar | 2.88 | 3.06 | * | 2.38 | 2 | 1.78 |

TABLE 8

Chickpea Flour and Oat/Chickpea blend, wt. % of component, dry basis

| Component | Chickpea flour, 100 wt. % Stream Description | | | Oat/chickpea blend flour, 50/50 wt. % Stream Description | | |
|---|---|---|---|---|---|---|
| | 0 | 1 | 4 | 0 | 1 | 4 |
| Moisture (water) | 0 | 0 | * | 0 | 0 | 0 |
| Starch | 44.7 | 45.6 | * | 53.1 | 53.4 | 51.0 |
| Fat | 7.2 | 7.3 | * | 7.5 | 7.9 | 7.5 |
| Protein | 24.6 | 23.9 | * | 19.2 | 18.4 | 18.8 |
| Total Dietary Fiber ("TDF") | 9.3 | 12.6 | * | 11.2 | 9.7 | 10.6 |
| Insoluble Dietary Fiber ("IDF") | 8.7 | 8.5 | * | 8.9 | 7.2 | 8.2 |
| β-glucan | * | * | * | 1.9 | 2.3 | 2.2 |
| Total sugar | 3.1 | 3.5 | * | 2.6 | 2.3 | 2.0 |
| RVA peak viscosity | 2439 | 1785 | * | 4753 | 2227 | 1043 |

TABLE 9

Chickpea Flour and Oat/Chickpea Blend Extrusion Parameters

| Parameter | Chickpea flour, 100 wt. % Stream Description | | | Oat/Chickpea blend flour, 50/50 wt. % Stream Description | | |
|---|---|---|---|---|---|---|
| | 0 | 1 | 4 | 0 | 1 | 4 |
| Type of extruder | N/A | E | E | N/A | E | E |
| Feed rate of flour, lb/hr (kg/hr)** | N/A | 320 (145.15) | * | N/A | 320 (145.15) | 320 (145.15) |
| Tocopherol, wt. % | N/A | 0.1 | * | N/A | 0.1 | 0.1 |
| Enzyme type | N/A | N/A | * | N/A | N/A | α |
| Enzyme amount, wt. % | N/A | N/A | * | N/A | N/A | 0.12 |
| Moisture at preconditioner exit/extruder inlet, wt. % | N/A | 32 | * | N/A | 33 | 33 |
| Dough temperature at preconditioner exit/extruder inlet (e.g., WMT), ° F. (° C.) | N/A | 169 (76.11) | * | N/A | 169 (76.11) | 176 (80) |
| Extruder screw speed, RPM | N/A | 318 | * | N/A | 318 | 318 |
| Residence time, min | N/A | 1 | * | N/A | 1 | 1 |
| Pressure at exit end of extruder screw, PSI | N/A | 365 | * | N/A | 437 | 260 |
| Barrel temperature, ° F. (° C.) | N/A | T | * | N/A | T | T |
| Extruder die wall exit temperature, ° F. (° C.) | N/A | 309 (153.89) | * | N/A | 302 (150) | 300 (148.89) |

TABLE 10

Key for Tables 7-9

| | |
|---|---|
| * | not measured |
| ** | The given feed rate in pounds per hour comprises flour, moisture, enzyme and tocopherol, as applicable. Although the mass concentration of flour (i.e., wt. % of flour) as a fraction of the feed rate is not explicitly given as It is for tocopherol, enzyme, and moisture (i.e., water) content, the mass concentration of the flour can be calculated by assuming the composition for which the feed rate is given consists of flour, moisture, and optionally tocopherol and/or enzyme, as indicated in the Tables. Accordingly, anything that is not moisture, tocopherol, and enzyme is deemed to be flour. |
| E | Werner & Pfleiderer Extruder ZSK-58 |
| 0 | flour feed, unextruded, without tocopherol and without enzyme |
| 1 | flour extruded with tocopherol, but without enzyme |
| 4 | flour extruded with tocopherol and with 0.12 wt. % α-amylase as percentage of total composition including α-amylase |
| BQL | below quantifiable level (present, if at all, at a level that is below detectable limits) |
| N/A | not applicable |
| α | α-amylase |
| T | Temperature (+/−5° F. or 2.8° C.) in adjacent and sequentially ordered extruder barrel zones 1, 2, 3, 4, 5: 170° F. (76.67° C.), 200° F. (93.33° C.), 225° F. (107.22° C.), 275° F. (135° C.), 300° F. (148.89° C.), respectively |

TABLE 11

Chickpea Flour and Brown Rice/Chickpea blend, wt. % of component, with moisture*

| Component | Chickpea flour, 100 wt. % Stream Description | | | Brown Rice/chickpea blend flour, 50/50 wt. % Stream Description | | |
|---|---|---|---|---|---|---|
| | 0 | 1 | 4 | 0 | 1 | 4 |
| Moisture (water) | 9.27 | 11.4 | 11 | 10.2 | 10.6 | 10.6 |
| Starch | 41.5 | 40.1 | 40.8 | 56.2 | 55.7 | 55.7 |
| Fat | 5.78 | 5.79 | 5.88 | 4.9 | 5.05 | 4.95 |
| Protein | 21.9 | 21.1 | 21.4 | 14.2 | 14.6 | 14.2 |

TABLE 11-continued

Chickpea Flour and Brown Rice/Chickpea blend, wt. % of component, with moisture*

| | Chickpea flour, 100 wt. % Stream Description | | | Brown Rice/chickpea blend flour, 50/50 wt. % Stream Description | | |
|---|---|---|---|---|---|---|
| Component | 0 | 1 | 4 | 0 | 1 | 4 |
| Total Dietary Fiber ("TDF") | 8.3 | 7.6 | 8 | 5.8 | 5.6 | 5.9 |
| Total sugar | 2.5 | 2.4 | 2.6 | 2.2 | 2.1 | 2.2 |

TABLE 12

Chickpea Flour and Brown Rice/Chickpea blend, wt. % of component, dry basis

| | Chickpea flour, 100 wt. % Stream Description | | | Brown Rice/chickpea blend flour, 50/50 wt. % Stream Description | | |
|---|---|---|---|---|---|---|
| Component | 0 | 1 | 4 | 0 | 1 | 4 |
| Moisture (water) | 0 | 0 | 0 | 0 | 0 | 0 |
| Starch | 45.7 | 45.3 | 45.8 | 62.6 | 62.3 | 62.3 |
| Fat | 6.4 | 6.5 | 6.6 | 5.5 | 5.6 | 5.5 |
| Protein | 24.1 | 23.8 | 24.0 | 15.8 | 16.3 | 15.9 |
| Total Dietary Fiber ("TDF") | 9.1 | 8.6 | 9.0 | 6.5 | 6.3 | 6.6 |
| Total sugar | 2.8 | 2.7 | 2.9 | 2.4 | 2.3 | 2.5 |
| RVA peak viscosity | 2428 | 1590 | 890 | 4110 | 1058 | 700 |
| Starch Avg. MW, Da | 1.95E+08 | 2.23E+07 | 1.37E+07 | 2.79E+08 | 3.42E+07 | 2.40E+07 |

TABLE 13

Chickpea Flour and Oat/Chickpea Blend Extrusion Parameters

| | Chickpea flour, 100 wt. % Stream Description | | | Oat/chickpea blend flour, 50/50 wt. % Stream Description | | |
|---|---|---|---|---|---|---|
| Parameter | 0 | 1 | 4 | 0 | 1 | 4 |
| Type of extruder | N/A | E | E | N/A | E | E |
| Feed rate of flour, lb/hr (kg/hr)** | N/A | 320 (145.15) | 320 (145.15) | N/A | 320 (145.15) | 320 (145.15) |
| Tocopherol, wt. % | N/A | 0.1 | 0.1 | N/A | 0.1 | 0.1 |
| Enzyme type | N/A | N/A | α | N/A | N/A | α |
| Enzyme amount, wt. % | N/A | N/A | 0.12 | N/A | N/A | 0.1 |
| Moisture at preconditioner exit/extruder inlet, wt. % | N/A | 31 | 30 | N/A | 32 | 30 |
| Dough temperature at preconditioner exit/extruder inlet (e.g., WMT), °F. (°C.) | N/A | 172 (77.78) | 167 (75.00) | N/A | 171 (77.22) | 173 (78.33) |
| Extruder screw speed, RPM | N/A | 338 | 348 | N/A | 338 | 348 |
| Residence time, min | N/A | 1 | 1 | N/A | 1 | 1 |
| Pressure at exit end of extruder screw, PSI | N/A | 1504 | 1388 | N/A | 1446 | 1645 |
| Barrel temperature, °F. (°C.) | N/A | T | T | N/A | T | T |
| Extruder die wall exit temperature, °F. (°C.) | N/A | 290 (143.33) | 286 (141.11) | N/A | 287 (141.67) | 285 (140.56) |

TABLE 14

Key for Tables 11-13

| | |
|---|---|
| E | Werner Pfleiderer Extruder ZSK-58 |
| * | Values do not add to 100 wt. % because, for example, certain components (e.g., ash) are not listed |
| 0 | flour feed, unextruded, without tocopherol and without enzyme |
| 1 | flour extruded with tocopherol, but without enzyme |
| 4 | flour extruded with tocopherol and with 0.12 wt. % α-amylase as percentage of total composition including α-amylase |
| BQL | below quantifiable level (not present or present at a level that is below detectable limits) |
| N/A | not applicable |
| α | α-amylase |
| T | Temperature (+/−5° F. or 2.8° C.) in adjacent and sequentially |

TABLE 14-continued

Key for Tables 11-13 ordered extruder barrel zones 1, 2, 3, 4, 5: 170° F. (76.67° C.), 200° F. (93.33° C.), 225° F. (107.22° C.), 275° F. (135° C.), 300° F. (148.89° C.), respectively The Rapid Visco Analyzer ("RVA") peak viscosity of the compositions in Tables 4, 8, and 12 was measured using the following protocol. First, a mixture was formed consisting of a composition comprising at least a portion of pulse and/or grain, a specified wt. % tocopherol, a specified weight percentage of deactivated α-amylase, and a remainder of water. Water was added in an amount to provide the mixture with 14.3 wt. % solids. In other words, if the mixture were completely dehydrated by evaporating away the moisture, 14.3 wt. % solids would remain.

Second, the mixture was mixed by turning a shaft with a paddle at 500 rpm (for 5 seconds) until the composition, the tocopherol, and the deactivated α-amylase had absorbed an equilibrium amount of the water and were fully dispersed in the water to form the dispersion (e.g., generally homogeneous mixture, and to avoid clumps that can cause viscosity measurement errors).

Third, the dispersion was continuously mixed by turning a shaft with a paddle at 160 rpm and the viscosity of the dispersion was continuously measured while subjecting the dispersion to the following temperature profile: (i) holding the dispersion at about 25° C. for about 2 min; (ii) heating the dispersion to about 95° C. over about 5 minutes; (iii) holding the dispersion at about 95° C. for about 3 minutes; (iv) cooling the dispersion from about 95° C. to about 25° C. over about 5 minutes; (v) holding the dispersion at about 25° C. for about 3 min. The RVA peak viscosity was the maximum viscosity measured during steps (ii) and (iii).

In some embodiments, the composition is a first composition comprising a viscosity at 25° C. (e.g., RVA viscosity at 25° C.) equal to at most 75%, 70%, 60%, 50%, 40%, 30%, 20%, 10%, 5%, or equal to about 75-5%, 75-10%, 70-20% (or any range contained in the listed ranges) of a viscosity at 25° C. (e.g., RVA viscosity at 25° C.) of a second composition. For example, the first composition can consist of each ingredient in a first set of ingredients at a specified weight percentage, and the first set of ingredients can comprise the at least a portion of pulse, the at least a portion of grain, and water. Furthermore, the second composition can consist of the first set of ingredients in the specified weight percentages, except that the at least a portion of pulse comprising gelatinized, hydrolyzed starch is replaced with at least a portion of pulse comprising gelatinized, unhydrolyzed starch, and except that the at least a portion of grain comprising gelatinized, hydrolyzed starch is replaced with at least a portion of grain comprising gelatinized, unhydrolyzed starch.

Additionally, in some embodiments, the viscosity (e.g., RVA viscosity at 25° C. (77° F.) or peak RVA viscosity) of a composition (e.g., before or after hydrolysis, as applicable) is equal to any viscosity (e.g., RVA viscosity at 25° C. (77° F.) or peak RVA viscosity, respectively) for a composition (e.g., before or after hydrolysis, as applicable) described herein (e.g., in the tables or elsewhere), or any viscosity range whose endpoints are selected from values described herein. Furthermore, in some embodiments, the viscosity of a composition after hydrolysis can be any value between a value before hydrolysis and a value obtained after a certain degree of hydrolysis. For example, in light of the present specification, a skilled person would understand that the degree of hydrolysis can be adjusted using factors such as temperature, time, moisture level, enzyme level, and other factors, which can in turn be used to adjust the viscosity of a composition after hydrolysis.

Additionally, in some embodiments, the composition is a first composition comprising an RVA peak viscosity equal to at most 75%, 70%, 60%, 50%, 40%, 30%, 20%, 10%, or 5%, or 17% to 5% of an RVA peak viscosity of a second composition. For example, the first composition can consist of each ingredient in a first set of ingredients at a specified weight percentage, and the first set of ingredients can comprise the at least a portion of pulse, the at least a portion of grain, and water. The second composition can consist of the first set of ingredients in the specified weight percentages, except that the at least a portion of pulse comprising hydrolyzed starch is replaced with at least a portion of pulse comprising unhydrolyzed starch, and except that the at least a portion of grain comprising hydrolyzed starch is replaced with at least a portion of grain comprising unhydrolyzed starch. Related examples are provided in Table 4, Table 8, Table 12, and Table 20.

In some embodiments, the average molecular weight of the gelatinized, hydrolyzed starch molecules in the composition is a fraction of the molecular weight of gelatinized, unhydrolyzed starch molecules equivalent (e.g., in kind and condition) to the gelatinized, hydrolyzed starch molecules, except that the gelatinized, unhydrolyzed starch molecules have not been hydrolyzed. For example, the fraction can be selected from the group consisting of about 0.90 to 0.47, 0.80 to 0.47, 0.70 to 0.47, 0.60 to 0.47, 0.50 to 0.47; no more than about 0.90, 0.80, 0.70, 0.60, 0.50; and any range formed from values contained in the listed ranges.

Tables 15-16 below provide examples of the percentage change in the average molecular weight (in Daltons) of starch in whole oat flour as it undergoes controlled hydrolysis during extrusion to provide SoluOat flour. As can be seen, the average molecular weight of the starch in both sample 1 and sample 2 decreased by more than 50%. Accordingly, the molecular weight of the SoluOat flour is only a fraction of the molecular weight of the original whole oat flour starting material. Furthermore, as can be seen, there was only a small change in the wt. % of the starch as a component of the flour. This change was a small increase in sample 1 and a small decrease in sample 2. It should be noted that in some circumstances, the experimental data can be affected by measurement error, detection limits, natural variation in the mass concentration of a component in native plants, or variation in the mass concentration of a component with location in a batch as a result of imperfect mixing throughout the volume of the batch.

Tables 15-16 show how a certain mass of the starch can be shifted from higher molecular weight to lower molecular weight starch. For example, the high molecular weight amylopectin ("HMW-Amylopectin") decreases as a weight percentage of the starch and decreases in average molecular weight. Low molecular weight amylopectin ("LMW-Amylopectin") increases substantially as a weight percentage of the starch and decreases slightly in average molecular weight. The weight percentage of amylose increases slightly as a weight percentage of the starch and decreases substantially in average molecular weight. Accordingly, the average molecular weight of the starch decreases from about $3.7 \times 10^6$ to $1.7 \times 10^6$ Dalton.

TABLE 15

| Sample 1 | Starch in flour wt. % | Starch Avg. MW Da | Starch Component HMW-Amylopectin in starch wt. % | HMW-Amylopectin Avg. MW Da | LMW-Amylopectin in starch wt. % | LMW-Amylopectin Avg. MW Da | Amylose in starch wt. % | Amylose Avg. MW Da |
|---|---|---|---|---|---|---|---|---|
| Whole oat flour | 60.34 | 3.667E+06 | 54.76 | 5.886E+06 | 20.51 | 1.744E+06 | 24.73 | 3.501E+05 |
| SoluOat flour | 61.02 | 1.729E+06 | 35.71 | 2.782E+06 | 39.23 | 1.703E+06 | 25.06 | 2.697E+05 |
| % change | 1.13 | −52.85 | −34.79 | −52.74 | 91.27 | −2.35 | 1.33 | −22.96 |

TABLE 16

| Sample 1 | Starch in flour wt. % | Starch Avg. MW Da | Starch Component HMW-Amylopectin in starch wt. % | HMW-Amylopectin Avg. MW Da | LMW-Amylopectin in starch wt. % | LMW-Amylopectin Avg. MW Da | Amylose in starch wt. % | Amylose Avg. MW Da |
|---|---|---|---|---|---|---|---|---|
| Whole oat flour | 59.9 | 3.873E+06 | 54.17 | 6.243E+06 | 22.44 | 1.983E+06 | 23.88 | 1.962E+05 |
| SoluOat flour | 59.54 | 1.820E+06 | 34.91 | 3.034E+06 | 38.68 | 1.849E+06 | 26.42 | 1.709E+05 |
| % change | −0.60 | −53.02 | −35.55 | −51.40 | 72.37 | −6.76 | 13.00 | −12.90 |

In some embodiments, the average molecular weight of the gelatinized, hydrolyzed starch molecules in the at least a portion of grain is a fraction of the molecular weight of gelatinized, unhydrolyzed starch molecules equivalent (e.g., in kind and condition) to the gelatinized, hydrolyzed starch molecules in the at least a portion of grain, except that the gelatinized, unhydrolyzed starch molecules have not been hydrolyzed. For example, the fraction can be selected from the group consisting of about 0.90 to 0.47, 0.80 to 0.47, 0.70 to 0.47, 0.60 to 0.47, 0.50 to 0.47, no more than about 0.90, 0.80, 0.70, 0.60, 0.50, and any range formed from values contained in the listed ranges.

In some embodiments, the average molecular weight of the gelatinized, hydrolyzed starch molecules in the at least a portion of pulse is a fraction of the molecular weight of gelatinized, unhydrolyzed starch molecules equivalent (e.g., in kind and condition) to the gelatinized, hydrolyzed starch molecules in the at least a portion of pulse, except that the gelatinized, unhydrolyzed starch molecules have not been hydrolyzed. For example, the fraction can be selected from the group consisting of about 0.90 to 0.47, 0.80 to 0.47, 0.70 to 0.47, 0.60 to 0.47, 0.50 to 0.47, no more than about 0.90, 0.80, 0.70, 0.60, 0.50, and any range formed from values contained in the listed ranges.

In some embodiments, the inventors expect the average molecular weight of the hydrolyzed fiber molecules in the composition can be fraction of the molecular weight of unhydrolyzed fiber molecules equivalent (e.g., in kind and condition) to the hydrolyzed fiber molecules, except that the unhydrolyzed fiber molecules have not been hydrolyzed. For example, the inventors expect the fraction can be selected from the group consisting of about 0.90 to 0.25, 0.80 to 0.25, 0.70 to 0.25, 0.60 to 0.25, and 0.50 to 0.25; no more than about 0.90, 0.80, 0.70, 0.60, 0.50, 0.40, and 0.30; and any range formed from values contained in the listed ranges.

Tables 17-21 illustrate further examples of characteristics and extrusion conditions for at least a portion of pulse and/or grain (e.g., a flour) of various types. The extrusion conditions for the various flours shown in Tables 17-21 are provided in Table 17. Table 18 provides a key for various symbols and terms used in Tables 17 and 19-21.

TABLE 17

Extrusion Parameters for Streams of Various Flour Types

| Parameter | Stream Description | | | | | | | | | | |
|---|---|---|---|---|---|---|---|---|---|---|---|
| | 7 | 8 | 9 | 10 | 11 | 12 | 13 | 14 | 15 | 16 | 17 |
| Type of extruder | E | E | E | E | E | E | E | E | E | E | E |
| Feed rate of flour, lb/hr (90.72 kg/hr)** | 200 (90.7) | 200 (90.7) | 260 (118) | 260 (118) | 260 (118) | 260 (118) | 200 (90.7) | 200 (90.7) | 200 (90.7) | 200 (90.7) | 200 (90.7) |
| Tocopherol, wt. % | 0.5 | 0.5 | 0.5 | 0.5 | 0.5 | 0.5 | 0.5 | 0.5 | 0.5 | 0.5 | 0.5 |
| Enzyme type | α | α | α | α | α | α | α | α | α | α | α |
| Enzyme amount, wt. % | 0.12 | 0.12 | 0.12 | 0.06 | 0.06 | 0.15 | 0.096 | 0.1 | 0.1 | 0.1 | 0.1 |

TABLE 17-continued

Extrusion Parameters for Streams of Various Flour Types

| Parameter | Stream Description | | | | | | | | | | |
|---|---|---|---|---|---|---|---|---|---|---|---|
| | 7 | 8 | 9 | 10 | 11 | 12 | 13 | 14 | 15 | 16 | 17 |
| Moisture at preconditioner exit/extruder inlet, wt. % | 32 | 32 | 29 | 29 | * | 31 | 31 | 31 | 31 | 33 | 33 |
| Dough temperature at preconditioner exit/extruder inlet (e.g., WMT), °F./°C. | 171/ 77.22 | 167/ 75.00 | 168/ 75.56 | 172/ 77.78 | 172/ 77.78 | 174/ 78.89 | 166/ 74.44 | 166/ 74.44 | 168/ 75.56 | 166/ 74.44 | 168/ 75.56 |
| Extruder screw speed, RPM | 280 | 260 | 330 | 330 | 330 | 330 | 260 | 260 | 260 | 260 | 260 |
| Residence time, min | 1 | 1 | 1 | 1 | 1 | 1 | 1 | 1 | 1 | 1 | 1 |
| Pressure at exit end of extruder screw, PSI | * | * | * | * | * | * | * | * | * | * | * |
| Barrel temperature, °F. (°C.) | T | T | T | T | T | T | T | T | T | T | T |
| Extruder die wall exit temperature, °F./°C. | 285/ 140.56 | 290/ 143.33 | 288/ 142.22 | 284/ 140.00 | 285/ 140.56 | 285/ 140.56 | 300/ 148.89 | 287/ 141.67 | 284/ 140.00 | 287/ 141.67 | 290/ 143.33 |

TABLE 18

Key for Tables 17 and 19-21

| | |
|---|---|
| * | not measured |
| 7 | Green Groat |
| 8 | HiFi oat |
| 9 | Oat bran |
| 10 | Brown rice |
| 11 | White rice |
| 12 | RM blend (about 70 wt. % oat, 10 wt. % barley, 10 wt. % rye and 10 wt. % wheat); |
| 13 | Barley |
| 14 | Quinoa |
| 15 | Amaranth |
| 16 | Oat + Yellow pea, 50:50 wt. % blend |
| 17 | Oat + Pinto bean, 50:50 wt. % blend |
| E | Werner & Pfleiderer Extruder ZSK-58 |
| α | α-amylase |
| T | Temperature (+/−5° F. or 2.8° C.) in adjacent and sequentially ordered extruder barrel zones 1, 2, 3, |

TABLE 18-continued

Key for Tables 17 and 19-21

| | |
|---|---|
| | 4, 5: 170° F. (76.67° C.), 200° F. (93.33° C.), 225° F. (107.22° C.), 275° F. (135° C.), 300° F. (148.89° C.), respectively |

Table 19 provides particle size analysis using laser diffraction for the at least a portion of pulse and/or grain after extrusion. Providing a desired particle size can be useful to provide a desired degree of dispersibility. Furthermore, as a skilled person would understand after reading the present disclosure, additional embodiments can be provided in which a characteristic listed herein (e.g., Dx (10)) is equal to a first range whose endpoints are selected from any values listed herein (e.g., 33.8-52 μm). Moreover, additional embodiments can be provided in which a listed characteristic is equal to a second range whose endpoints are selected from any values contained within the first range.

TABLE 19

Malvern Particle Size Analysis Using Laser Diffraction for Various Streams of Flour After Extrusion and Milling

| Equivalent Spherical Diameter | Stream Description | | | | | | | | | | |
|---|---|---|---|---|---|---|---|---|---|---|---|
| | 7 | 8 | 9 | 10 | 11 | 12 | 13 | 14 | 15 | 16 | 17 |
| Dx (10), μm | 33.8 | 24.7 | 39.4 | 44 | 56.4 | 42.3 | 52 | 55.2 | * | 38.9 | * |
| Dx (50), μm | 119.7 | 82.6 | 141.2 | 143.4 | 155.3 | 139.4 | 185.1 | 150.9 | * | 130.2 | * |
| Dx (90), μm | 238.2 | 181.6 | 273.5 | 291.5 | 299.4 | 259.4 | 336.7 | 271.2 | * | 249.6 | * |
| D [4,3], μm | 130.3 | 94.5 | 151.5 | 157.8 | 168.4 | 147.3 | 193.4 | 159 | * | 139.2 | * |

| Key | |
|---|---|
| Equivalent Spherical Diameter | size of a particle determined by calculating the diameter of a sphere that would cause the measured result (e.g., in this case, light diffraction) for the particle |
| Dx (10) | 10% by volume of particles in a sample have a size below the Dx (10) size |
| Dx (50) | 50% by volume of particles in a sample have a size below the Dx (50) size |
| Dx (90) | 90% by volume of particles in a sample have a size below Dx (90) size |
| D [4,3] | mean diameter for particles in a sample on a volume-weighted basis |

Table 20 provides various measured characteristics for at least a portion of pulse and/or grain before and after extrusion. As can be seen in Table 20, the viscosity (and other characteristics) of various native grains and/or pulses vary. Additionally, the viscosity (and other characteristics) can vary among varieties of the same species of grain and/or pulse. Furthermore, the viscosity (and other characteristics) of even a single variety of grain and/or pulse can vary with factors such as season, location, growing conditions, etc.

the dispersion to about 95° C. over about 1 minute (ii) holding the dispersion at about 95° C. for about 11 minutes; (iii) cooling the dispersion to about 70° C. over about 1 minute; (iv) holding the dispersion at about 70° C. for about 5 minutes; (v) cooling the dispersion from about 70° C. to about 25° C. over about 8 minutes; (vi) holding the dispersion at about 25° C. for about 6 minutes. The RVA viscosity at 25° C. is the viscosity measured immediately after the dispersion has been subject to the temperature profile. In

TABLE 20

Characteristics for Streams of Various Types of Flour Before and After Extrusion

| Characteristic | Stream Description | | | | | | | | | | |
|---|---|---|---|---|---|---|---|---|---|---|---|
| | 7 | 8 | 9 | 10 | 11 | 12 | 13 | 14 | 15 | 16 | 17 |
| starch content before, wt. % | 51.4 | 48.7 | 44.0 | 61.0 | 72.7 | 55.7 | 55.0 | 52.1 | 52.6 | 48.1 | 51.4 |
| starch content after, wt. % | 55.1 | 47.5 | 47.8 | 62.1 | 68.8 | 52.8 | 54.5 | 55.3 | 51.7 | 47.7 | 44.8 |
| % difference | 7.2 | −2.5 | 8.6 | 1.8 | −5.4 | −5.2 | −0.9 | 6.1 | −1.7 | −0.8 | −12.8 |
| fiber content before, wt. % | 10.2 | 12.2 | 15.8 | 4.2 | 1.2 | 10.9 | 13.3 | 6.3 | 7.7 | 5.1 | 8.9 |
| fiber content after, wt. % | 10.2 | 10.6 | 11.5 | 5.5 | 1.2 | 10.5 | 10.9 | 6.2 | 7.3 | 7.6 | 11.7 |
| % difference | 0.0 | −13.1 | −27.2 | 31.0 | 0.0 | −3.7 | −18.0 | −1.6 | −5.2 | 49.0 | 31.5 |
| RVA peak viscosity before, cP | 8076 | 7849 | 7979 | 9407 | 12442 | 8587 | 8005 | 5825 | 2031 | 5163 | 4978 |
| RVA peak viscosity after, cP | 1973 | 2256 | 3389 | 1910 | 949 | 1024 | 2203 | 517 | 30 | 2457 | 1857 |
| % difference | −75.6 | −71.3 | −57.5 | −79.7 | −92.4 | −88.1 | −72.5 | −91.1 | −98.5 | −52.4 | −62.7 |
| RVA Viscosity at 25° C. before, cP | 1015 | 1012 | 861 | 350 | 439 | 714 | 980 | 97 | 175 | 320 | 340 |
| RVA Viscosity at 25° C. after, cP | 312 | 166 | 145 | 50 | 33 | 142 | 78 | 37 | 20 | 72 | 107 |
| % difference | −69.3 | −83.6 | −83.2 | −85.7 | −92.5 | −80.1 | −92.0 | −61.9 | −88.6 | −77.5 | −68.5 |

The Rapid Visco Analyzer ("RVA") peak viscosity of the compositions in Table 20 was measured using the protocol discussed with reference to Tables 4, 8, and 12. The RVA viscosity at 25° C. of the compositions in Table 20 was measured using the following protocol. First, a mixture was formed consisting of a composition comprising at least a portion of pulse and/or grain, a specified wt. % tocopherol, a specified weight percentage of deactivated α-amylase, and a remainder of water. Water was added in an amount to provide the mixture with 6 wt. % solids. In other words, if the mixture were completely dehydrated by evaporating away the moisture, 6 wt. % solids would remain.

Second, the mixture was mixed by turning a shaft with a paddle at 500 rpm (for 5 seconds) until the composition, the tocopherol, and the deactivated α-amylase have absorbed an equilibrium amount of the water and are fully dispersed in the water to form the dispersion (e.g., generally homogeneous mixture, and to avoid clumps that can cause viscosity measurement errors).

Third, the dispersion was continuously mixed by turning a shaft with a paddle at 160 rpm and the viscosity of the dispersion was continuously measured while subjecting the dispersion to the following temperature profile: (i) heating other words, the RVA viscosity at 25° C. is the viscosity measured immediately after holding the dispersion at about 25° C. for about 6 minutes.

Using a measurement protocol such as the protocol for the RVA viscosity at 25° C. can be useful, for example, to provide a way to compare the viscosity of compositions that are consumed or used after starch gelatinization. This is so because the RVA viscosity measurement protocol involves heating and hydrating the composition, which gelatinizes starch in the composition.

Table 21 provides various sensory characteristics for at least a portion of pulse and/or grain after extrusion. The sensory characteristics were characterized using a trained panel with 9 people. The individuals on the panel were given samples in duplicate and the results were averaged. Each sample was a slurry consisting of 5 wt. % of an extruded flour as shown and 95 wt. % water (e.g., 5 grams of the extruded flour was added to 95 grams of water). The results indicate the percentage of panelists who perceived the sample to have the listed characteristic (e.g., sticky).

TABLE 21

Sensory (Mouthfeel) Characteristics for Streams of Various Types of Flour After Extrusion

| Charac-teristic | Stream Description | | | | | | | | | | |
|---|---|---|---|---|---|---|---|---|---|---|---|
| | 7 | 8 | 9 | 10 | 11 | 12 | 13 | 14 | 15 | 16 | 17 |
| Sticky | 38% | 31% | 31% | 19% | * | 31% | 25% | 6% | * | 19% | * |
| Filmy | 94% | 94% | 81% | 44% | * | 69% | 88% | 63% | * | 56% | * |
| Oily | 0% | 13% | 13% | 6% | * | 0% | 13% | 0% | * | 6% | * |
| Gritty | 6% | 0% | 6% | 25% | * | 13% | 13% | 19% | * | 19% | * |
| Grainy | 6% | 0% | 6% | 0% | * | 6% | 6% | 0% | * | 13% | * |
| Chalky | 63% | 44% | 44% | 75% | * | 75% | 50% | 56% | * | 69% | * |

Tables 22-25 provide examples of compositions with various characteristics (e.g., compositions) as a result of certain listed extrusion conditions. For example, Tables 22A-22B shows the composition of oat flour before (e.g., "Flour Feed" sample) and after extrusion under various extrusion conditions. The weight percentage of enzyme in the description indicates the weight percent of enzyme present in the feed to the extruder as a fraction of the entire mass (including the enzyme) of the feed to the extruder. The "control" sample shows oat flour that has been extruded without enzyme-catalyzed hydrolysis.

Turning to sugar content, extruding oat flour without enzyme-catalyzed hydrolysis (e.g., "Control" sample) resulted in a reduction in the measured sugar content from 1.3 wt. % to 1.13 wt. %. This reduction may have been caused by the decomposition of sucrose to sugars or other components that were present at undetected levels. However, as with any other proposed theories herein, Applicants do not intend to be bound by any such theoretical discussion. A similar measured reduction occurred during extrusion with cellulase-catalyzed hydrolysis using 0.5 wt. % cellulase, where the measured sugar content of the composition was reduced from 1.3 wt. % to 1.14 wt. %. Regarding the molecular weight of beta-glucan in the 0.12 wt. % amylase sample, the decrease in measured molecular weight may have been the result of a decrease in solubility or extractability of the beta-glucan as a result of the enzyme treatment. For example, this seems more likely than the idea that α-amylase itself reduced the molecular weight of the beta-glucan as α-amylase specifically catalyzes starch hydrolysis.

TABLE 22A

Extrusion of Flour Feed with varying Types and Amounts of Enzyme Added to the Flour Feed Before Extrusion

| | Test Code | | | | | | | | |
|---|---|---|---|---|---|---|---|---|---|
| | BGLU | FATG | H2OLTGA | IDF | PROT-RPD | SDF | STRC | SUGH | MolWt-Bluc |
| | Unit | | | | | | | | |
| Description of Stream with wt. % enzyme | wt. % B-Glucan | wt. % Fat | wt. % Moisture | wt. % insoluble dietary fiber | wt. % protein | wt. % soluble dietary fiber | wt. % Starch | wt. % Total Sugar | Million Da |
| Flour Feed | 3.66 | 7.28 | 7.33 | 6.63 | 14.2 | 4.33 | 55.43 | 1.3 | 0.814 |
| Control | 4.43 | 7.24 | 12.76 | 8.24 | 21.43 | 5.25 | 37.21 | 1.13 | 1.590 |
| Amylase 0.12% | 3.06 | 7.45 | 13.4 | 4.65 | 15.28 | 5.78 | 46.07 | 1.07 | 1.080 |
| Cellulase 0.5% | 4.15 | 7.26 | 12.04 | 7.76 | 21.46 | 5.08 | 40.48 | 1.14 | 0.722 |
| Cellulase 1.0% A | 3.35 | 7.45 | 11.24 | 6.94 | 21.49 | 3.89 | 43.07 | 1.57 | 0.462 |
| Cellulase 1.0% B | 3.25 | 7.54 | 12.26 | 6.76 | 20.35 | 3.78 | 42.09 | 1.25 | 0.338 |
| Cellulase 1.5% | 3.11 | 7.53 | 11.83 | 6.73 | 21.1 | 4.01 | 41.29 | 1.36 | 0.420 |
| Cellulase 1.5%, amylase 0.12% | 3.06 | 7.31 | 11.85 | 5.36 | 13.58 | 4.42 | 48.43 | 1.49 | 0.409 |

TABLE 22B

Extrusion of Flour Feed with varying Types and Amounts of Enzyme Added to the Flour Feed Before Extrusion

| | Test Code | | | | | |
|---|---|---|---|---|---|---|
| | SUGH | SUGH | SUGH | SUGH | SUGH | SUGH |
| | Unit | | | | | |
| Description of Stream with wt. % enzyme | wt. % Fructose | wt. % Glucose | wt. % Sucrose | wt. % Maltose | wt. % Lactose | wt. % Total Sugar |
| Flour Feed | BQL | BQL | 1.3 | BQL | BQL | 1.3 |
| Control | BQL | BQL | 1.13 | BQL | BQL | 1.13 |
| Amylase 0.12% | BQL | BQL | 1.07 | BQL | BQL | 1.07 |

TABLE 22B-continued

Extrusion of Flour Feed with varying Types and Amounts of Enzyme Added to the Flour Feed Before Extrusion

| Description of Stream with wt. % enzyme | Test Code |  |  |  |  |  |
|---|---|---|---|---|---|---|
|  | SUGH | SUGH | SUGH Unit | SUGH | SUGH | SUGH |
|  | wt. % Fructose | wt. % Glucose | wt. % Sucrose | wt. % Maltose | wt. % Lactose | wt. % Total Sugar |
| Cellulase 0.5% | BQL | BQL | 1.14 | BQL | BQL | 1.14 |
| Cellulase 1.0% A | BQL | 0.46 | 1.11 | BQL | BQL | 1.57 |
| Cellulase 1.0% B | BQL | 0.37 | 0.88 | BQL | BQL | 1.25 |
| Cellulase 1.5% | BQL | 0.39 | 0.97 | BQL | BQL | 1.36 |
| Cellulase 1.5%, amylase 0.12% | BQL | 0.52 | 0.98 | BQL | BQL | 1.49 |

TABLE 23

Test Code Legend for Table 22

| Test Code | Test Description |
|---|---|
| BGLU | Beta-Glucan content by Enzymatic Method by TM900.235 |
| FATG | Fat content by Gas Chromatography by method 70 |
| H2OLTGA | Water moisture content by Thermogravimetric Analysis - 18 min @ 145° C. by TM900.229 |
| IDF | Insoluble Dietary Fiber content by AOAC991.43 |
| MolWt-Bluc | Molecular Weight analysis for Beta-Glucan |
| PROT- | Protein content by Dumas Combustion method by |
| RPD | TM900.224 |
| SDF | Soluble Dietary Fiber content by AOAC991.43 |
| STRC | Starch content by Enzymatic, Ultraviolet-visible spectrophotometer by AOAC 996.11 |
| SUGH | Sugar by high performance liquid chromatography by method 173 |

TABLE 24

Oat Flour Extrusion Conditions for Table 22

| Parameter | Stream Description |  |  |  |  |  |  |  |
|---|---|---|---|---|---|---|---|---|
|  | Flour Feed | Control | Cellulase 0.5% | Cellulase 1.0% A | Cellulase 1.0% B | Cellulase 1.5% | Amylase 0.12% | Cellulase 1.5%, amylase 0.12% |
| Type of extruder | N/A | E | E | E | E | E | E | E |
| Feed rate of flour, lb/hr (kg/hr)** | N/A | 320 (145.15) | 320 (145.15) | 320 (145.15) | 320 (145.15) | 320 (145.15) | 320 (145.15) | 320 (145.15) |
| Tocopherol, wt. % | N/A | 0.1 | 0.1 | 0.1 | 0.1 | 0.1 | 0.1 | 0.1 |
| Enzyme type | N/A | N/A | c | c | c | c | α | α/c |
| Enzyme amount as fraction of entire feed rate, wt. % | N/A | N/A | 0.5 | 1 | 1 | 1.5 | 0.12 | 0.12/ 1.5 |
| Moisture at preconditioner exit/extruder inlet, wt. % | N/A | 32.6 | 32.6 | 32.6 | 32.6 | 33 | 32.6 | 32.6 |
| Dough temperature at preconditioner exit/extruder inlet (e.g., WMT), ° F. (° C.) | N/A | 171 (72.22) | 172 (77.78) | 175 (79.44) | 175 (79.44) | 172 (77.78) | 175 (79.44) | 172 (77.78) |
| Extruder screw speed, RPM | N/A | 316 | 318 | 318 | 318 | 318 | 315 | 315 |
| Residence time, min | N/A | 1 | 1 | 1 | 1 | 1 | 1 | 1 |
| Pressure at exit end of extruder screw, PSI | N/A | 800 | 890 | 916 | 916 | 866 | 903 | 797 |
| Barrel temperature, ° F. (° C.) | N/A | T | T | T | T | T | T | T |

TABLE 24-continued

Oat Flour Extrusion Conditions for Table 22

Stream Description

| Parameter | Flour Feed | Control | Cellulase 0.5% | Cellulase 1.0% A | Cellulase 1.0% B | Cellulase 1.5% | Amylase 0.12% | Cellulase 1.5%, amylase 0.12% |
|---|---|---|---|---|---|---|---|---|
| Extruder die wall exit temperature, ° F./° C. | N/A | 305/ 151.67 | 286/ 141.11 | 287/ 141.67 | 287/ 141.67 | 286/ 141.11 | 291/ 143.89 | 289/ 142.78 |

TABLE 25

Key for Tables 22-24

| | |
|---|---|
| Flour Feed | flour feed, unextruded, without tocopherol and without enzyme |
| Control | flour extruded with tocopherol, but without enzyme |
| Cellulase 0.5% | flour extruded with tocopherol and with 0.5 wt. % cellulase as percentage of total composition including cellulase |
| Cellulase 1.0% A | flour extruded with tocopherol and with 1.0 wt. % cellulase as percentage of total composition including cellulase (sample A) |
| Cellulase 1.0% B | flour extruded with tocopherol and with 1.0 wt. % cellulase as percentage of total composition including cellulase (sample B) |
| Cellulase 1.5% | flour extruded with tocopherol and with 1.5 wt. % cellulase as percentage of total composition including cellulase |
| Amylase 0.12% | flour extruded with tocopherol and with 0.12 wt. % α-amylase as percentage of total composition including α-amylase |
| Cellulase 1.5%, amylase 0.12% | flour extruded with 0.12 wt. % α-amylase & 1.5 wt. % cellulase as percentage of total composition including α-amylase & cellulase |
| E | Werner & Pfleiderer Extruder ZSK-58 |
| T | Temperature (+/−5° F. or 2.8° C.) in adjacent and sequentially ordered extruder barrel zones 1, 2, 3, 4, 5: 170° F. (76.67° C.), 200° F. (93.33° C.), 225° F. (107.22° C.), 275° F. (135° C.), 300° F. (148.89° C.), respectively |
| * | not measured |
| BQL | below quantifiable level (present, if at all, at a level that is below detectable limits) |
| ** | The given feed rate in pounds per hour comprises flour, moisture, enzyme and tocopherol, as applicable. Although the mass concentration of flour (i.e., wt. % of flour) as a fraction of the feed rate is not explicitly given as It is for tocopherol, enzyme, and moisture (i.e., water) content, the mass concentration of the flour can be calculated by assuming the composition for which the feed rate is given consists of flour, moisture, and optionally tocopherol and/or enzyme, as indicated in the Tables. Accordingly, anything that is not moisture, tocopherol, and enzyme is deemed to be flour. |
| N/A | not applicable |
| c | cellulase |
| α | α-amylase |

In Table 24, pressure was measured at the exit end of the extruder screw. With reference to the following Tables, it is also worthwhile to note that the listed values pertain to a composition comprising flour, water moisture, optionally tocopherol, and optionally enzyme, as indicated. Accordingly, the mass concentrations in the Tables (e.g., wt. %) are given as a fraction of the mass of the composition. Additionally, the moisture (i.e. water moisture including inherent and added water) in the following tables (e.g., Table 3) was generally determined by measuring the composition before and after dehydration and assuming that the difference in weight was caused by evaporation of water. As can be seen, several characteristics of various embodiments have been described herein, for example, in the various Tables, Figures and description. It should be understood that for every characteristic listed herein, some embodiments can be provided in which the value of the characteristic is provided over a selected range whose end points are selected from any value for that characteristic (e.g., viscosity, composition, etc.) listed herein. Also, in further embodiments, the value of the characteristic can be selected from any range (or value) contained in the selected range. For example, in one embodiment, the molecular weight of beta-glucan in a composition after cellulase-catalyzed hydrolysis (e.g., in an extruder) is about 0.338 to about 0.722 Million Dalton. As another example, in one embodiment, the molecular weight of beta-glucan in a composition after 1.0 wt. % cellulase-catalyzed hydrolysis is about 0.338 to about 0.462 Million Dalton.

Although various embodiments of the invention have been described herein, the features, elements, and/or steps of the embodiments and equivalent features, elements, and/or steps can be combined, interchanged, and/or omitted to form further embodiments, for example, as appropriate in light of the disclosure or as would be apparent to a person having ordinary skill in the art upon reading the disclosure.

Additional Embodiments

The following clauses are offered as further description of the disclosed invention:
1. A composition comprising:
at least one material selected from the group consisting of at least a portion of grain and at least a portion of pulse;
wherein the at least one material comprises hydrolyzed starch (e.g., gelatinized, hydrolyzed starch) and hydrolyzed fiber;
wherein the hydrolyzed starch consists of starch molecules (e.g., gelatinized, hydrolyzed starch molecules);
wherein the average molecular weight of the hydrolyzed starch molecules (e.g., gelatinized, hydrolyzed starch molecules) in the composition is a first fraction of the molecular weight of unhydrolyzed starch molecules (e.g., gelatinized, unhydrolyzed starch molecules);
wherein the unhydrolyzed starch molecules (e.g., gelatinized, unhydrolyzed starch molecules) are equivalent in kind and condition to the hydrolyzed starch molecules (e.g., gelatinized, hydrolyzed starch molecules), except that the unhydrolyzed starch molecules (e.g., gelatinized, unhydrolyzed starch molecules) have not been hydrolyzed;
wherein the first fraction is selected from the group consisting of no more than about 0.80, 0.70, 0.60, 0.50, 0.40, 0.30, 0.20, and 0.10;
wherein the hydrolyzed fiber consists of fiber molecules; and
wherein the average molecular weight of the hydrolyzed fiber molecules in the composition is a second fraction of the molecular weight of unhydrolyzed fiber molecules;

wherein the unhydrolyzed fiber molecules are equivalent in kind and condition to the hydrolyzed fiber molecules, except that the unhydrolyzed fiber molecules have not been hydrolyzed;

wherein the second fraction is selected from the group consisting no more than about 0.80, 0.70, 0.60, 0.50, 0.40, 0.30, 0.20, and 0.10.

2. The composition of any of clauses 1-59, excepting the present clause and clauses 4, 7, 8, 10, 17, 29, 30, 33-34, 41-42, 51, 53, 58 and 59:

wherein the at least one material is hydrolyzed-starch-and-fiber whole grain comprising hydrolyzed starch and hydrolyzed fiber; and wherein the hydrolyzed-starch-and-fiber whole grain has within a tolerance of +/−20% (optionally, 10%, 5%, 2% or 1%) the same mass ratio of starch to protein as unhydrolyzed whole grain equivalent in kind and condition to the hydrolyzed-starch-and-fiber whole grain, except that the unhydrolyzed whole grain has not been hydrolyzed.

3. The composition of any of clauses 1-59, excepting the present clause and clauses 4, 7, 8, 10, 17, 29, 30, 33-34, 41-42, 51, 53, 58 and 59:

wherein the at least one material is hydrolyzed-starch-and-fiber whole grain comprising hydrolyzed starch and hydrolyzed fiber; and wherein the hydrolyzed-starch-and-fiber whole grain has a mass ratio selected from the group of mass ratios consisting of:

a mass ratio of fiber to protein equal, within a tolerance of +/−20% (optionally, 10%, 5%, 2% or 1%), to a mass ratio of fiber to protein of unhydrolyzed whole grain equivalent in kind and condition to the hydrolyzed-starch-and-fiber whole grain, except that the unhydrolyzed whole grain has not been hydrolyzed;

a mass ratio of fat to protein equal, within a tolerance of +/−20% (optionally, 10%, 5%, 2% or 1%), to a mass ratio of fat to protein of unhydrolyzed whole grain equivalent in kind and condition to the hydrolyzed-starch-and-fiber whole grain, except that the unhydrolyzed whole grain has not been hydrolyzed;

a mass ratio of starch to protein equal, within a tolerance of +/−20% (optionally, 10%, 5%, 2% or 1%), to a mass ratio of starch to protein of unhydrolyzed whole grain equivalent in kind and condition to the hydrolyzed-starch-and-fiber whole grain, except that the unhydrolyzed whole grain has not been hydrolyzed; and any combination thereof.

4. The composition of any of clauses 1-59, excepting the present clause and clauses 2-3, 7-8, 10, and 25-59:

wherein the at least one material is hydrolyzed-starch-and-fiber pulse (e.g., whole pulse) comprising hydrolyzed starch and hydrolyzed fiber; and wherein the hydrolyzed-starch-and-fiber pulse has, within a tolerance of +/−30% (optionally, 25%, 20%, 15%, 10%, 5%, 4%, 3%, 2% or 1%) the same mass ratio of starch to protein as unhydrolyzed pulse equivalent in kind and condition to the hydrolyzed-starch-and-fiber pulse, except that the unhydrolyzed pulse has not been hydrolyzed.

5. The composition of any of clauses 1-59, excepting the present clause:

wherein the hydrolyzed starch molecules have an average molecular weight of no more than about $3.4 \times 10^6$ (optionally, $3.0 \times 10^6$, $2.5 \times 10^6$, $2.0 \times 10^6$, $1.8 \times 10^6$, $1.7 \times 10^6$) Dalton.

6. The composition of any of clauses 1-59, excepting the present clause:

wherein the hydrolyzed fiber molecules have an average molecular weight of no more than about 700,000 Dalton (e.g., about 500,000-700,000)

7. The composition of any of clauses 1-59, excepting the present clause and clauses 2-4, 17, 25-28, 31-50, and 52-59:

wherein the at least one material is hydrolyzed-starch-and-fiber bran composition (e.g., oat bran, rice bran, wheat bran, sorghum bran, bran concentrates thereof, etc.) comprising hydrolyzed starch and hydrolyzed fiber; and wherein the hydrolyzed-starch-and-fiber bran composition has within a tolerance of +/−20% (optionally, 10%, 5%, 2% or 1%) the same mass ratio of starch to protein as an unhydrolyzed bran composition equivalent in kind and condition to the hydrolyzed-starch-and-fiber bran composition, except that the unhydrolyzed bran composition has not been hydrolyzed.

8. The composition of any of clauses 1-59, excepting the present clause and clauses 2-4, 17, 25-28, 31-50, and 52-59:

wherein the at least one material is hydrolyzed-starch-and-fiber bran comprising hydrolyzed starch and hydrolyzed fiber; and wherein the hydrolyzed-starch-and-fiber bran has a mass ratio selected from the group of mass ratios consisting of:

a mass ratio of fiber to protein equal, within a tolerance of +/−20% (optionally, 10%, 5%, 2% or 1%), to a mass ratio of fiber to protein of unhydrolyzed bran equivalent in kind and condition to the hydrolyzed-starch-and-fiber bran, except that the unhydrolyzed bran has not been hydrolyzed;

a mass ratio of fat to protein equal, within a tolerance of +/−20% (optionally, 10%, 5%, 2% or 1%), to a mass ratio of fat to protein of unhydrolyzed bran equivalent in kind and condition to the hydrolyzed-starch-and-fiber bran, except that the unhydrolyzed bran has not been hydrolyzed;

a mass ratio of starch to protein equal, within a tolerance of +/−20% (optionally, 10%, 5%, 2% or 1%), to a mass ratio of starch to protein of unhydrolyzed bran equivalent in kind and condition to the hydrolyzed-starch-and-fiber bran, except that the unhydrolyzed bran has not been hydrolyzed; and any combination thereof.

9. The composition of clause 7:

wherein the hydrolyzed-starch-and-fiber bran composition is oat bran;

wherein the oat bran comprises:

at least about 5.5 wt. % beta-glucan on a total dry weight basis;

at least about 16.0 wt. % dietary fiber on a total dry weight basis; and wherein at least one-third of the total dietary fiber is soluble fiber.

10. The composition of clause 7:

wherein the hydrolyzed-starch-and-fiber bran composition is oat bran concentrate;

wherein the oat bran concentrate comprises:

at least about 10 wt. % beta-glucan on a total dry weight basis;

at least about 29.1 wt. % dietary fiber on a total dry weight basis; and wherein at least one-third of the total dietary fiber is soluble fiber.

11. The composition of any of clauses 1-59, excepting the present clause:

wherein the composition is a powder (e.g., a flour).

12. The composition of any of clauses 1-59, excepting the present clause:
    wherein the composition comprises a liquid; and
    wherein the at least one material is fully hydrated by (e.g., has absorbed an equilibrium concentration of) the liquid and suspended in the liquid (e.g., dispersed in an excess amount of the liquid) to form a suspension.
13. The composition of clause 12:
    wherein the composition comprises at least 6 wt. % of the at least one material.
14. The composition of any of clauses 1-59, excepting the present clause:
    wherein the composition comprises a liquid; and
    wherein the liquid is a water-based liquid selected from the group consisting of water, mammalian milk (e.g., cow's milk, sheep's milk, goat's milk etc.), soy milk, grain milk (e.g., rice milk), nut milk (e.g., almond milk, hazelnut milk), coconut milk, fruit juice, and vegetable juice.
15. The composition of any of clauses 1-59, excepting the present clause:
    wherein the composition comprises a powder hydrated by a water-based liquid,
    wherein the powder consists of powder particles;
    wherein the powder particles have an average particle size equal to about 50-200 microns on a volume-weighted basis;
    optionally wherein 10% by volume of the powder particles have a particle size smaller than about 56.4 (optionally, 55, 50, 45, 40, 35, 30, 25) microns;
    optionally wherein 50% by volume of the powder particles have a particle size smaller than about 190 (optionally, 180, 170, 160, 150, 140, 130) microns;
    optionally wherein 90% by volume of the powder particles have a particle size smaller than about 340 (optionally, 320, 300, 280, 260, 240, 220, 200, 180) microns; and
    wherein the particle size is the diameter of a sphere that would provide the same laser diffraction measurements as the particle.
16. The composition of any of clauses 1-59, excepting the present clause:
    wherein the at least one material comprises the at least a portion of grain; and
    wherein the grain is selected from the group consisting of wheat, oat, barley, corn, white rice, brown rice, barley, millet, sorghum, rye, triticale, teff, spelt, buckwheat, *quinoa*, amaranth, kaniwa, cockscomb, green groat and combinations thereof.
17. The composition of any of clauses 1-59, excepting the present and clauses 2-3, 7-8, 10, and 25-59:
    wherein the at least one material comprises the at least a portion of pulse; and
    wherein the pulse is selected from the group consisting of peas, lentils, chickpeas, navy beans, black turtle beans, cranberry beans, kidney beans, pinto beans, small red beans, Dutch brown beans, pink beans and combinations thereof.
18. The composition of any of clauses 1-59, excepting the present clause:
    wherein the composition comprises at least two enzymes (e.g., multiple kinds of deactivated enzymes, α-amylase and endo-glucanase or cellulase).
19. The composition of any of clauses 1-59, excepting the present clause:
    wherein the hydrolyzed fiber comprises insoluble fiber molecules;
    wherein the insoluble fiber molecules have an average molecular weight equal to no more than about 1,000,000 Dalton.
20. The composition of any of clauses 1-59, excepting the present clause:
    wherein the composition is food grade (e.g., wherein the composition is selected from a food and a beverage).
21. The composition of any of clauses 1-59, excepting the present clause: wherein the composition is a first composition comprising an RVA peak viscosity that is at most 75%, 70%, 60%, 50%, 40%, 30%, 20%, 10%, or 5% of an RVA peak viscosity of a second composition;
    wherein the first composition consists of each ingredient in a first set of ingredients at a specified weight percentage, and the first set of ingredients comprises the at least a portion of pulse, the at least a portion of grain, and water;
    wherein the second composition consists of the first set of ingredients in the specified weight percentages, except that the at least a portion of pulse comprising hydrolyzed starch is replaced with at least a portion of pulse comprising unhydrolyzed starch, and except that the at least a portion of grain comprising hydrolyzed starch is replaced with at least a portion of grain comprising unhydrolyzed starch.
22. The composition of any of clauses 1-59, excepting the present clause:
    wherein the composition comprises a liquid;
    wherein the liquid comprises water.
23. The composition of clause 18:
    wherein the at least two enzymes comprise:
    α-amylase (e.g., thermostable α-amylase or thermostable, bacterial food grade α-amylase); and
    endo-glucanase (e.g., beta-glucanase (for example, endo-beta-1,4-glucanase) or cellulase (for example, endo-fibrolytic enzyme or endo-hemicellulase).
24. The composition of any of clauses 1-59, excepting the present clause: wherein the composition is a first composition comprising an RVA viscosity at 25° C. (77° F.) that is at most 75%, 70%, 60%, 50%, 40%, 30%, 20%, 10%, or 5% of an RVA viscosity at 25° C. (77° F.) of a second composition;
    wherein the first composition consists of each ingredient in a first set of ingredients at a specified weight percentage, and the first set of ingredients comprises the at least a portion of pulse, the at least a portion of grain, and water;
    wherein the second composition consists of the first set of ingredients in the specified weight percentages, except that the at least a portion of pulse comprising hydrolyzed starch is replaced with at least a portion of pulse comprising unhydrolyzed starch, and except that the at least a portion of grain comprising hydrolyzed starch is replaced with at least a portion of grain comprising unhydrolyzed starch.
25. The composition of any of clauses 1-59, excepting the present clause and clauses 4, 7-8, 10, 17, 27-48, 50-51, and 52-59:
    wherein the at least one material is green groat; and
    wherein the at least one material has a mean particle size on a volume-weighted basis equal to about 130.3 microns within a tolerance of +/−20% (optionally, 10%, 5%, 4%, 3%, 2%, 1%), wherein the particle size is the diameter of a sphere-shaped particle that would produce laser diffraction measured for the particle.
26. The composition of clause 25:
    wherein, within a tolerance of +/−20% (optionally, 10%, 5%, 4%, 3%, 2%, 1%):
    10% by volume of particles in the at least one material have a particle size no more than about 33.8 microns;
    50% by volume of particles in the at least one material have a particle size no more than about 119.7 microns; and 90% by volume of particles in the at least one material have a particle size no more than about 238.2 microns.

27. The composition of any of clauses 1-59, excepting the present clause and clauses 4, 7-8, 10, 17, 25-26, 29-42, 44-49, and 51-59:

wherein the at least one material is high fiber oat (e.g., HiFi variety oat registered under the Plant Protection Act, with certificate number 200300193 to NDSU Research foundation, having a mean groat protein content of about 18.7 wt. % dry basis and a mean groat Beta-glucan content of about 6.42 wt. % dry basis); and wherein the at least one material has a mean particle size on a volume-weighted basis equal to about 94.5 microns within a tolerance of +/−20% (optionally, 10%, 5%, 4%, 3%, 2%, 1%), wherein the particle size is the diameter of a sphere-shaped particle that would produce laser diffraction measured for the particle.

28. The composition of clause 27:

wherein, within a tolerance of +/−20% (optionally, 10%, 5%, 4%, 3%, 2%, 1%):

10% by volume of particles in the at least one material have a particle size no more than about 24.7 microns;

50% by volume of particles in the at least one material have a particle size no more than about 82.6 microns; and 90% by volume of particles in the at least one material have a particle size no more than about 181.6 microns.

29. The composition of any of clauses 1-59, excepting the present clause:

wherein the at least one material is oat bran; and wherein the at least one material has a mean particle size on a volume-weighted basis equal to about 151.5 microns within a tolerance of +/−20% (optionally, 10%, 5%, 4%, 3%, 2%, 1%), wherein the particle size is the diameter of a sphere-shaped particle that would produce laser diffraction measured for the particle.

30. The composition of clause 29:

wherein, within a tolerance of +/−20% (optionally, 10%, 5%, 4%, 3%, 2%, 1%):

10% by volume of particles in the at least one material have a particle size no more than about 39.4 microns;

50% by volume of particles in the at least one material have a particle size no more than about 141.2 microns; and 90% by volume of particles in the at least one material have a particle size no more than about 273.5 microns.

31. The composition of any of clauses 1-59, excepting the present clause and clauses 4, 7-8, 10, 17, 25-30, 33-44, 46-49, 50-51, and 53-59:

wherein the at least one material is whole grain rice (e.g., brown rice); and wherein the at least one material has a mean particle size on a volume-weighted basis equal to about 157.8 microns within a tolerance of +/−20% (optionally, 10%, 5%, 4%, 3%, 2%, 1%), wherein the particle size is the diameter of a sphere-shaped particle that would produce laser diffraction measured for the particle.

32. The composition of clause 31:

wherein, within a tolerance of +/−20% (optionally, 10%, 5%, 4%, 3%, 2%, 1%): 10% by volume of particles in the at least one material have a particle size no more than about 44.0 microns;

50% by volume of particles in the at least one material have a particle size no more than about 143.4 microns; and 90% by volume of particles in the at least one material have a particle size no more than about 291.5 microns.

33. The composition of any of clauses 1-59, excepting the present clause and clauses 2-4, 7-8, 10, 17, 25-32, 35-49, 50-52, 54-59:

wherein the at least one material is white rice; and wherein the at least one material has a mean particle size on a volume-weighted basis equal to about 168.4 microns within a tolerance of +/−20% (optionally, 10%, 5%, 4%, 3%, 2%, 1%), wherein the particle size is the diameter of a sphere-shaped particle that would produce laser diffraction measured for the particle.

34. The composition of clause 33:

wherein, within a tolerance of +/−20% (optionally, 10%, 5%, 4%, 3%, 2%, 1%):

10% by volume of particles in the at least one material have a particle size no more than about 56.4 microns;

50% by volume of particles in the at least one material have a particle size no more than about 155.3 microns; and 90% by volume of particles in the at least one material have a particle size no more than about 299.4 microns.

35. The composition of any of clauses 1-59, excepting the present clause and clauses 4, 7-8, 10, 17, 25-34, 37-49, 50-53, 55-59:

wherein the at least one material is RM blend (e.g., about 70 wt. % oat, 10 wt. % barley, 10 wt. % rye, and 10 wt. % wheat within a tolerance of +/−10% of the wt. % of each cereal grain component); and wherein the at least one material has a mean particle size on a volume-weighted basis equal to about 147.3 microns within a tolerance of +/−20% (optionally, 10%, 5%, 4%, 3%, 2%, 1%), wherein the particle size is the diameter of a sphere-shaped particle that would produce laser diffraction measured for the particle.

36. The composition of clause 35:

wherein, within a tolerance of +/−20% (optionally, 10%, 5%, 4%, 3%, 2%, 1%):

10% by volume of particles in the at least one material have a particle size no more than about 42.3 microns;

50% by volume of particles in the at least one material have a particle size no more than about 139.4 microns; and 90% by volume of particles in the at least one material have a particle size no more than about 259.4 microns.

37. The composition of any of clauses 1-59, excepting the present clause and clauses 4, 7-8, 10, 17, 25-36, 39-46, 48-49, 50-54, and 56-59:

wherein the at least one material is barley; and wherein the at least one material has a mean particle size on a volume-weighted basis equal to about 193.4 microns within a tolerance of +/−20% (optionally, 10%, 5%, 4%, 3%, 2%, 1%), wherein the particle size is the diameter of a sphere-shaped particle that would produce laser diffraction measured for the particle.

38. The composition of clause 37:

wherein, within a tolerance of +/−20% (optionally, 10%, 5%, 4%, 3%, 2%, 1%):

10% by volume of particles in the at least one material have a particle size no more than about 52.0 microns;

50% by volume of particles in the at least one material have a particle size no more than about 185.1 microns; and 90% by volume of particles in the at least one material have a particle size no more than about 336.7 microns.

39. The composition of any of clauses 1-59, excepting the present clause and clauses 4, 7-8, 10, 17, 25-38, 41-49, 50-55, and 57-59:

wherein the at least one material is *quinoa*; and wherein the at least one material has a mean particle size on a volume-weighted basis equal to about 159.0 microns within a tolerance of +/−20% (optionally, 10%, 5%, 4%, 3%, 2%, 1%), wherein the particle size is the diameter of a sphere-shaped particle that would produce laser diffraction measured for the particle.

40. The composition of clause 39:
wherein, within a tolerance of +/−20% (optionally, 10%, 5%, 4%, 3%, 2%, 1%):
10% by volume of particles in the at least one material have a particle size no more than about 55.2 microns;
50% by volume of particles in the at least one material have a particle size no more than about 150.9 microns; and
90% by volume of particles in the at least one material have a particle size no more than about 271.2 microns.

41. The composition of any of clauses 1-59, excepting the present clause and clauses 2-4, 7-8, 10, 17, 25-40, 43-49, 50-57, and 59:
wherein the at least one material is 50 wt. % oat and 50 wt. % yellow pea; and
wherein the at least one material has a mean particle size on a volume-weighted basis equal to about 139.2 microns within a tolerance of +/−20% (optionally, 10%, 5%, 4%, 3%, 2%, 1%), wherein the particle size is the diameter of a sphere-shaped particle that would produce laser diffraction measured for the particle.

42. The composition of clause 41:
wherein, within a tolerance of +/−20% (optionally, 10%, 5%, 4%, 3%, 2%, 1%):
10% by volume of particles in the at least one material have a particle size no more than about 38.9 microns;
50% by volume of particles in the at least one material have a particle size no more than about 130.2 microns; and
90% by volume of particles in the at least one material have a particle size no more than about 249.6 microns.

43. The composition of any of clauses 1-59, excepting the present clause and clauses 4, 7-8, 10, 17, 25-26, 29-42, 44-49, and 51-59:
wherein the at least one material is whole grain oat comprising hydrolyzed starch and hydrolyzed fiber; and
wherein the at least one material comprises a mass ratio selected from the group of mass ratios consisting of:
a mass ratio of starch to protein equal to about 3.51-4.87 (e.g., within a tolerance of +/−30%, 20%, 10%, 5%, or 1% of the mass ratio of starch to protein);
a mass ratio of fat to protein equal to about 0.39-0.58 (e.g., within a tolerance of +/−30%, 20%, 10%, 5%, or 1% of the mass ratio of fat to protein);
a mass ratio of dietary fiber to protein equal to about 0.61-0.84 (e.g., within a tolerance of +/−30%, 20%, 10%, 5%, or 1% of the mass ratio of dietary fiber to protein); and
any combination thereof.

44. The composition of any of clauses 1-59, excepting the present clause and clauses 4, 7-8, 10, 17, 25-43, and 45-59:
wherein the at least one material is whole grain wheat comprising hydrolyzed starch and hydrolyzed fiber; and
wherein the at least one material comprises a mass ratio selected from the group of mass ratios consisting of:
a mass ratio of starch to protein equal to about 4.61-6.28 (e.g., within a tolerance of +/−30%, 20%, 10%, 5%, or 1% of the mass ratio of starch to protein);
a mass ratio of fat to protein equal to about 0.19-0.20 (e.g., within a tolerance of +/−30%, 20%, 10%, 5%, or 1% of the mass ratio of fat to protein);
a mass ratio of dietary fiber to protein equal to about 0.81-1.36 (e.g., within a tolerance of +/−30%, 20%, 10%, 5%, or 1% of the mass ratio of dietary fiber to protein); and
any combination thereof.

45. The composition of any of clauses 1-59, excepting the present clause and clauses 4, 7-8, 10, 17, 25-30, 33-44, 46-49, 50-51, and 53-59:
wherein the at least one material is whole grain rice (e.g., brown rice) comprising hydrolyzed starch and hydrolyzed fiber; and
wherein the at least one material comprises a mass ratio selected from the group of mass ratios consisting of:
a mass ratio of starch to protein equal to about 9.55-9.85 (e.g., within a tolerance of +/−30%, 20%, 10%, 5%, or 1% of the mass ratio of starch to protein);
a mass ratio of fat to protein equal to about 0.38-0.42 (e.g., within a tolerance of +/−30%, 20%, 10%, 5%, or 1% of the mass ratio of fat to protein);
a mass ratio of dietary fiber to protein equal to about 0.48-0.64 (e.g., within a tolerance of +/−30%, 20%, 10%, 5%, or 1% of the mass ratio of dietary fiber to protein); and
any combination thereof.

46. The composition of any of clauses 1-59, excepting the present clause and clauses 4, 7-8, 10, 17, 25-45, and 47-59:
wherein the at least one material is whole grain rye comprising hydrolyzed starch and hydrolyzed fiber; and
wherein the at least one material comprises a mass ratio selected from the group of mass ratios consisting of:
a mass ratio of starch to protein equal to about 5.78 (e.g., within a tolerance of +/−30%, 20%, 10%, 5%, or 1% of the mass ratio of starch to protein);
a mass ratio of fat to protein equal to about 0.16 (e.g., within a tolerance of +/−30%, 20%, 10%, 5%, or 1% of the mass ratio of fat to protein);
a mass ratio of dietary fiber to protein equal to about 1.46 (e.g., within a tolerance of +/−30%, 20%, 10%, 5%, or 1% of the mass ratio of dietary fiber to protein); and
any combination thereof.

47. The composition of any of clauses 1-59, excepting the present clause and clauses 4, 7-8, 10, 17, 25-36, 39-46, 48-49, 50-54, and 56-59:
wherein the at least one material is whole grain barley comprising hydrolyzed starch and hydrolyzed fiber; and
wherein the at least one material comprises a mass ratio selected from the group of mass ratios consisting of:
a mass ratio of starch to protein equal to about 4.44 (e.g., within a tolerance of +/−30%, 20%, 10%, 5%, or 1% of the mass ratio of starch to protein);
a mass ratio of fat to protein equal to about 0.18 (e.g., within a tolerance of +/−30%, 20%, 10%, 5%, or 1% of the mass ratio of fat to protein);
a mass ratio of dietary fiber to protein equal to about 1.39 (e.g., within a tolerance of +/−30%, 20%, 10%, 5%, or 1% of the mass ratio of dietary fiber to protein); and
any combination thereof.

48. The composition of any of clauses 1-59, excepting the present clause and clauses 4, 7-8, 10, 17, 25-47, and 49-59:
wherein the at least one material is whole grain sorghum comprising hydrolyzed starch and hydrolyzed fiber; and
wherein the at least one material comprises a mass ratio selected from the group of mass ratios consisting of:
a mass ratio of starch to protein equal to about 5.92-8.08 (e.g., within a tolerance of +/−30%, 20%, 10%, 5%, or 1% of the mass ratio of starch to protein);
a mass ratio of fat to protein equal to about 0.33-0.40 (e.g., within a tolerance of +/−30%, 20%, 10%, 5%, or 1% of the mass ratio of fat to protein);

a mass ratio of dietary fiber to protein equal to about 0.63-0.78 (e.g., within a tolerance of +/−30%, 20%, 10%, 5%, or 1% of the mass ratio of dietary fiber to protein); and any combination thereof.

49. The composition of any of clauses 1-59, excepting the present clause and clauses 4, 7-8, 10, 17, 27-48, 50-51, and 52-59:

wherein the at least one material is green groat; and
wherein an RVA viscosity at 25° C. (77° F.) of the composition is no more than about 800 (optionally, 700, 600, 500, 400, 312) cP.

50. The composition of any of clauses 1-59, excepting the present clause and clauses 4, 7-8, 10, 17, 25-26, 29-42, 44-49, and 51-59:

wherein the at least one material is high fiber oat (e.g., HiFi oat); and
wherein an RVA viscosity at 25° C. (77° F.) of the composition is no more than about 800 (optionally, 700, 600, 500, 400, 300, 200, 166) cP.

51. The composition of any of clauses 1-59, excepting the present clause and clauses 2-3, 25-28, 31-50, and 52-59:

wherein the at least one material is oat bran; and
wherein an RVA viscosity at 25° C. of the composition is no more than about 700 (optionally, 600, 500, 400, 300, 200, 145) cP.

52. The composition of any of clauses 1-59, excepting the present clause and clauses 4, 7-8, 10, 17, 25-30, 33-44, 46-49, 50-51, and 53-59:

wherein the at least one material is whole grain rice (e.g., brown rice); and
wherein an RVA viscosity at 25° C. (77° F.) of the composition is no more than about 300 (optionally, 250, 200, 150, 100, 50) cP.

53. The composition of any of clauses 1-59, excepting the present clause and clauses 2-4, 7-8, 10, 17, 25-32, 35-49, 50-52, and 54-59:

wherein the at least one material is white rice; and
wherein an RVA viscosity at 25° C. (77° F.) of the composition is no more than about 350 (optionally, 300, 250, 200, 150, 100, 50, 33) cP.

54. The composition of any of clauses 1-59, excepting the present clause and clauses 4, 7-8, 10, 17, 25-34, 37-49, 50-53, and 55-59:

wherein the at least one material is RM blend; and
wherein an RVA viscosity at 25° C. (77° F.) of the composition is no more than about 600 (optionally, 500, 400, 300, 200, 150, 142) cP.

55. The composition of any of clauses 1-59, excepting the present clause and clauses 4, 7-8, 10, 17, 25-36, 39-46, 48-49, 50-54, and 56-59:

wherein the at least one material is barley; and
wherein an RVA viscosity at 25° C. (77° F.) of the composition is no more than about 800 (optionally, 700, 600, 500, 400, 300, 200, 100, 78) cP.

56. The composition of any of clauses 1-59, excepting the present clause and clauses 4, 7-8, 10, 17, 25-38, 41-49, 50-55, and 57-59:

wherein the at least one material is *quinoa*; and
wherein an RVA viscosity at 25° C. (77° F.) of the composition is no more than about 90 (optionally, 80, 70, 60, 50, 40, 37) cP.

57. The composition of any of clauses 1-59, excepting the present clause and clauses 4, 7-8, 10, 17, 25-56, and 58-59:

wherein the at least one material is amaranth; and
wherein an RVA viscosity at 25° C. (77° F.) of the composition is no more than about 160 (optionally, 140, 120, 100, 80, 60, 40, 20) cP.

58. The composition of any of clauses 1-59, excepting the present clause and clauses 2-4, 7-8, 10, 17, 25-40, 43-49, 50-57, and 59:

wherein the at least one material is 50 wt. % oat and 50 wt. % yellow pea; and
wherein an RVA viscosity at 25° C. (77° F.) of the composition is no more than about 250 (optionally, 200, 150, 100, 72) cP.

59. The composition of any of clauses 1-59, excepting the present clause and clauses 4, 7-8, 10, 17, and 25-58:

wherein the at least one material is 50 wt. % oat and 50 wt. % pinto bean; and
wherein an RVA viscosity at 25° C. (77° F.) of the composition is no more than about 300 (optionally, 250, 200, 150, 107) cP.

60. A method comprising the steps:

providing starting components comprising:
a first enzyme (e.g., a fiber-hydrolysis-catalyzing enzyme);
a second enzyme (e.g., a starch-hydrolysis-catalyzing enzyme);
water; and
a starting composition, wherein the starting composition comprises at least one material selected from the group consisting of at least a portion of grain and at least a portion of pulse, wherein the at least one material comprises starch and fiber;

hydrolyzing the fiber in the at least one material through a fiber hydrolysis reaction, wherein the fiber hydrolysis reaction is catalyzed by the first enzyme;

hydrolyzing the starch in the at least one material through a starch hydrolysis reaction, wherein the starch hydrolysis reaction is catalyzed by the second enzyme;

deactivating the first enzyme; and
deactivating the second enzyme;
wherein the method provides a product composition.

61. The method of any of clauses 60-90, excepting the present clause, further comprising:

preconditioning the starting components by combining the first enzyme, the second enzyme, the water, and the starting composition in a preconditioner, thereby providing a preconditioned mixture.

62. The method of clause 61 further comprising:

extruding (e.g., continuously extruding) the preconditioned mixture (e.g., in an extruder), thereby providing an extruded mixture.

63. The method of clause 62 further comprising:

pelletizing the extruded mixture to provide a pelletized mixture.

64. The method of clause 63:

drying the pelletized mixture to provide a dried mixture.

65. The method of clause 64:

grinding (e.g., milling) the dried mixture to provide a powder (e.g., a flour).

66. The method of any of clauses 60-90, excepting the present clause, further comprising:

preconditioning the starting components to provide a preconditioned mixture with a wet mix temperature selected from the group consisting of about 54.4° C. (130° F.) to about 76.7° C. (170° F.), about 60.0° C. (140° F.) to about 71.1° C. (160° F.), and about 62.8° C. (145° F.).

67. The method of any of clauses 60-90, excepting the present clause, further comprising:

preconditioning the starting components to provide a preconditioned mixture with a selected weight percentage of water, wherein the selected weight percentage of water is selected from the group consisting of about 28 wt. % to about 37 wt. %, about 30 wt. % to about 34 wt. %, and about 32 wt. %.

68. The method of any of clauses 60-90, excepting the present clause, further comprising:

heating the preconditioned mixture to deactivate the first enzyme, activate the second enzyme, and deactivate the second enzyme.

69. The method of clause 68:

wherein the heating step occurs while extruding the preconditioned mixture (e.g., with a jacket on an extruder barrel of an extruder and/or frictional heat generated by an extruder) to provide an extruded mixture; and wherein, upon termination of the extruding (e.g., at the exit of an extruder barrel of an extruder), the extruded mixture is provided at a post-extrusion temperature selected from the group consisting of about 140° C. (284° F.) to about 151° C. (304° F.), about 142° C. (288° F.) to about 149° C. (300° F.), and about 146° C. (294° F.).

70. The method of any of clauses 60-90, excepting the present clause:

wherein the first enzyme is endo-cellulase.

71. The method of any of clauses 60-90, excepting the present clause:

wherein the second enzyme (e.g., an α-amylase) is a relatively high temperature enzyme (e.g., having an optimum-activity temperature range from about 66° C. (150° F.) to about 91° C. (195° F.));

wherein the first enzyme (e.g., an endo-cellulase) is a relatively low temperature enzyme; and wherein the first enzyme has an optimum-activity temperature range that is lower than the optimum-activity temperature range of the second enzyme, and optionally, wherein the optimum-activity temperature range of the second enzyme does not overlap with the optimum activity temperature range of the first enzyme.

72. The method of any of clauses 60-90, excepting the present clause:

wherein the fiber comprises cellulose;

wherein the first enzyme reduces the molecular weight of the cellulose in the starting composition (or in the fiber) to provide cellulose in the product composition with a reduced average molecular weight.

73. The method of clause 62:

wherein the starch hydrolysis reaction and the fiber hydrolysis reaction occur (e.g., partially, substantially, or completely) during the extruding.

74. The method of clause 62:

wherein the fiber hydrolysis reaction occurs during the preconditioning.

75. The method of clause 62:

wherein the fiber hydrolysis reaction ends during the extruding.

76. The method of clause 62:

wherein a reaction rate of the starch hydrolysis reaction is fastest (e.g., has a maximum reaction rate, and also begins substantially) during the extruding.

77. The method of clause 62:

wherein the starch hydrolysis reaction ends (e.g., effectively, substantially, or completely) during the extruding.

78. The method of clause 62 further comprising:

wherein the preconditioning and the extruding (and optionally pelletizing) together have a duration equal to a maximum of about 5 minutes (e.g., about 4 minutes, about 3 minutes, or about 2 minutes, or equal to about 30 seconds to 5 minutes, about 30 seconds to 3 minutes, or about 1 minute to 3 minutes).

79. The method of any of clauses 60-90, excepting the present clause:

wherein the starch hydrolysis reaction is stopped before converting more than about 10 (optionally, 9, 8, 7, 6, 5, 4, 3, 2, 1) wt. % of the starch to monosaccharides and disaccharides.

80. The method of any of clauses 60-90, excepting the present clause, further comprising:

wherein the fiber hydrolysis reaction is stopped before converting more than about 10 (optionally, 9, 8, 7, 6, 5, 4, 3, 2, 1) wt. % of the fiber to monosaccharides and disaccharides.

81. The method of any of clauses 60-90, excepting the present clause:

wherein the water comprises liquid water and steam.

82. The method of clause 62:

wherein the extruding step occurs in an extruder comprising:

forward blocks of conveyors (e.g., augers or shafts with paddles); and reverse blocks of the conveyors (e.g., augers or shafts with paddles).

83. The method of any of clauses 60-90, excepting the present clause, further comprising:

preconditioning the starting components to provide a preconditioned mixture by conveying and agitating the starting components with conveyors (e.g., shafts with paddles or screws) in the preconditioner.

84. The method of any of clauses 60-90, excepting the present clause:

wherein the first enzyme is endo-cellulase;

wherein the first enzyme is provided in an endo-cellulase composition; and wherein the endo-cellulase composition is sufficiently pure endo-cellulase that the endo-cellulase composition is free from detectable levels of exo-activity.

85. The method of any of clauses 60-90, excepting the present clause:

wherein the first enzyme is endo-cellulase;

wherein the first enzyme is provided in an endo-cellulase composition; and wherein the endo-cellulase composition comprises no more than undetectable levels of exo-cellulase and β-amylase.

86. The method of any of clauses 60-90, excepting the present clause:

wherein the first enzyme is an endo-cellulase;

wherein the first enzyme provides about 30-200, about 100-130, or about 115 International Units (IU) of enzyme activity per gram of fiber (e.g., the fiber in the at least one material).

87. The method of any of clauses 60-90, excepting the present clause:

wherein the second enzyme is an α-amylase;

wherein the second enzyme provides about 600-3100, about 1700-2000, or about 1,850 Modified Wohlgemuth Units (MWU) of enzyme activity per gram of starch (e.g., the starch in the at least one material).

88. The method of clause 62 further comprising:

adding at least one additional component to the extruded mixture to provide a product composition, wherein the product composition is a food.

89. The method of clause 62 further comprising:
adding at least one additional component to the extruded mixture to provide a product composition, wherein the product composition is a beverage.
90. The method of any of clauses 60-90, excepting the present clause, further comprising:
extruding the starting composition, the second enzyme and the first enzyme, thereby providing an extruded mixture.
91. A composition formed by the method of any of clauses 60-90.
92. The method of any of clauses 60-90 or the composition of claim 91: wherein the at least one material comprises whole grain, and wherein the whole grain in the product composition maintains whole grain status.
93. The composition of any of clauses 1-59 and 91, excepting the present clause and clauses 4, 7, 8, 10, 17, 29, 30, 33-34, 41-42, 51, 53, 58 and 59, wherein the at least one material comprises hydrolyzed-starch-and-fiber whole grain (e.g., wherein the whole grain has maintained whole grain status through the hydrolysis of the starch and fiber).

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A composition comprising:
    hydrolyzed material made by hydrolyzing starch and fiber to a controlled extent in at least one material selected from the group consisting of at least a portion of grain and at least a portion of pulse, thereby providing the hydrolyzed material;
    wherein the hydrolyzed material comprises hydrolyzed starch and hydrolyzed fiber;
    wherein the hydrolyzed starch consists of all starch in the hydrolyzed material and wherein the hydrolyzed starch comprises hydrolyzed starch molecules that have been reduced in molecular weight so that the hydrolyzed starch molecules have not been converted to non-starch molecules;
    wherein the average molecular weight of the hydrolyzed starch molecules in the hydrolyzed material is from 0.10 to 0.80 of the average molecular weight of unhydrolyzed starch molecules in the at least one material;
    wherein the hydrolyzed fiber consists of all fiber in the hydrolyzed material, and wherein the hydrolyzed fiber comprises hydrolyzed fiber molecules that have been reduced in molecular weight so that the hydrolyzed fiber molecules have not been converted to non-fiber molecules; and
    wherein the average molecular weight of the hydrolyzed fiber molecules in the hydrolyzed material is from 0.10 to 0.80 of the average molecular weight of unhydrolyzed fiber molecules in the at least one material.

2. The composition of claim 1:
    wherein the at least one material comprises unhydrolyzed whole grain and the hydrolyzed material comprises hydrolyzed whole grain, wherein the hydrolyzed whole grain comprises hydrolyzed starch and hydrolyzed fiber; and
    wherein the hydrolyzed whole grain has, within a tolerance of +/−20%, the same mass ratio of starch to protein as the unhydrolyzed whole grain.

3. The composition of claim 1:
    wherein the at least one material comprises unhydrolyzed whole grain and the hydrolyzed material comprises hydrolyzed whole grain, wherein the hydrolyzed whole grain comprises hydrolyzed starch and hydrolyzed fiber, and
    wherein the hydrolyzed whole grain has:
    a mass ratio of fiber to protein equal, within a tolerance of +/−20%, to a mass ratio of fiber to protein of the unhydrolyzed whole grain
    a mass ratio of fat to protein equal, within a tolerance of +/−20%, to a mass ratio of fat to protein of the unhydrolyzed whole grain; and
    a mass ratio of starch to protein equal, within a tolerance of +/−20%, to a mass ratio of starch to protein of the unhydrolyzed whole grain.

4. The composition of claim 1:
    wherein the at least one material comprises unhydrolyzed pulse and the hydrolyzed material comprises hydrolyzed pulse, wherein the hydrolyzed pulse comprises hydrolyzed starch and hydrolyzed fiber; and
    wherein the hydrolyzed pulse has, within a tolerance of +/−30%, the same mass ratio of starch to protein as the unhydrolyzed pulse.

5. The composition of claim 1:
    wherein the hydrolyzed starch molecules have an average molecular weight of no more than $3.4 \times 10^6$ Dalton.

6. The composition of claim 1:
    wherein the hydrolyzed fiber molecules have an average molecular weight of no more than 700,000 Dalton.

7. The composition of claim 1:
    wherein the at least one material comprises unhydrolyzed bran and the hydrolyzed material comprises hydrolyzed bran, wherein the hydrolyzed bran comprises hydrolyzed starch and hydrolyzed fiber; and
    wherein the hydrolyzed bran has, within a tolerance of +/−20%, the same mass ratio of starch to protein as the unhydrolyzed bran.

8. The composition of claim 7:
    wherein the hydrolyzed bran is oat bran,
    wherein the oat bran comprises:
    at least 5.5 wt. % beta-glucan on a total dry weight basis,
    at least 16.0 wt. % dietary fiber on a total dry weight basis; and
    wherein at least one-third of the total dietary fiber in the oat bran is soluble fiber.

9. The composition of claim 7:
    wherein the hydrolyzed bran is oat bran concentrate;
    wherein the oat bran concentrate comprises:
    at least 10 wt. % beta-glucan on a total dry weight basis;
    at least 29.1 wt. % dietary fiber on a total dry weight basis; and
    wherein at least one-third of the total dietary fiber in the oat bran concentrate is soluble fiber.

10. The composition of claim 1:
    wherein the at least one material comprises unhydrolyzed bran and the hydrolyzed material comprises hydrolyzed bran, wherein the hydrolyzed bran comprises hydrolyzed starch and hydrolyzed fiber; and wherein the hydrolyzed bran has:

a mass ratio of fiber to protein equal, within a tolerance of +/−20%, to a mass ratio of fiber to protein of the unhydrolyzed bran;

a mass ratio of fat to protein equal, within a tolerance of +/−20%, to a mass ratio of fat to protein of the unhydrolyzed bran; and a mass ratio of starch to protein equal, within a tolerance of +/−20%, to a mass ratio of starch to protein of the unhydrolyzed bran.

11. The composition of claim 1:
wherein the composition is a powder.

12. The composition of claim 1:
wherein the composition comprises a liquid; and
wherein the hydrolyzed material is fully hydrated by the liquid and suspended in the liquid to form a suspension.

13. The composition of claim 12:
wherein the composition comprises at least 6 wt. % of the hydrolyzed material.

14. The composition of claim 1:
wherein the composition comprises a liquid; and
wherein the liquid is a water-based liquid selected from the group consisting of water, mammalian milk, soy milk, grain milk, nut milk, coconut milk, fruit juice, and vegetable juice.

15. The composition of claim 1:
wherein the composition comprises a powder hydrated by a water-based liquid,
wherein the powder consists of powder particles;
wherein the powder particles have an average particle size equal to 50-200 microns on a volume-weighted basis.

16. The composition of claim 1:
wherein the at least one material comprises the at least a portion of grain; and
wherein the grain is selected from the group consisting of wheat, oat, barley, corn, white rice, brown rice, barley, millet, sorghum, rye, triticale, teff, spelt, buckwheat, *quinoa*, amaranth, kaniwa, cockscomb, green groat and combinations thereof.

17. The composition of claim 1:
wherein the at least one material comprises the at least a portion of pulse; and
wherein the pulse is selected from the group consisting of peas, lentils, chickpeas, navy beans, black turtle beans, cranberry beans, kidney beans, pinto beans, small red beans, Dutch brown beans, pink beans and combinations thereof.

18. The composition of claim 1:
wherein the composition comprises at least two enzymes.

19. The composition of claim 1:
wherein the hydrolyzed fiber comprises insoluble fiber molecules;
wherein the insoluble fiber molecules have an average molecular weight equal to no more than 1,000,000 Dalton.

20. The composition of claim 1:
wherein the composition is food grade.

21. The composition of claim 1:
wherein the composition has a Rapid Visco Analyzer (RVA) peak viscosity that is at most 75% of the RVA peak viscosity of a second composition that is equivalent to the first composition except that the second composition comprises unhydrolyzed starch in place of the hydrolyzed starch.

22. The composition of claim 1,
wherein the average molecular weight of the hydrolyzed starch molecules in the hydrolyzed material is 0.20 to 0.80 of the average molecular weight of unhydrolyzed starch molecules in the at least one material; and
wherein the average molecular weight of the hydrolyzed fiber molecules in the hydrolyzed material is 0.20 to 0.80 of the average molecular weight of unhydrolyzed fiber molecules in the at least one material.

23. The composition of claim 1,
wherein the average molecular weight of the hydrolyzed starch molecules in the hydrolyzed material is 0.47 to 0.80 of the average molecular weight of unhydrolyzed starch molecules in the at least one material; and
wherein the average molecular weight of the hydrolyzed fiber molecules in the hydrolyzed material is 0.47 to 0.80 of the average molecular weight of unhydrolyzed fiber molecules in the at least one material.

24. The composition of claim 1,
wherein the average molecular weight of the hydrolyzed starch molecules in the hydrolyzed material is 0.47 to 0.70 of the average molecular weight of unhydrolyzed starch molecules in the at least one material; and
wherein the average molecular weight of the hydrolyzed fiber molecules in the hydrolyzed material is 0.47 to 0.70 of the average molecular weight of unhydrolyzed fiber molecules in the at least one material.

25. The composition of claim 1,
wherein the average molecular weight of the hydrolyzed starch molecules in the hydrolyzed material is 0.47 to 0.60 of the average molecular weight of unhydrolyzed starch molecules in the at least one material; and
wherein the average molecular weight of the hydrolyzed fiber molecules in the hydrolyzed material is 0.47 to 0.60 of the average molecular weight of unhydrolyzed fiber molecules in the at least one material.

26. The composition of claim 1:
wherein the at least one material comprises unhydrolyzed whole grain and the hydrolyzed material comprises hydrolyzed whole grain, wherein the hydrolyzed whole grain comprises hydrolyzed starch and hydrolyzed fiber; and
wherein the hydrolyzed whole grain has, within a tolerance of +/−5%, the same mass ratio of starch to protein as the unhydrolyzed whole grain.

27. The composition of claim 26:
wherein the at least one material comprises unhydrolyzed pulse and the hydrolyzed material comprises hydrolyzed pulse, wherein the hydrolyzed pulse comprises hydrolyzed starch and hydrolyzed fiber; and
wherein the hydrolyzed pulse has, within a tolerance of +/−5%, the same mass ratio of starch to protein as the unhydrolyzed pulse.

28. The composition of claim 1:
wherein the at least one material comprises unhydrolyzed whole grain and the hydrolyzed material comprises hydrolyzed whole grain, wherein the hydrolyzed whole grain comprises hydrolyzed starch and hydrolyzed fiber; and
wherein the hydrolyzed whole grain has:

a mass ratio of fiber to protein equal, within a tolerance of +/−5%, to a mass ratio of fiber to protein of the unhydrolyzed whole grain;

a mass ratio of fat to protein equal, within a tolerance of +/−5%, to a mass ratio of fat to protein of the unhydrolyzed whole grain; and a mass ratio of starch to protein equal, within a tolerance of +/−5%, to a mass ratio of starch to protein of the unhydrolyzed whole grain.

29. The composition of claim 1:
wherein the at least one material comprises unhydrolyzed whole grain and the hydrolyzed material comprises hydrolyzed whole grain, wherein the hydrolyzed whole grain comprises hydrolyzed starch and hydrolyzed fiber; and
wherein the hydrolyzed whole grain has:
a mass ratio of fiber to protein equal, within a tolerance of +/−3%, to a mass ratio of fiber to protein of the unhydrolyzed whole grain;
a mass ratio of fat to protein equal, within a tolerance of +/−3%, to a mass ratio of fat to protein of the unhydrolyzed whole grain; and
a mass ratio of starch to protein equal, within a tolerance of +/−3%, to a mass ratio of starch to protein of the unhydrolyzed whole grain.

30. The composition of claim 1:
wherein the at least one material comprises unhydrolyzed whole grain and the hydrolyzed material comprises hydrolyzed whole grain, wherein the hydrolyzed whole grain comprises hydrolyzed starch and hydrolyzed fiber; and
wherein the hydrolyzed whole grain has:
a mass ratio of fiber to protein equal, within a tolerance of +/−2%, to a mass ratio of fiber to protein of the unhydrolyzed whole grain;
a mass ratio of fat to protein equal, within a tolerance of +/−2%, to a mass ratio of fat to protein of the unhydrolyzed whole grain; and
a mass ratio of starch to protein equal, within a tolerance of +/−2%, to a mass ratio of starch to protein of the unhydrolyzed whole grain.

31. The composition of claim 1:
wherein the at least one material comprises unhydrolyzed whole grain and the hydrolyzed material comprises hydrolyzed whole grain, wherein the hydrolyzed whole grain comprises hydrolyzed starch and hydrolyzed fiber; and
wherein the hydrolyzed whole grain has, within a tolerance of +/−1%, the same mass ratio of starch to protein as the unhydrolyzed whole grain.

32. The composition of claim 31:
wherein the at least one material comprises unhydrolyzed pulse and the hydrolyzed material comprises hydrolyzed pulse, wherein the hydrolyzed pulse comprises hydrolyzed starch and hydrolyzed fiber; and
wherein the hydrolyzed pulse has, within a tolerance of +/−3%, the same mass ratio of starch to protein as the unhydrolyzed pulse.

33. The composition of claim 1:
wherein the at least one material comprises unhydrolyzed whole grain and the hydrolyzed material comprises hydrolyzed whole grain, wherein the hydrolyzed whole grain comprises hydrolyzed starch and hydrolyzed fiber; and
wherein the hydrolyzed whole grain has:
a mass ratio of fiber to protein equal, within a tolerance of +/−1%, to a mass ratio of fiber to protein of the unhydrolyzed whole grain;
a mass ratio of fat to protein equal, within a tolerance of +/−1%, to a mass ratio of fat to protein of the unhydrolyzed whole grain; and
a mass ratio of starch to protein equal, within a tolerance of +/−1%, to a mass ratio of starch to protein of the unhydrolyzed whole grain.

34. The composition of claim 1:
wherein the at least one material comprises unhydrolyzed pulse and the hydrolyzed material comprises hydrolyzed pulse, wherein the hydrolyzed pulse comprises hydrolyzed starch and hydrolyzed fiber; and
wherein the hydrolyzed pulse has, within a tolerance of +/−5%, the same mass ratio of starch to protein as the unhydrolyzed pulse.

35. The composition of claim 1:
wherein the at least one material comprises unhydrolyzed pulse and the hydrolyzed material comprises hydrolyzed pulse, wherein the hydrolyzed pulse comprises hydrolyzed starch and hydrolyzed fiber; and
wherein the hydrolyzed pulse has:
a mass ratio of fiber to protein equal, within a tolerance of +/−5%, to a mass ratio of fiber to protein of the unhydrolyzed pulse;
a mass ratio of fat to protein equal, within a tolerance of +/−5%, to a mass ratio of fat to protein of the unhydrolyzed pulse; and
a mass ratio of starch to protein equal, within a tolerance of +/−5%, to a mass ratio of starch to protein of the unhydrolyzed pulse.

36. The composition of claim 1,
wherein the hydrolyzing starch in the at least one material comprises using alpha-amylase to provide alpha-amylase-catalyzed hydrolysis of starch in the at least one material, and wherein the hydrolyzed material comprises deactivated alpha-amylase.

37. The composition of claim 36,
wherein the hydrolyzing fiber in the at least one material comprises using endo-cellulase to provide endo-cellulase-catalyzed hydrolysis of fiber in the at least one material, and wherein the hydrolyzed material comprises deactivated endo-cellulase.

38. The composition of claim 37,
wherein, together, the alpha-amylase-catalyzed hydrolysis and the endo-cellulase-catalyzed hydrolysis lasts for 30 seconds to 5 minutes from activation of the endo-cellulase or alpha-amylase to deactivation of the endo-cellulase and the alpha-amylase, thereby providing the deactivated alpha-amylase and the deactivated endo-cellulase in the hydrolyzed material.

39. The composition of claim 38,
wherein the alpha-amylase-catalyzed hydrolysis of starch in the at least one material comprises using the alpha-amylase to provide 600 to 3100 Modified Wohlgemuth Units of enzyme activity per gram of the starch in the at least one material.

40. The composition of claim 39,
wherein the endo-cellulase-catalyzed hydrolysis of fiber in the at least one material comprises using the endo-cellulase to provide 30 to 200 International Units of enzyme activity per gram of the fiber in the at least one material.

41. The composition of claim 38, wherein the at least one material is mixed with added water to provide a preconditioned mixture having 27 to 38 wt. % water, wherein the preconditioned mixture is hydrolyzed to provide the hydrolyzed material.

42. The composition of claim 41, wherein the at least one material is mixed with the added water, added enzymes and added tocopherol to provide the preconditioned mixture, wherein the preconditioned mixture is hydrolyzed to provide the hydrolyzed material.

43. The composition of claim 42, wherein the preconditioned mixture comprises 0.1 to 0.5 wt. % tocopherol.

44. The composition of claim 43, wherein the preconditioned mixture comprises 0.06 to 0.15 wt. % alpha-amylase.

45. The composition of claim 44, wherein the preconditioned mixture comprises 0.5 to 1.5 wt. % alpha-amylase.

* * * * *